(12) United States Patent
Matsumoto

(10) Patent No.: US 7,515,572 B2
(45) Date of Patent: Apr. 7, 2009

(54) DATA TRANSFER SYSTEM AND DATA TRANSFER METHOD

(75) Inventor: Yuji Matsumoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 434 days.

(21) Appl. No.: 11/025,632

(22) Filed: Dec. 29, 2004

(65) Prior Publication Data
US 2006/0062191 A1 Mar. 23, 2006

(30) Foreign Application Priority Data
Sep. 17, 2004 (JP) ............................. 2004-271049

(51) Int. Cl.
*H04W 4/00* (2006.01)
(52) U.S. Cl. ................. 370/338; 370/331; 370/389; 370/401; 455/436; 455/437; 455/438; 455/439; 455/442
(58) Field of Classification Search ................ 370/235, 370/310, 331, 338, 389, 394, 466, 349, 401, 370/469, 328, 400; 455/436–439, 442
See application file for complete search history.

(56) References Cited

U.S. PATENT DOCUMENTS

| | | | |
|---|---|---|---|
| 5,940,371 A | | 8/1999 | Mitts et al. |
| 6,487,201 B1 * | | 11/2002 | Seo ............................. 370/394 |
| 2002/0045450 A1 | | 4/2002 | Shimizu et al. |
| 2003/0193912 A1 * | | 10/2003 | O'Neill ....................... 370/331 |
| 2004/0001508 A1 * | | 1/2004 | Zheng et al. ................. 370/466 |
| 2004/0004967 A1 * | | 1/2004 | Nakatsugawa et al. ...... 370/400 |
| 2004/0005893 A1 | | 1/2004 | Isobe et al. |
| 2004/0017775 A1 * | | 1/2004 | Omae et al. .................. 370/235 |
| 2004/0047348 A1 * | | 3/2004 | O'Neill ....................... 370/389 |
| 2006/0018291 A1 * | | 1/2006 | Patel et al. ................... 370/335 |
| 2006/0193272 A1 * | | 8/2006 | Chou et al. .................. 370/310 |

FOREIGN PATENT DOCUMENTS

| | | |
|---|---|---|
| JP | 9-186704 | 7/1997 |
| JP | 2002-16650 | 1/2002 |
| JP | 2002-125254 | 4/2002 |
| JP | 2003-69617 | 3/2003 |
| JP | 2003-143237 | 5/2003 |

OTHER PUBLICATIONS

Notice of Rejection Ground mailed Apr. 22, 2008, from the corresponding Japanese Application.

* cited by examiner

*Primary Examiner*—Alexander Eisen
*Assistant Examiner*—Wayne Cai
(74) *Attorney, Agent, or Firm*—Katten Muchin Rosenman LLP

(57) ABSTRACT

In a data transfer method using a communications network that comprises, at least, a mobile node, a corresponding node that distributes data to the mobile node, and a relay node that relays data transfer between the mobile node and the corresponding node, the mobile node requests the relay node to initiate buffering data that is transmitted from the corresponding node. The relay node buffers data that is transmitted from the corresponding node and addressed to the mobile node. The mobile node requests the relay node to transmit the buffered data to the mobile node. The relay node transmits the buffered data to the mobile node.

25 Claims, 50 Drawing Sheets

| | | | | | | | |
|---|---|---|---|---|---|---|---|
| EtherHeader | IPv6Header | RoutingHeader | NextHeader= 3b | Length | Pad1 | Option Type =7 | |
| | | | Option Length | Status=0 | Reserved | Sequence # | |
| | | | | Lifetime | | | |
| | | | | Refresh | | | |

FIG. 16A

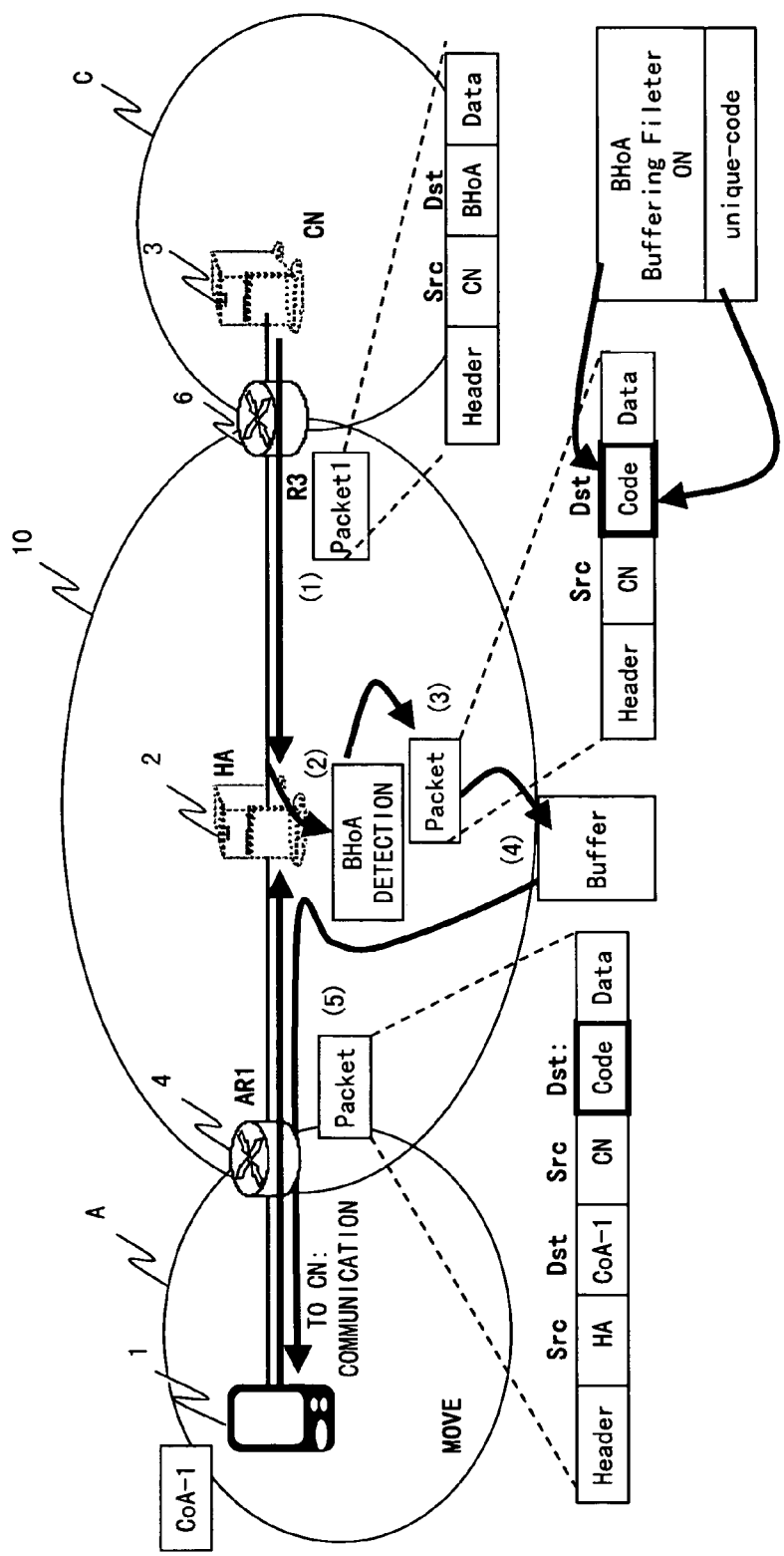
F I G. 1 8

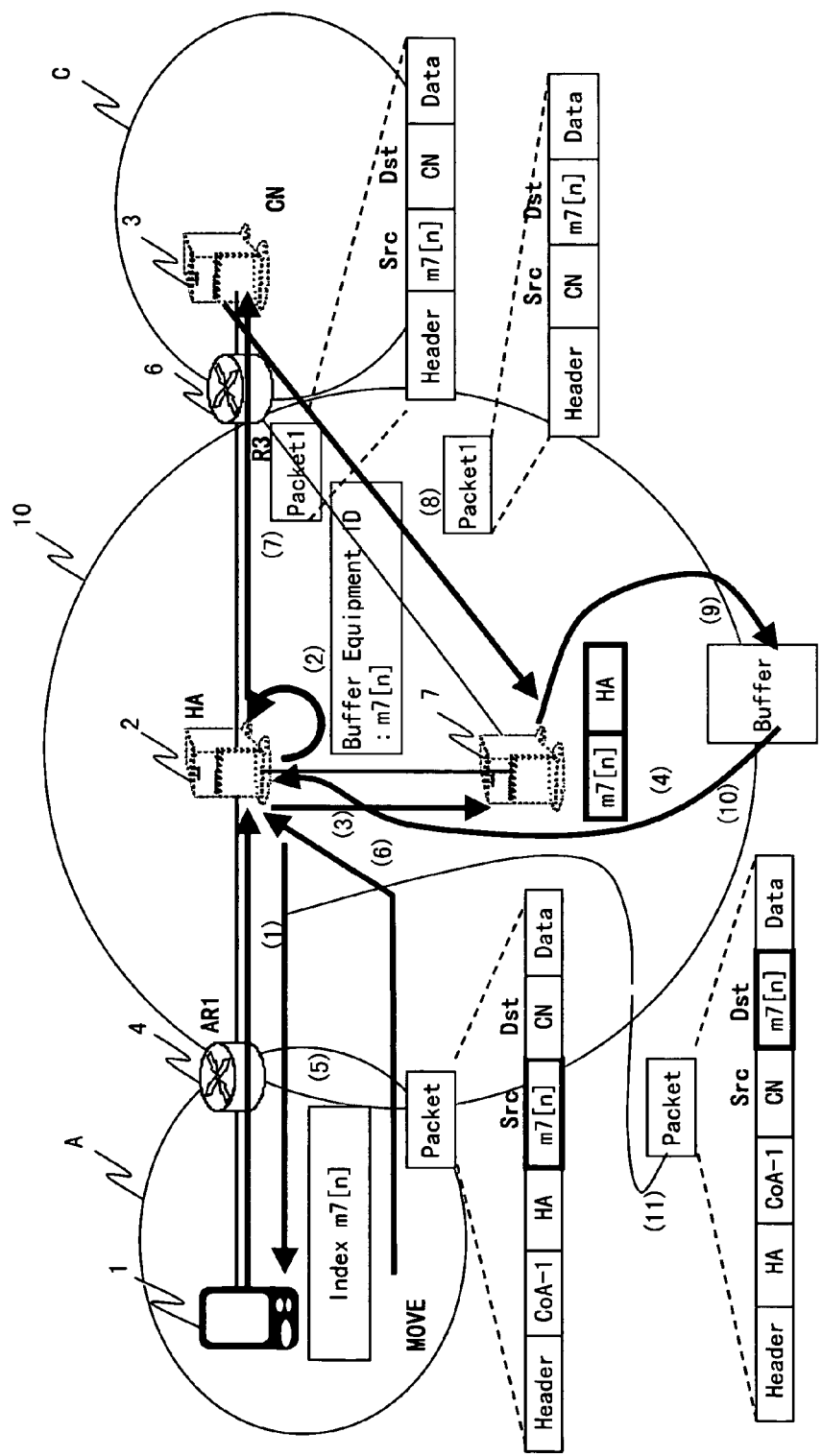
F I G. 2 5

DATA TRANSFER SYSTEM AND DATA TRANSFER METHOD

BACKGROUND OF THE INVENTION

1. Field of the Invention

The present invention relates to a data transfer method when transmitting and receiving data via a wireless communications network and a mobile node and a relay node that are used in the wireless communication network.

2. Description of the Related Art

FIG. 1 is a structure example of an existing network. A home agent (a mobile-supporting node, HA) 2 which is a relay node, access routers 4 and 5, and a router 6 are connected to the Internet 10. Suppose that a corresponding node (CN) 3 under a network C is transmitting data to a mobile node 1 through a relay node 2. Further, the mobile node 1 is under a wireless network A and is communicating with the corresponding node 3 through the access router 4. After the mobile node 1 becomes under a contiguous wireless network B due to the move or the like, it communicates through the access router 5.

FIG. 2 is a diagram explaining the operation at the time of a hand over occurrence.

(1) The mobile node 1 receives a router advertisement RA 1 from the access router 4.
(2) The mobile node 1 creates a care of address CoA-1.
(3) The mobile node 1 makes a location registration to the home agent 2.
(4) The home agent 2 relates a home address of the mobile node 1: HoA-1 and the care of address CoA-1 using a binding cache, and manages information that the mobile node 1 is currently under the wireless network A.
(5) The mobile node 1 moves to the wireless network B under the access router 5 from the wireless network A under the access router 4, and a hand over occurs.
(6) The mobile node 1 receives a router advertisement RA 2 from the access router 5.
(7) The mobile node 1 creates a care of address CoA-2.
(8) The mobile node 1 makes a location registration to the home agent 2.
(9) The home agent 2 relates the home address of the mobile node 1: HoA-1 and the care of address CoA-2 created by the mobile node 1 at step (7), using the binding cache of the mobile node 1, and manages them.

FIG. 3 is a diagram explaining a problem of a conventional technique when a hand over occurs. Since the operations in steps (1) to (4) in FIG. 3 are the same as in steps (1) to (4) in FIG. 2 respectively, a description thereof is omitted here and operations in steps from (5) onward will be described below.

(5) The mobile node 1 requests a streaming distribution from the corresponding node 3.
(6) The corresponding node 3 executes a process of the streaming distribution.
(7) A packet of the streaming distribution is transmitted to the mobile node 1 from the corresponding node 3.
(8) During the streaming distribution, the mobile node 1 moves to the wireless network B from the wireless network A, and a hand over occurs.

Here, the operations in steps (9) to (12) are corresponding to those in steps (6) to (9) in FIG. 2. With the operations in steps (9) to (12) in FIG. 3, the mobile node 1 under the wireless network B makes a location registration, and the home agent 2 relates the home address HoA-1 and the care of address CoA-2 and managed them.

(13) The mobile node 1 receives streaming information transmitted from the corresponding node 3.

In this case, the streaming information distributed in steps (9) to (12) could not be received by the mobile node 1. If there is a packet that is not received in these steps, a re-transmission processing is performed by the TCP protocol and it brings about a problem that network efficiency decreases.

The problem in the conventional technique in FIG. 3 will be described with reference to the sequence when a hand over occurs in FIG. 4. Each number indicated in FIG. 4 corresponds to each operation in FIG. 2. The mobile node 1 under the wireless network A, which is communicating through the access router 4, is receiving a packet of the streaming distribution from the corresponding node 3 at step (7), after requesting the streaming distribution at step (5). For simplification of the diagram, the data transmission of the streaming distribution from the corresponding node 3 to the mobile node 1 is shown only for a single packet. In practice, a plurality of packets are transmitted to the mobile node 1.

Here, the mobile node 1 moves to the wireless network B from the wireless network A in step (8). The mobile node receives a router advertisement from the access router 5 and makes a location registration. After the operations in steps (9) to (12), a packet of which destination is the CoA-2 is transmitted from the corresponding node 3. However, the streaming distribution continues to be made to the CoA-1 that is the destination before moving until the operations in steps (9) to (12) are completed. Therefore, since the packet could not be received by the mobile node 1, there arises a problem that packet loss could occur.

As a method for preventing the packet loss, there is a method of making the home agent of the relay node store the information during the hand over in the home agent using buffering in order to prevent the packet loss from occurring and making the mobile node resume receiving data from the first cell among the data that has not been received after the completion of the hand over (patent document 1, for example). Further, in the case of a hierarchical network, a method for specifying an optimum buffering point is disclosed (patent document 2, for example). A method for preventing the packet loss in the case where the home agent of the relay node is provided with a function of the buffering will be described with reference to FIG. 5.

FIG. 5 is a diagram explaining the operation of flow control when a conventional hand over occurs. Steps (1) to (6) in FIG. 5 are the same as in FIG. 3. Steps from (7) onward are shown as follows.

(7) The corresponding node 3 transmits information to be distributed.
(8) As for the information to be distributed, the home agent 2 assigns a sequence number to an outer header of an encapsulated packet to perform the packet buffering.
(9) The home agent 2 transmits the packet to the mobile node 1.
(10) The mobile node 1 retains and manages the sequence number of the received packet.

A hand over occurs at step (11). The mobile node 1 gives the sequence number of the received packet to data to be transmitted in step (14); however, the other steps (11) to (15) are the same as steps (6) to (9) in FIG. 2.

(16) Based on the data transmitted from the mobile node 1 in step (14), the home agent 2 transmits the packet having the corresponding sequence number out of buffered packets in step (8) to the mobile node 1.

After this, in the same manner as steps (8) and (9) in the wireless network A, in the wireless network B to which the mobile node moves, the home agent 2 transmits a packet to the mobile node 1 after assigning a sequence number to the packet to be transmitted and performing the packet buffering, in steps (17) to (19).

[Patent document 1] Japanese Unexamined Patent Publication No. 9-186704 (abstract, FIG. 1, paragraphs 0016 to 0018)

[Patent document 2] Japanese Unexamined Patent Publication No. 2003-69617 (abstract, FIG. 1, paragraphs 0011 and 0012)

In the method of preventing the packet loss by giving the sequence number to the packet, the home agent 2 needs to equally perform the buffering of all the packets distributed from the corresponding node 3 and prepare for the hand over or the like. The mobile node 1 also has to always manage the sequence number of the received packet. Due to this, in the conventional method, there has been a problem that throughput of the home agent or of the mobile node of a receiving node decreases.

Further, in such a case where there exist a plurality of communication destinations and there is a communication among them using a communication application or the like that is inadequate for the buffering, since the buffering is performed for all the communication data, there has been a problem that the process becomes slower.

Moreover, in such a case where a bandwidth of a network after the hand over of the mobile node 1 is narrow, throughput of transmitting the buffered packet to the mobile node 1 may decrease and the amount of packets to be buffered may exceed the buffer size in the home agent 2. There has been a problem that packets which fail to be buffered due to exceeding the buffer size or missing packets due to the change of radio wave strength in a wireless network cannot be compensated in this method.

SUMMARY OF THE INVENTION

It is an object of the present invention to prevent the possibility of occurrence of packet loss due to a hand over, degradation of radio wave strength, or the like.

In order to achieve the above object, a packet transfer method according to the present invention comprises, in a data transfer method using a communications network that comprises, at least, a mobile node, a corresponding node that distributes data to the mobile node, and a relay node that relays data transfer between the mobile node and the corresponding node, a step of requesting by the mobile node the relay node to initiate buffering data that is transmitted from the corresponding node; a buffering step of buffering at the relay node the data that is transmitted from the corresponding node and addressed to the mobile node; a buffer data request step of requesting by the mobile node the relay node to transmit the buffered data to the mobile node; and a buffer data transmission step of transmitting by the relay node the buffered data to the mobile node.

In this data transfer method, the relay node buffers the data that is transmitted from the corresponding node which is a transmitting node, based on a request from the mobile node which is a receiving node of the data in streaming distribution or the like. The relay node transmits the buffered data to the mobile node according to a buffering data request by timing the mobile node specifies. When there is a possibility of occurrence of packet loss, the relay node initiates buffering the packet according to a request for initiating the buffering from the mobile node, and transmits the buffered packet to the mobile node according to a buffered-data transmission request from the mobile node. Thus, the packet loss can be avoided.

The present invention is not limited to the packet transfer method described above, but can be applied to the relay node, mobile node, and data transfer system.

According to the present invention, occurrence of the packet loss due to a hand over, degradation of radio wave strength, or the like can be prevented. Furthermore, since the packet buffering is initiated according to the request for initiating the buffering from the mobile node and the packet is transferred according to the buffered-data transmission request from the mobile node, the mobile node does not need to always manage the sequence number of the received packet and a load on the mobile node is reduced.

BRIEF DESCRIPTION OF THE DRAWINGS

FIG. 16A is an example of a conventional BA message;

FIG. 18 is a diagram (part two) explaining a packet transfer method according to a sixth embodiment;

FIG. 25 is a diagram explaining a packet transfer method according to a twelfth embodiment;

DESCRIPTION OF THE PREFERRED EMBODIMENTS

Hereunder is a detailed description of the preferred embodiments according to the present invention with reference to the drawings.

Figure 6:
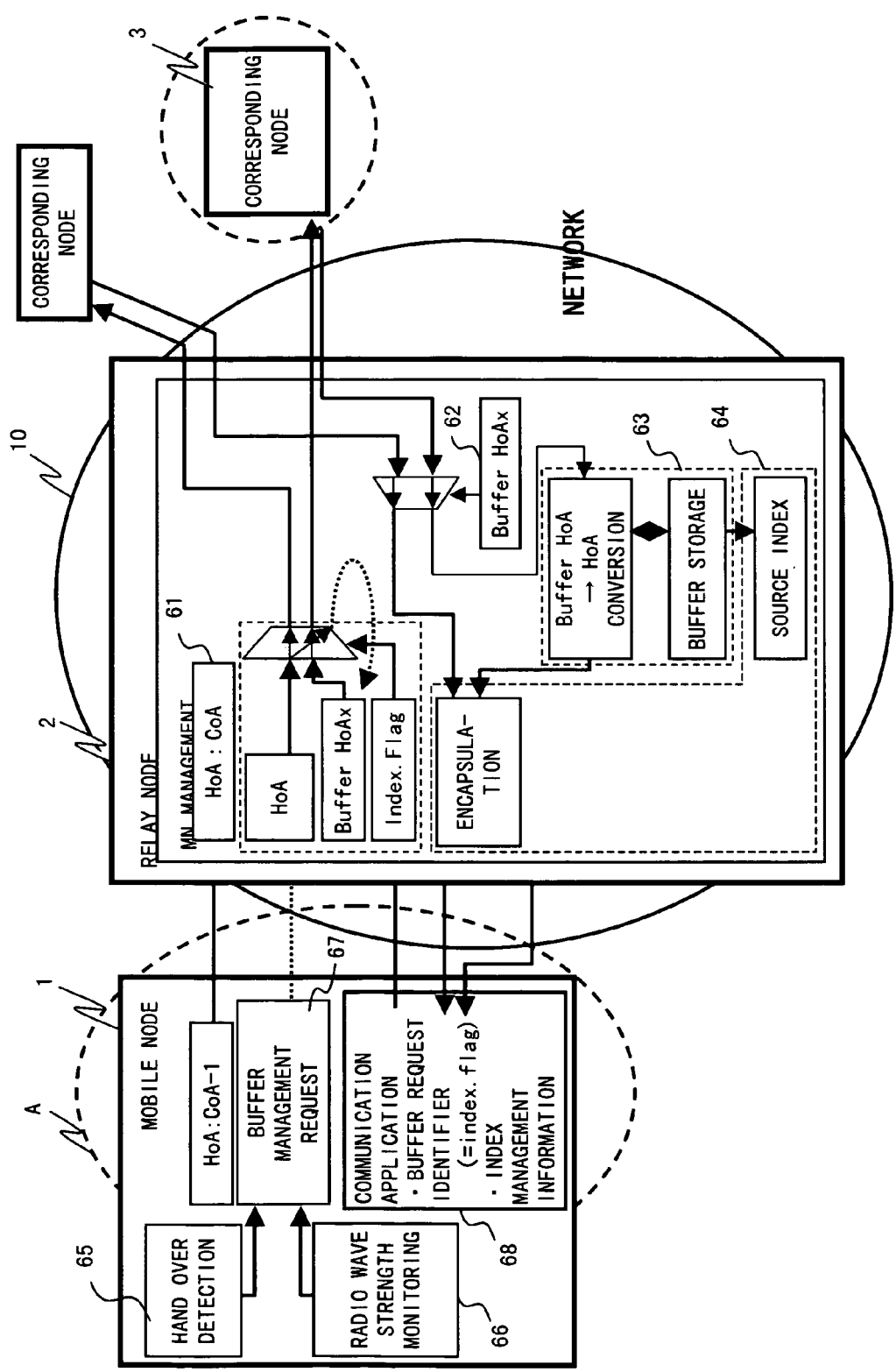
FIG. 6 is a diagram showing the principle of a packet transfer system according to the present invention.

FIG. 6 is a diagram showing the principle of a system according to the present invention. For example, a relay node such as a home agent 2 is connected to a network such as the Internet 10. A corresponding node (corresponding terminal) 3 connecting to the Internet 10 through a router or the like transmits data to a mobile node under a wireless network A. The mobile node 1 is connected to the Internet 10 through an access router (not shown).

The home agent 2 of the relay node comprises a buffer request identifier management unit 61, as a mobile node (MN) management unit, which manages a buffer request identifier such as an index flag managed between the mobile node 1 and the home agent 2; a BHoA creation unit 62 which creates a mirror address (Buffer Home Address, hereafter called BHoA) for buffering from a home address HoA; a storage unit 63 which replaces the BHoA with a home address HoA as an address of a packet received from the corresponding node and stores the resulting data in a buffer; and a notification/transmission unit 64 which transmits the packet in the buffer to the mobile node 1 and encapsulates a message, on the basis of index information.

The mobile node 1 comprises a hand over detection unit 65 which detects a hand over occurrence; a radio wave strength monitoring unit 66 which monitors radio wave strength; a buffer management request unit 67 which requests the home agent 2 to perform buffering of a packet transmitted from the corresponding node 3; and a management unit 68 which manages the buffer request identifier such as the index flag received from the home agent 2 and the index of the packet received from the corresponding node 3, etc. and updates information.

Figure 7:
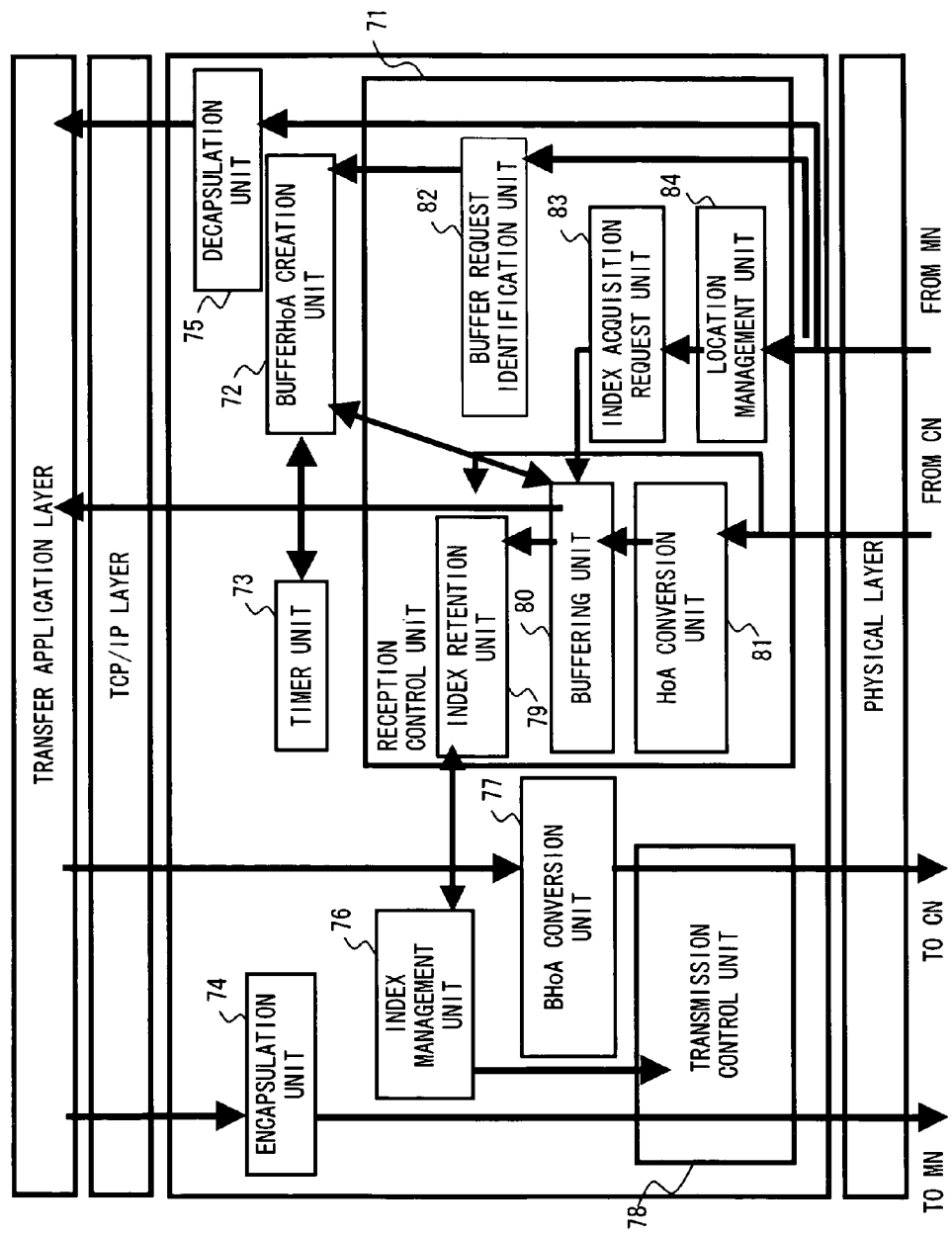
FIG. 7 is a diagram showing the principle of a relay node according to the present invention.

FIG. 7 is a diagram showing the principle of the relay node such as the home agent according to the present invention. The relay node such as the home agent comprises, in a layer between a TCP/IP layer and a physical layer, a reception control unit 71 which receives data transmitted from the mobile node or the corresponding node; a transmission control unit 78 which transmits data to the mobile node or the corresponding node; a BHoA creation unit 72 which creates the BHoA; a timer unit 73 which performs timer management of the BHoA creation unit; an encapsulation unit 74 which encapsulates the packet; a decapsulation unit 75 which decapsulates the packet; an index management unit 76 which manages the index which is location information of the packet; and a BHoA conversion unit 77 which converts the home address HoA to the buffer home address BHoA.

The reception control unit 71 comprises an HoA conversion unit 81 which replaces the BHoA with the HoA as the destination of the packet received from the corresponding node 3; a buffering unit 80 which stores the packet of which destination is converted to the HoA; an index retention unit 79 which manages the index of the packet in the buffer; a location management unit 84 which manages a wireless network where the mobile node 1 is located; an index acquisition request unit 83 which acquires the index information of the packet that the mobile node 1 requests; and a buffer request identification unit 82 which identifies a buffer registration request which requests the buffering and makes each unit execute a process.

Figure 8:
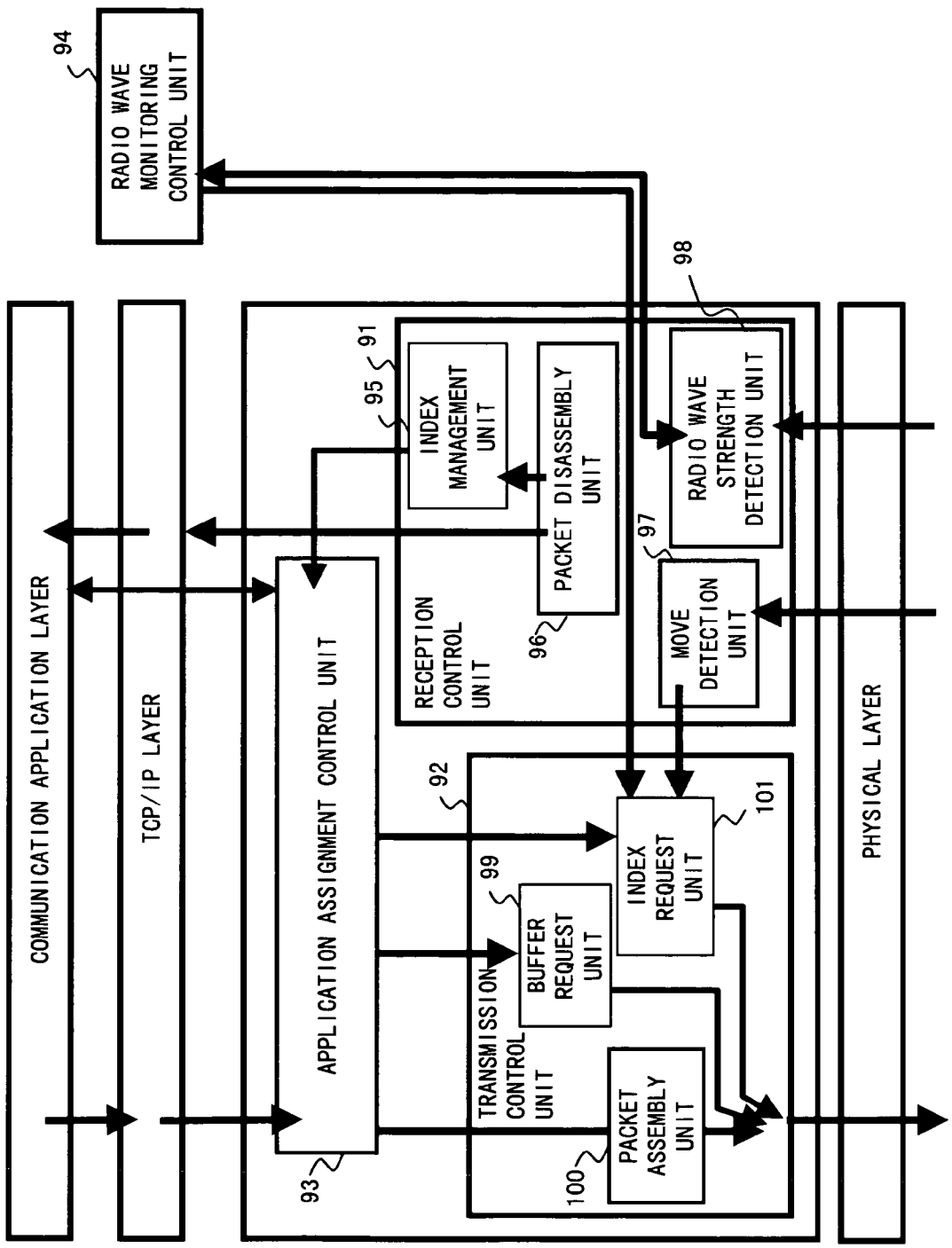
FIG. 8 is a diagram showing the principle of a mobile node according to the present invention.

FIG. 8 is a diagram showing the principle of the mobile node according to the present invention. The mobile node comprises, in a layer between a TCP/IP layer and a physical layer, a reception control unit 91 which receives data; a transmission control unit 92 which transmits data; and an application assignment control unit 93 which assigns a communication application.

The reception control unit 91 comprises a move detection unit 97 which detects a hand over occurrence; a radio wave strength detection unit 98 which detects a change of radio wave strength; a packet disassembly unit 96 which disassembles the received packet; and an index management unit 95 which manages the index of the packet that the home agent 2 is requested to transfer. Further, the radio wave strength detection unit 98 in the reception control unit 91 detects and acquires the radio wave strength in accordance with a request from a radio wave monitoring control unit 94 as an application of the TCP/IP layer.

The transmission control device 92 comprises a buffer request unit 99 which requests the buffering of the packet; a packet assembly unit 100 which assembles the packet; and an index request unit 101 which requests transfer of the packet in the buffer from a relative location specified by the mobile node 1.

First Embodiment

Figure 1:
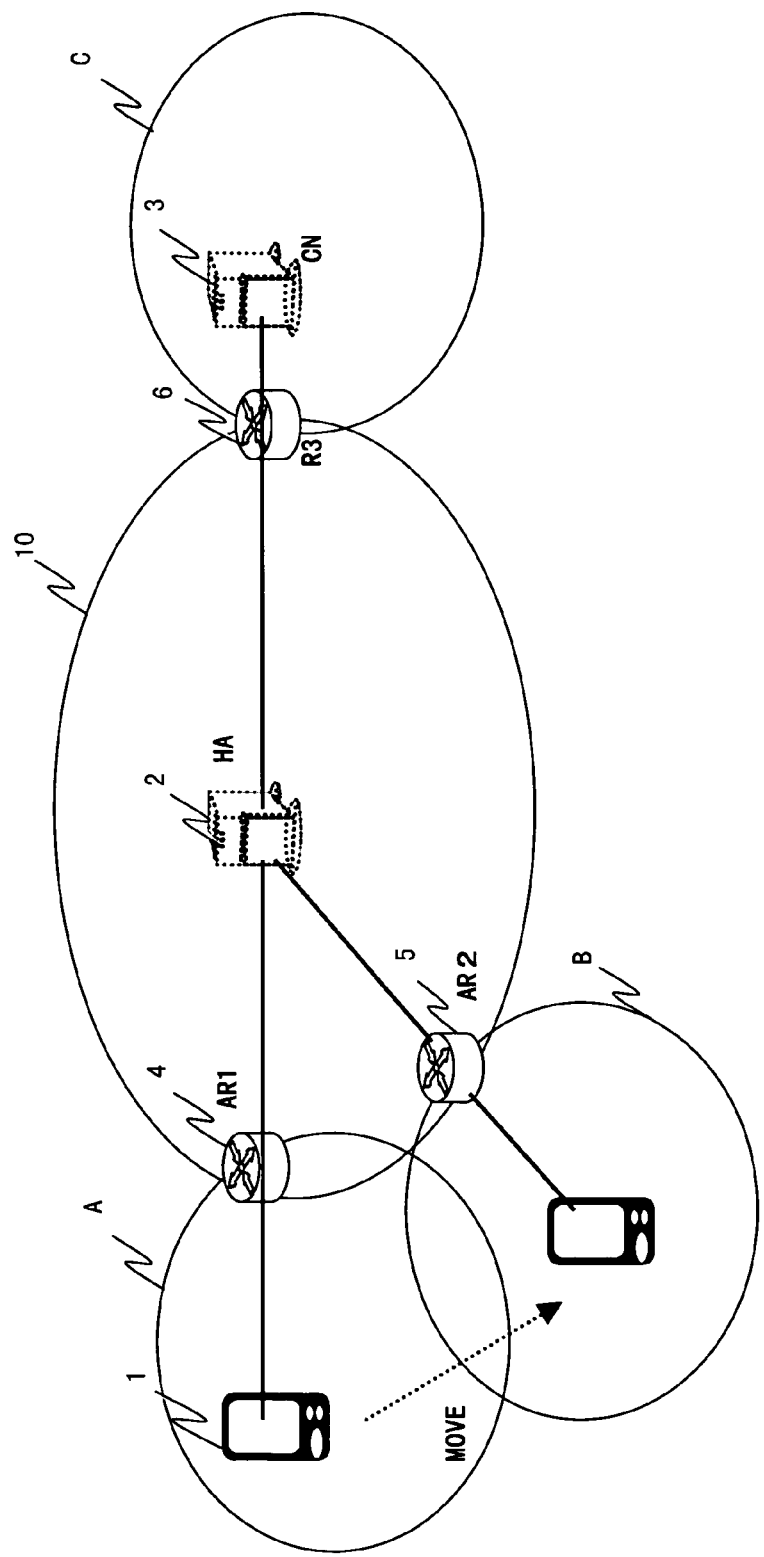
FIG. 1 is a structure example of the existing network.
Figure 2:
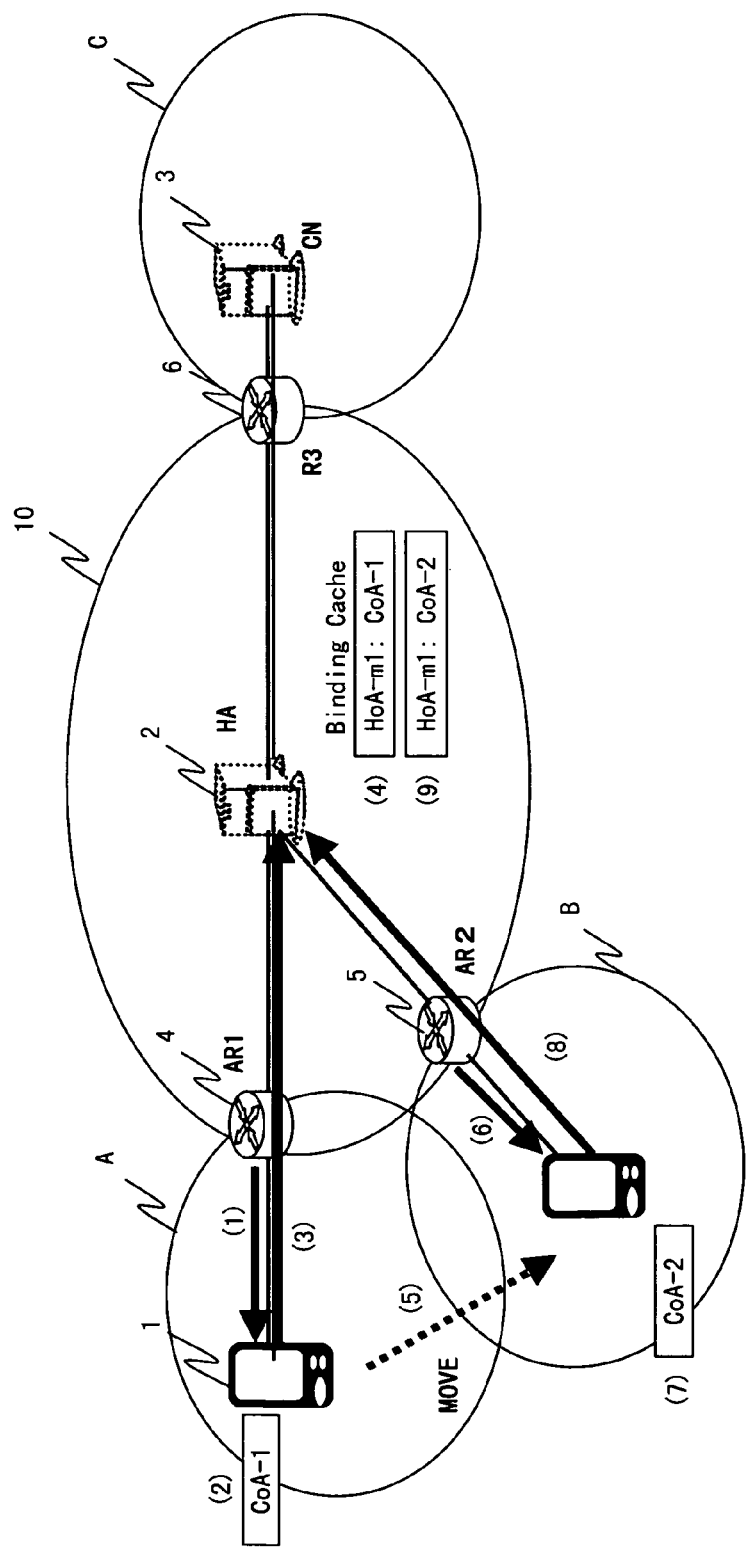
FIG. 2 is a diagram explaining the operation when a hand over occurs in a conventional technique.
Figure 3:
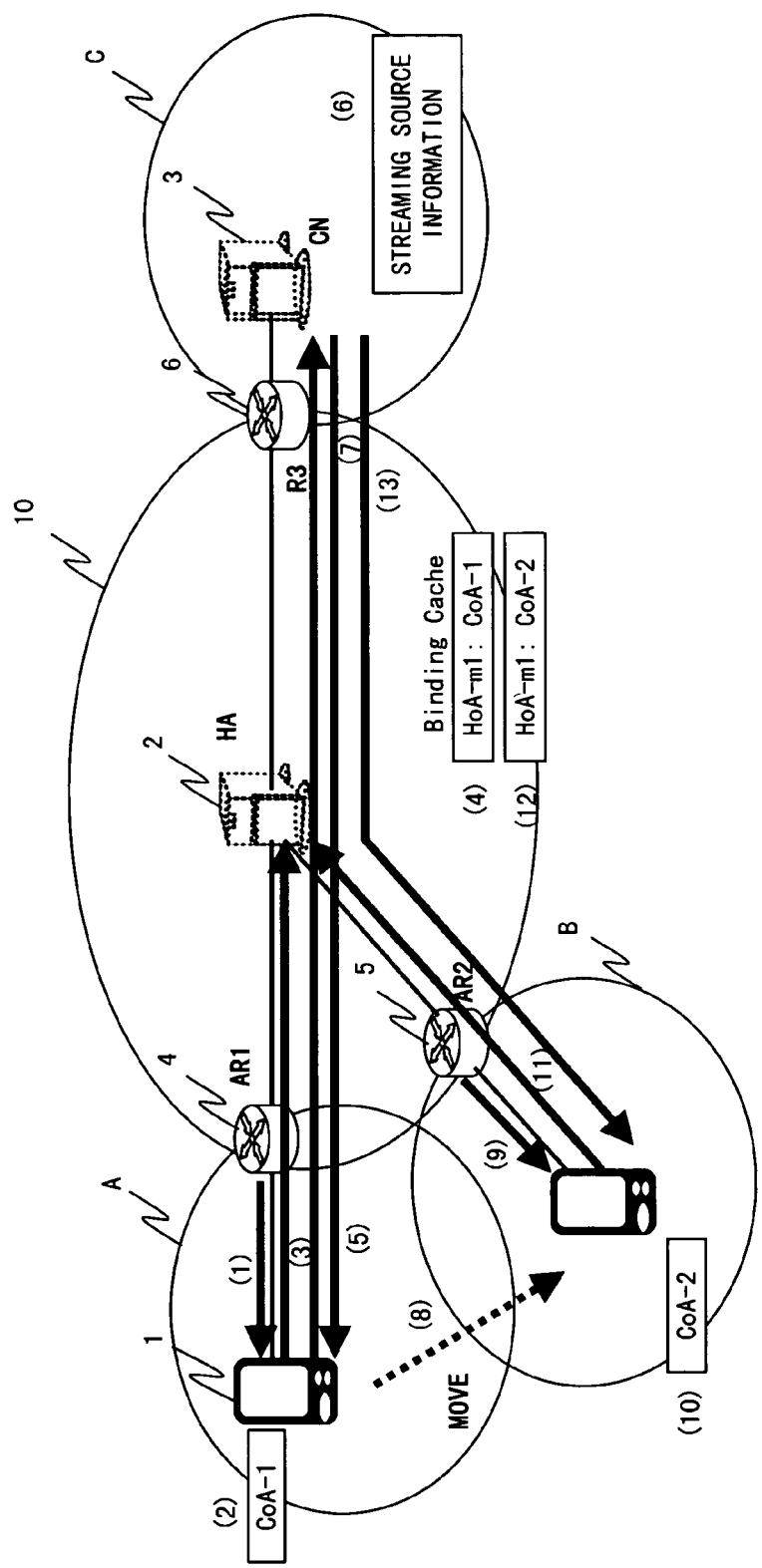
FIG. 3 is a diagram explaining a problem of a conventional technique when a hand over occurrence.
Figure 4:
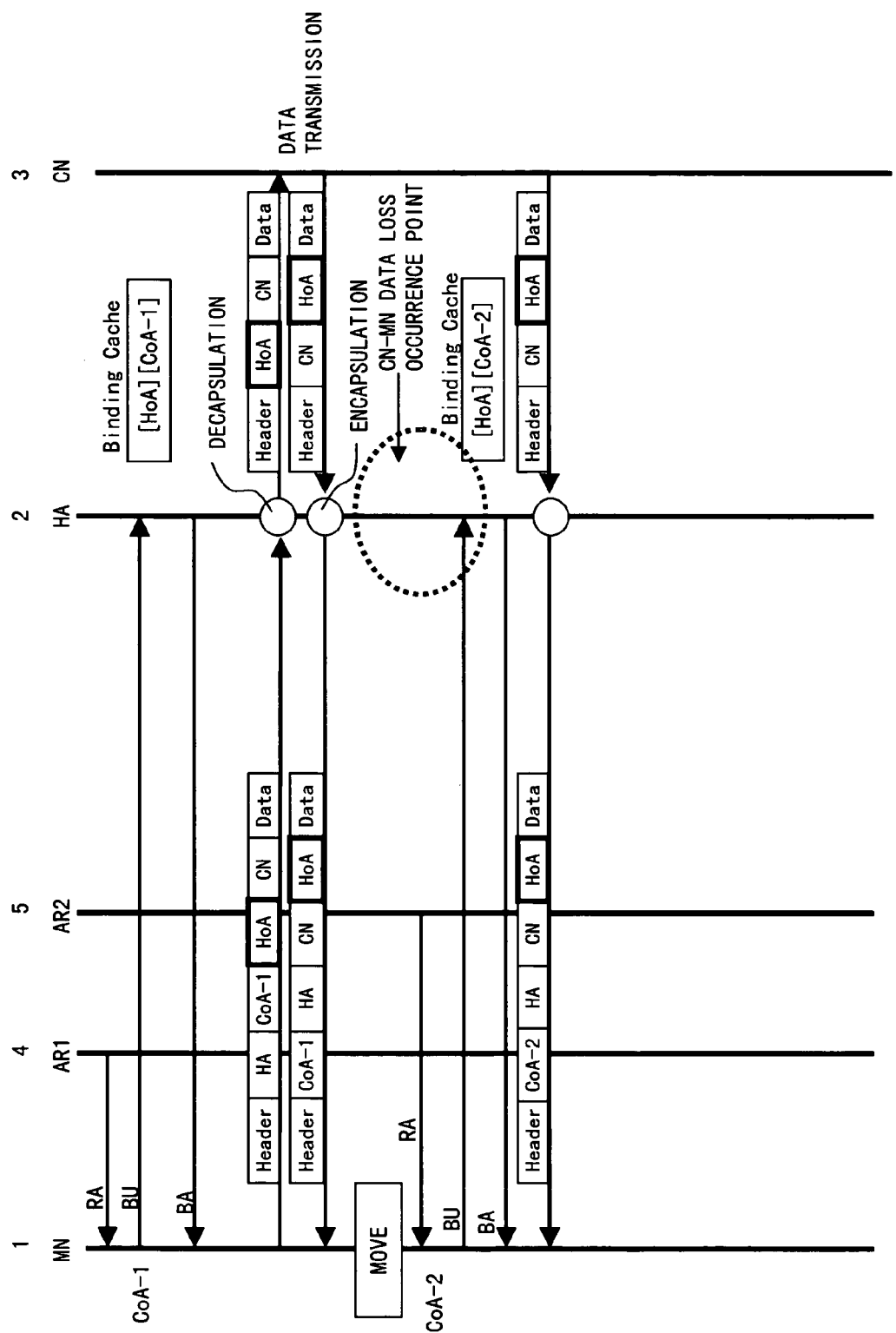
FIG. 4 is the sequence when a hand over occurs in a conventional technique.
Figure 5:
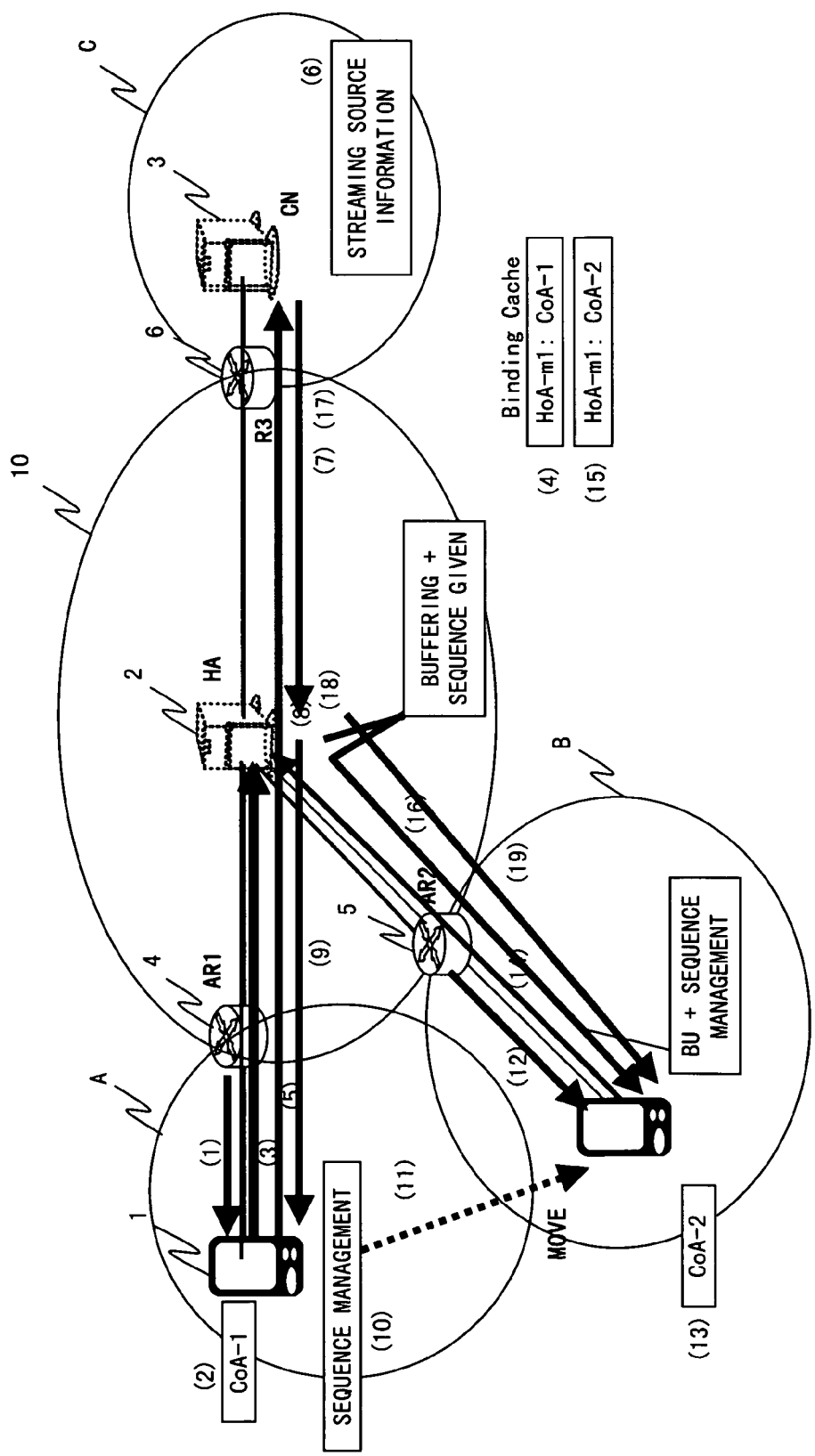
FIG. 5 is a diagram explaining the operation of flow control at the time of a conventional hand over occurrence.
Figure 9:
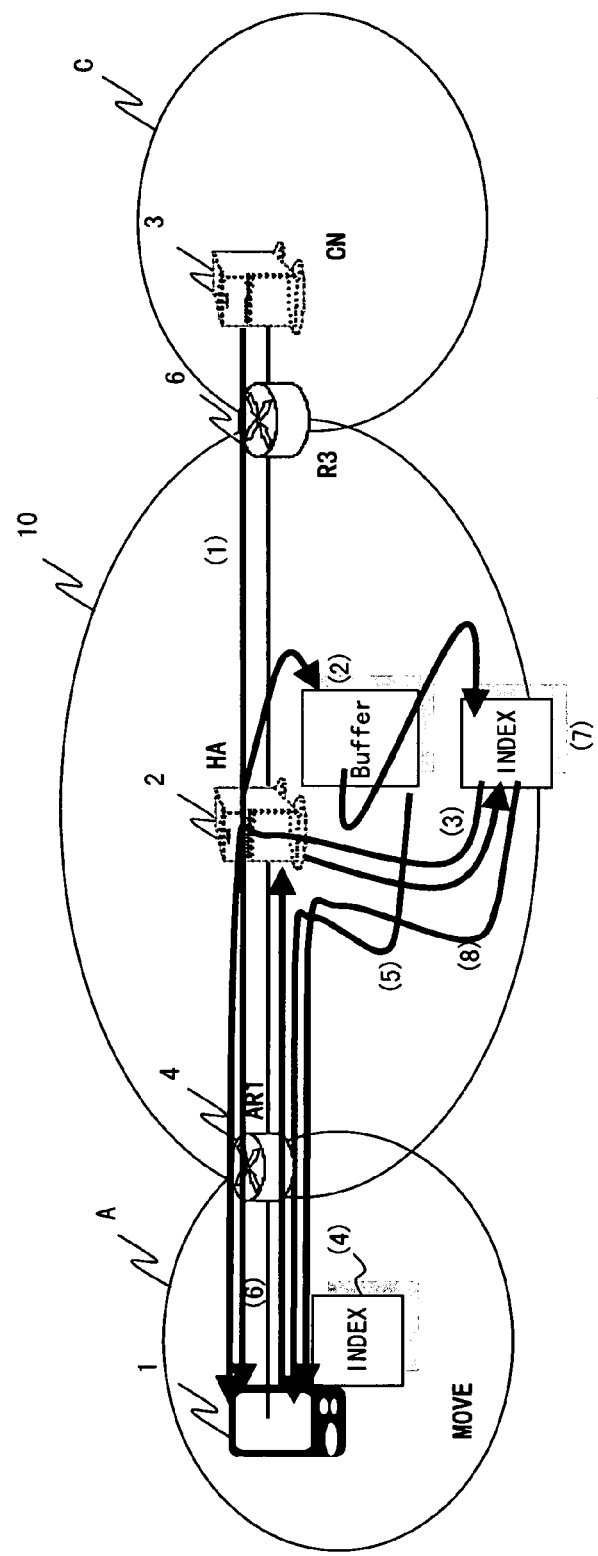
FIG. 9 is a diagram explaining a packet transfer method according to a first embodiment.

FIG. 9 is a diagram explaining a method in which a home agent of a relay node transmits a buffered packet to a mobile node by a request from the mobile node. In the same way as FIG. 1, a home agent (a mobile-supporting node, HA) 2 which is a relay node, access routers 4 and 5, and a router 6 are connected to the Internet 10. Suppose that a corresponding node (CN) 3 under a network C is transmitting data to a mobile node 1 through the relay node 2. Further, the mobile node 1 is under a wireless network A and is communicating with the corresponding node 3 through the access router 4. In practice, a plurality of mobile nodes are connected to the Internet 10 through the access router; however, to be simplified for explanation, FIG. 9 shows only a single mobile node. Furthermore, the network C is not limited to a wireless network. These also apply to the embodiments below.

The following is the method in which the home agent 2 transmits the buffered packet to the mobile node, in this embodiment.

(1) The corresponding node 3 is transmitting data (a packet) to the mobile node 1 through the home agent 2.
(2) With a specified timing, the mobile node 1 makes the home agent 2 initiate the buffering of the packet transmitted from the corresponding node 3.
(3) The home agent 2 transmits to the mobile node 1 index information which is the information regarding buffer packet transfer from the home agent 2.
(4) The mobile node 1 receives the index information which is required for communication of the packet buffered in the home agent 2 and manages it.
(5) The home agent 2 transmits to the mobile node 1 a message addressed to the mobile node 1 received from the corresponding node 3 after transmitting the index information at step (3).
(6) The mobile node 1 requests the home agent 2 to transmit the buffered packet to the mobile node 1 using the index information. The index information includes information such as a source of the packet, an offset of the buffered packet and the like.
(7) The home agent 2 transmits the packet to the mobile node 1 referring to the index information.

According to the packet transfer method of this embodiment, the mobile node makes a request to the relay node such as the home agent for the timing of buffering and the packet to be transmitted. Since the buffering or the transfer of the buffered data is initiated on the basis of the request or the index information transmitted from the mobile node, it is not necessary for the mobile node to always watch the received packet, so that a load on the mobile node is reduced.

Second Embodiment

In this embodiment, the home agent creates a home address for transmitting and receiving the buffered packet when starting a packet buffering. In a packet transfer method according to this embodiment, a description of the system structure and the processes that are a repetition of those in the first embodiment is omitted here.

Figure 10:
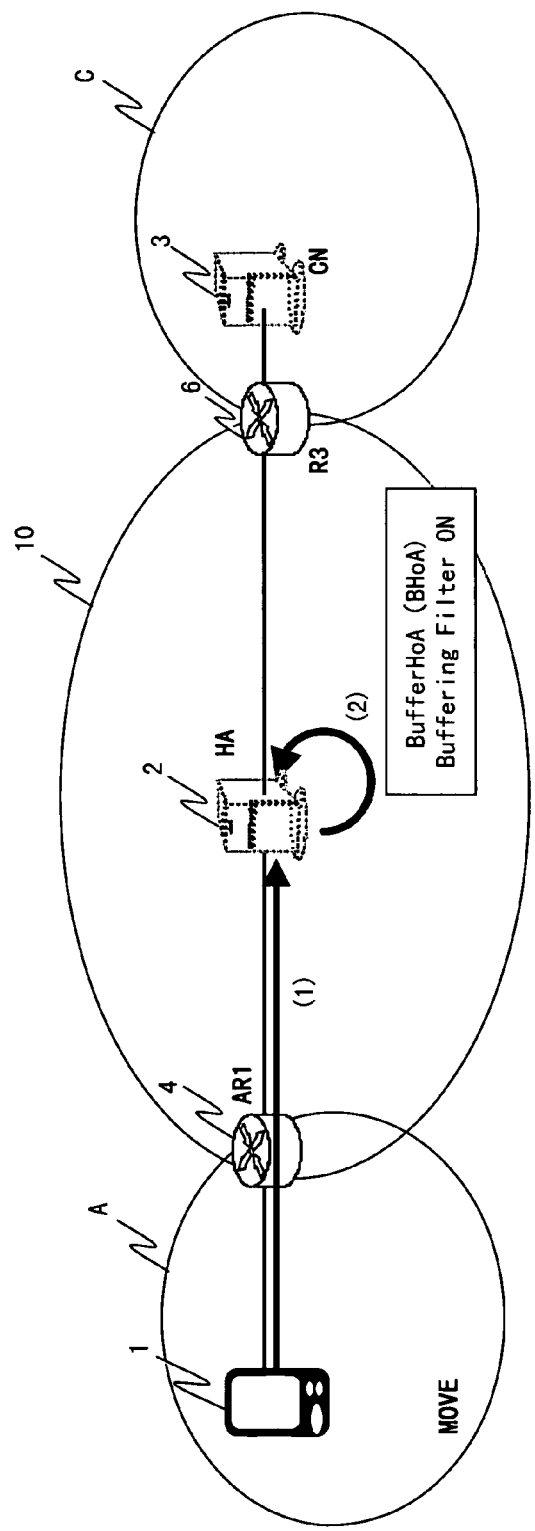
FIG. 10 is a diagram explaining a packet transfer method according to a second embodiment.

FIG. 10 is a diagram explaining a method for managing an address used for transmission and reception of the packet buffered in the home agent. Steps corresponding to numbers in parentheses in FIG. 10 are described as follows.

(1) The mobile node 1 transmits a buffer registration request message which requests the home agent 2 to buffer the packet. This buffer registration request message corresponds to the specified timing in step (2) of the first embodiment.
(2) The home agent 2 creates a buffering home address (hereafter called BHoA) for performing the buffering and initiates the process from step (2) onward in the first embodiment. As the BHoA, for example, a mirror address of a home address (hereafter called HoA) of the mobile node 1 is employed.

The home agent 2 uses the BHoA created in the above step (2) as the address of the packet to be buffered, making the corresponding node 3 a source. The packet to be buffered is communicated using the BHoA other than the HoA. Therefore, at the instant of transferring the buffered packet from the corresponding node 3, for example, another corresponding node can transmit a packet to the mobile node 1 through the home agent 2.

Third Embodiment

In this embodiment, furthermore, in communication of a packet of streaming distribution, etc. transmitted from the corresponding node 3, the mobile node 1 which is a receiving node for the packet transmits to the corresponding node 3 a message including the index information which the mobile node receives from the home agent 2 to manage. In the same way as the second embodiment, since the system structure is the same as in the first embodiment, a description thereof is omitted here. In the embodiments below as well, a description of the same system structure is omitted.

Figure 11:
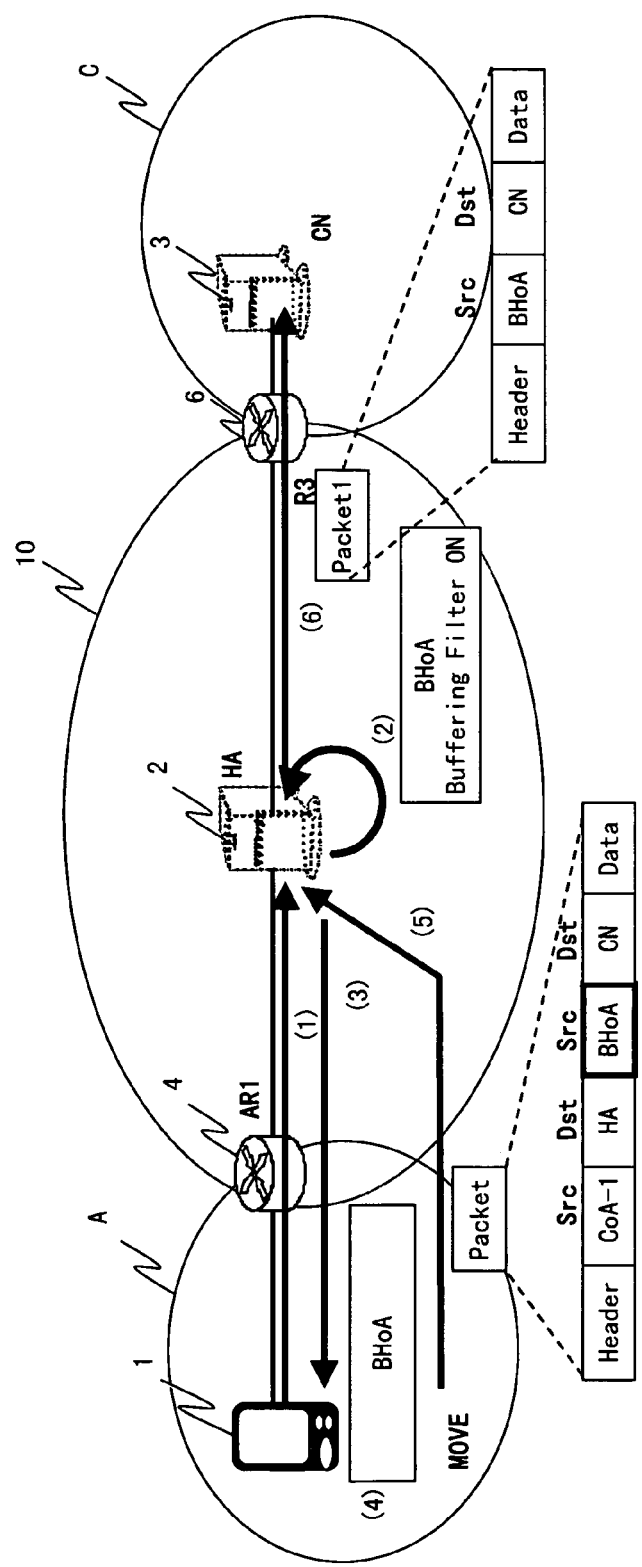
FIG. 11 is a diagram explaining a packet transfer method according to a third embodiment.

FIG. 11 is a diagram explaining a method of using a code for transmission and reception of the buffered packet. In the steps indicated with parentheses in FIG. 11, steps (1) and (2) are the same as (1) and (2) in FIG. 10 respectively; therefore, a description thereof is omitted here, and steps from (3) onward will be described.

(3) The home agent 2 transmits and notifies the created BHoA to the mobile node 1.
(4) The mobile node 1 relates the received BHoA with a communication application requiring for the buffering and manages it.
(5) The mobile node 1 transmits a packet to a corresponding node corresponding to the BHoA, as source information of data sent to the corresponding node 3 in communication of the buffered packet, after replacing the HoA with the BHoA as indicated by bold lines in the packet of (5) in FIG. 11.
(6) The home agent 2 transmits a request of (5) from the mobile node 1 to the corresponding node 3 as a request from the buffering home address BHoA.

The mobile node 1 manages the BHoA created at the home agent. After the completion of the process by the buffer registration request, in a message transmitted from the mobile node 1 to the corresponding node 3, the home address HoA of the mobile node as the source of the packet is replaced with the buffering home address BHoA created in (2).

Figure 12:
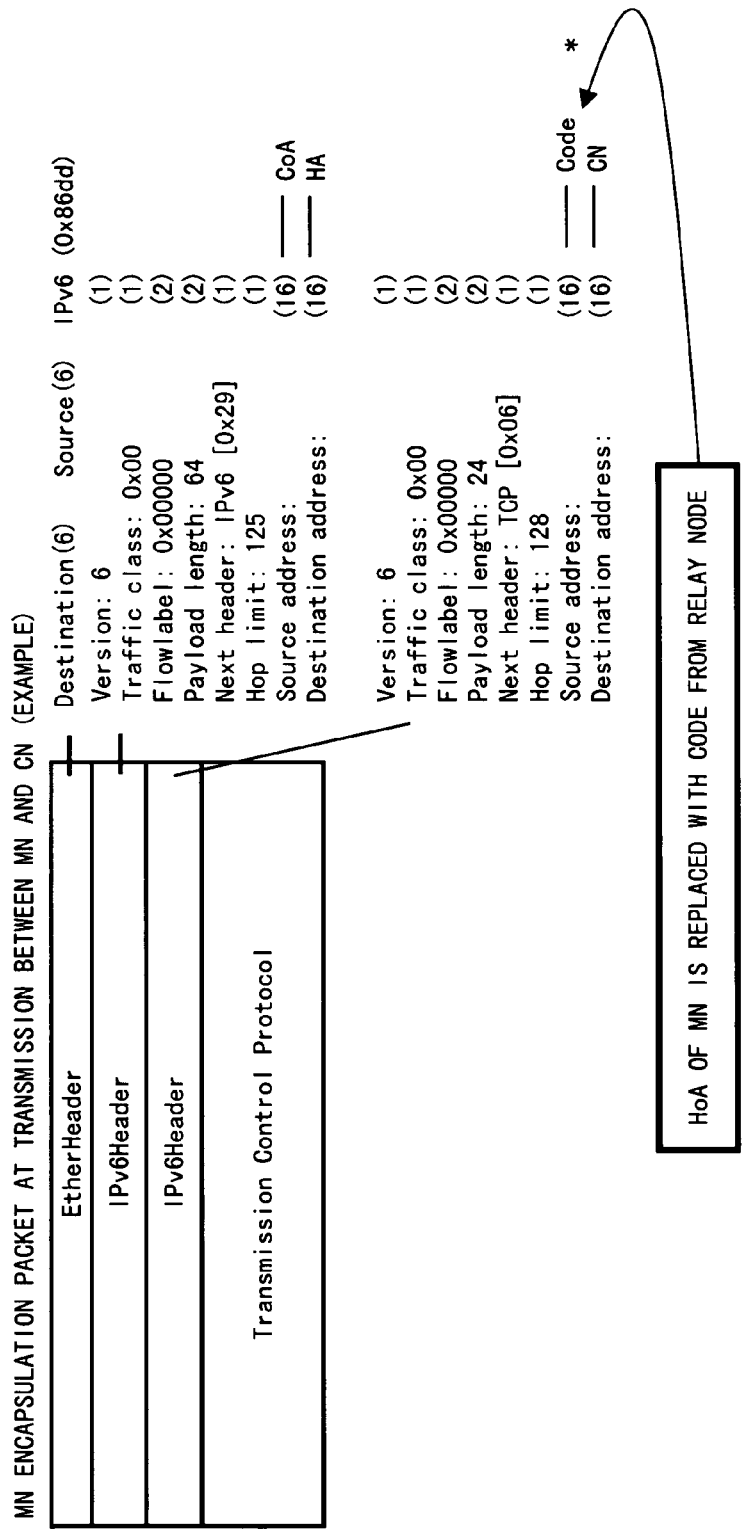
FIG. 12 is a structure example of an encapsulated packet after a buffering request.

FIG. 12 is a structure example of an encapsulated packet of a message which is created at (2) in the second embodiment and the third embodiment and transmitted by the mobile node 1 at (5). The message which the mobile node 1 transmits in (5) is hereafter referred to as a buffering request. In a buffering request message in FIG. 12, "Code" is stored in Source address indicated with *. In this embodiment, the BHoA is stored as Code.

As described above, according to the packet transfer method of this embodiment, the mobile node transmits the buffering request message to the home agent using the index information notified from the home agent. The home agent can recognize that the buffering is requested according to the BHoA included in the message.

Fourth Embodiment

This embodiment differs from the second embodiment in that a code other than the buffer home address BHoA in the second embodiment is employed in this embodiment as an identifier recognized between the mobile node and the home agent.

Figure 13:
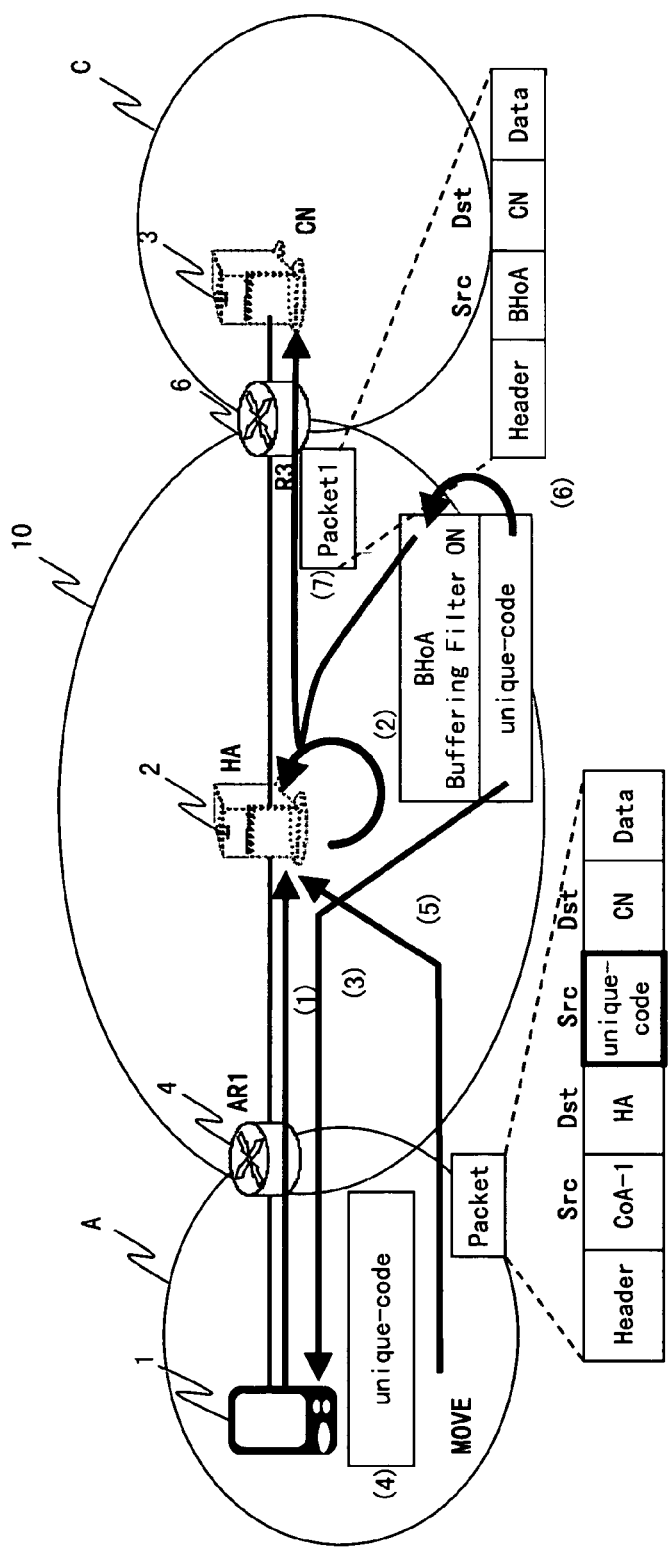
FIG. 13 is a diagram explaining a packet transfer method according to a fourth embodiment.

FIG. 13 is a diagram explaining a method of setting the packet buffering using a unique code created at the home agent. Step (1) in FIG. 13 is the same as in the third embodiment of FIG. 11, and regarding steps from (2) onward, different points from the third embodiment will be mainly described.

(2) The home agent 2 creates a BHoA and assigns a unique code related with the BHoA.

(3) The home agent 2 transmits the unique code to the mobile node 1.

(4) The mobile node 1 relates the unique code with a communication application and manages it.

(5) The mobile node 1 replaces a home address HoA used in regular communication with the corresponding node with the unique code, and transmits a buffering request message to the home agent 2.

(6) The home agent 2 replaces the unique code in the buffering request message received from the mobile node 1 in step (5) with the BHoA.

(7) The home agent 2 transmits to the corresponding node 3 the packet from the mobile node 1.

In this embodiment, the mobile node 1 transmits the buffering request message to the home agent 2 using the unique code assigned by the home agent 2. The unique code is not limited to a mirror of a home address but can be set more flexibly. Further, in this embodiment, a description is made of the case where the unique code is stored in the location indicated with * in FIG. 12; however, this unique code can be assigned to a field besides an HoA field flexibly. Therefore, data length used for the code is variable, and thus it is effective for reducing the data amount of the message.

Fifth Embodiment

In this embodiment, the buffering request message is given a flag and transmitted. This embodiment differs from the previous embodiment in transmitting the buffering request message using data other than source information of the packet.

Figure 14:
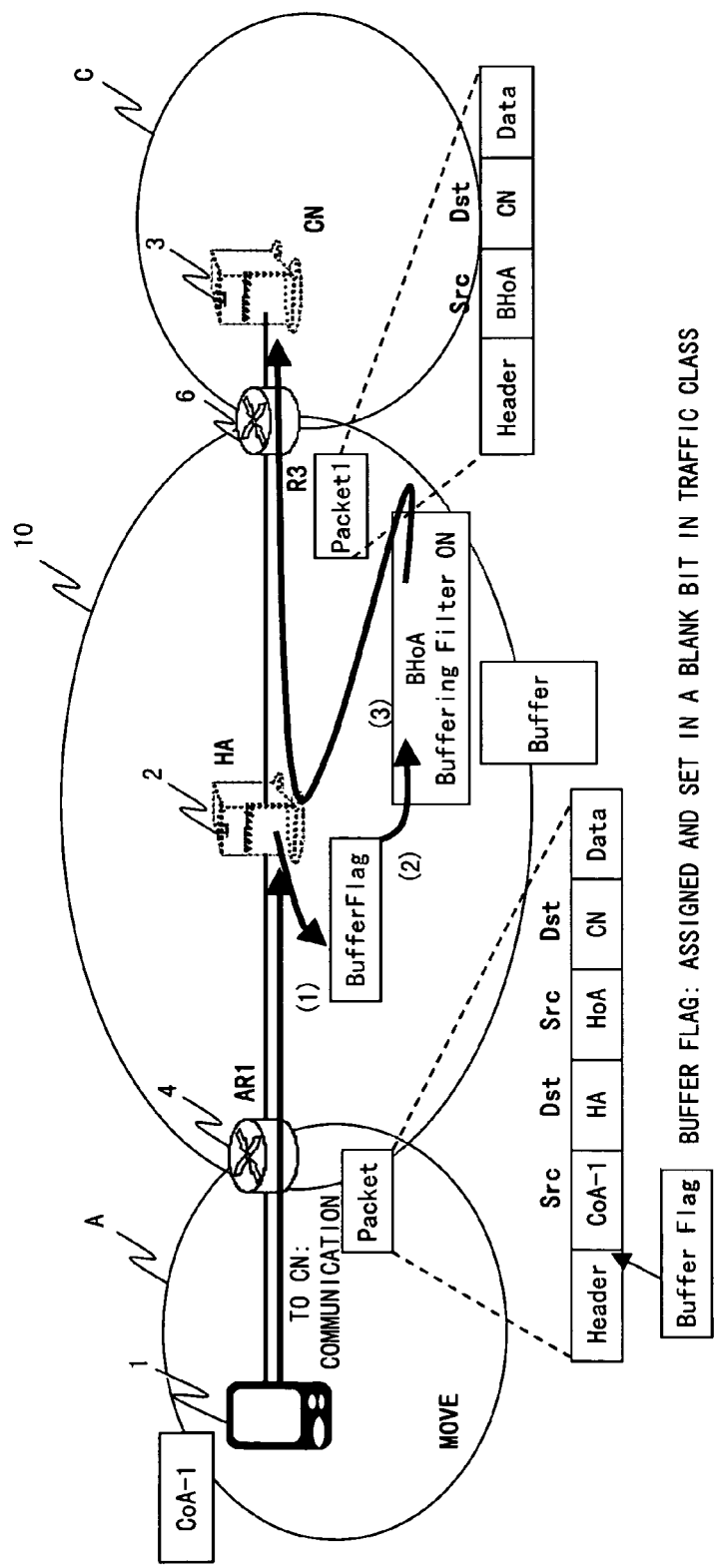
FIG. 14 is a diagram explaining a packet transfer method according to a fifth embodiment.

FIG. 14 is a diagram explaining a method of setting the packet buffering using a flag. As a precondition for the process in FIG. 14, assume that the home agent creates a buffer home address BHoA beforehand and manages it.

(1) The mobile node 1 gives a buffer flag to the buffering request message to be transmitted to the home agent 2 and transmits it.

(2) The home agent 2 recognizes the buffer flag.

(3) The home agent 2 replaces the field of the home address HoA that has been decapsulated with the BHoA, and transmits the data to the corresponding node 3.

The home agent recognizes the buffering request by the message given the specified flag. Through the use of the flag, the data length of the packet can be further reduced.

Figure 15:
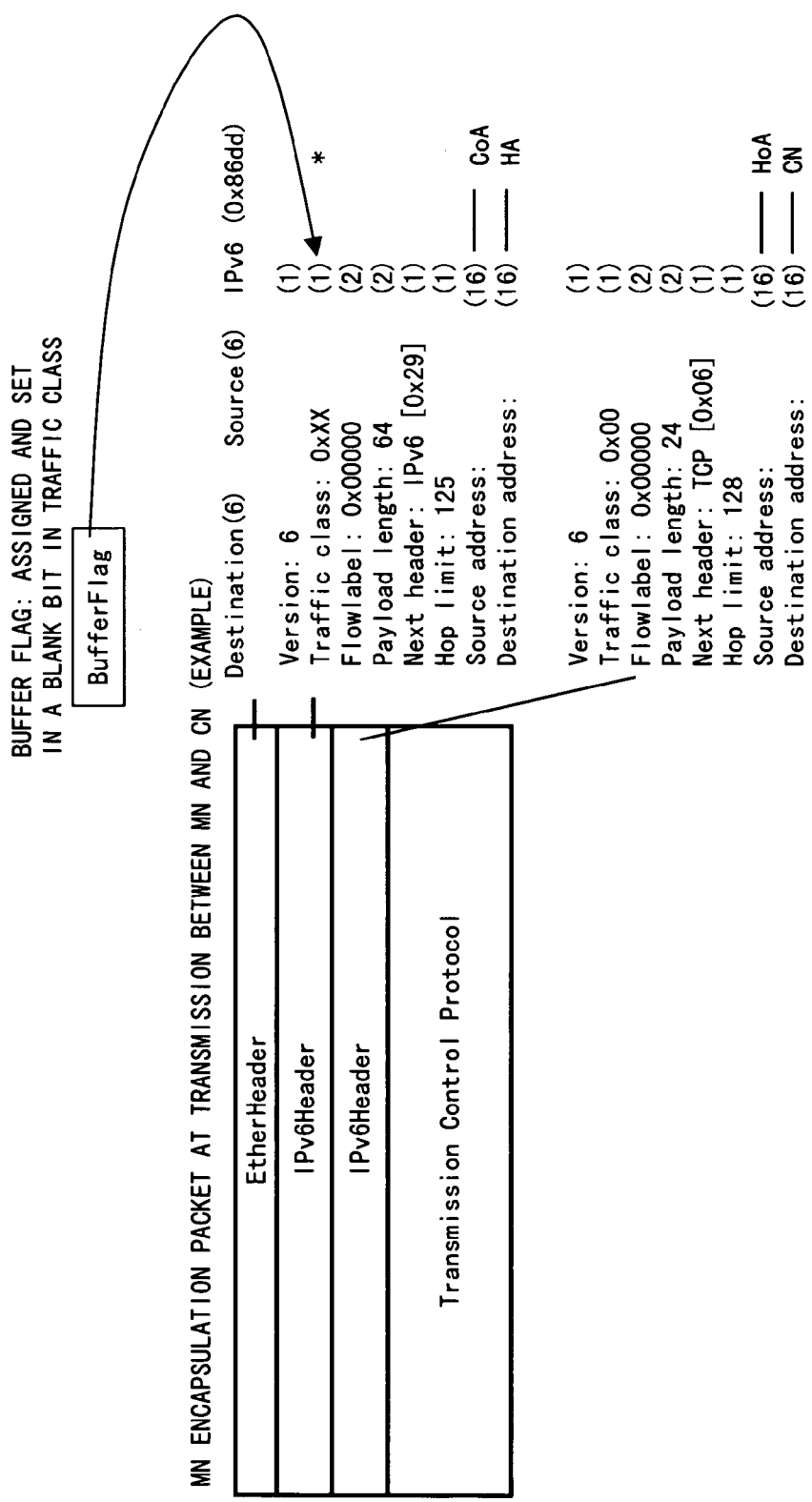
FIG. 15 is an example of a message of a buffering request to which a flag is given.

FIG. 15 is an example of the buffering request message to which the flag is given. The mobile node can make the buffering request using a short data length such as a bit in a blank field, as Traffic class, for example, indicated with * in FIG. 15.

In the packet transfer method described in the first to fifth embodiments, for example, using a BA (Binding Acknowledge) message with which the home agent 2 notifies the mobile node 1 that the location registration has been completed, the home agent 2 notifies the mobile node 1 of whether the home agent transfers the packet using a BHoA, a unique code, or a flag.

Figure 16B:
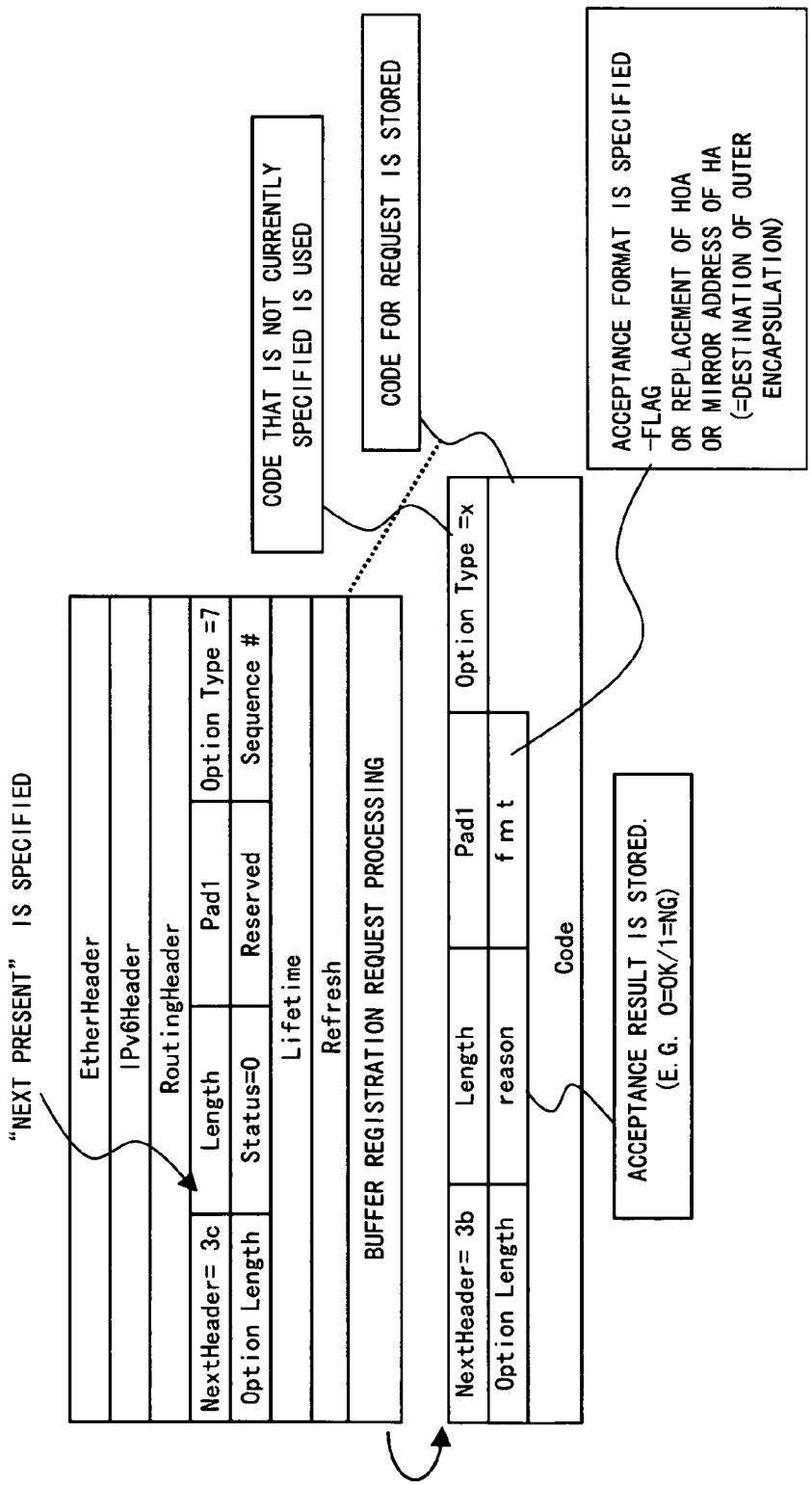
FIG. 16B is an example of a BA message in the case of including a code used at the time of executing a packet transfer method.

FIG. 16A is an example of a conventional BA message. FIG. 16B is an example of a BA message in the case of including a code used at the time of notifying a manner for transferring the packet.

Compared to FIG. 16A, in the BA message used in the first to fifth embodiments of FIG. 16B, "3c (next present)" is stored in Next Header and information regarding buffer registration request processing is added. As for the information regarding buffer registration request processing, a predetermined value is stored into "fmt" data, concerning which format is used out of a BHoA, a unique code and a flag. By receiving the BA message in FIG. 16B, the mobile node 1 is notified of a code that is used when communicating the buffered packet between the home agent 2 and the mobile node 1.

As described above, according to the packet transfer method of this embodiment, by the flag that the mobile node has given the packet, the home agent recognizes that the message requests the buffering. The mobile node can make the home agent recognize the buffering request with smaller amount of data than in the previous embodiment.

Sixth Embodiment

In this embodiment, a description will be made of a process in which upon receiving the buffering request described in the above embodiment, the home agent initiates the buffering of the packet that is transmitted to the home agent from the corresponding node which is a transmitting node, and transmits it to the mobile node.

Figure 17:
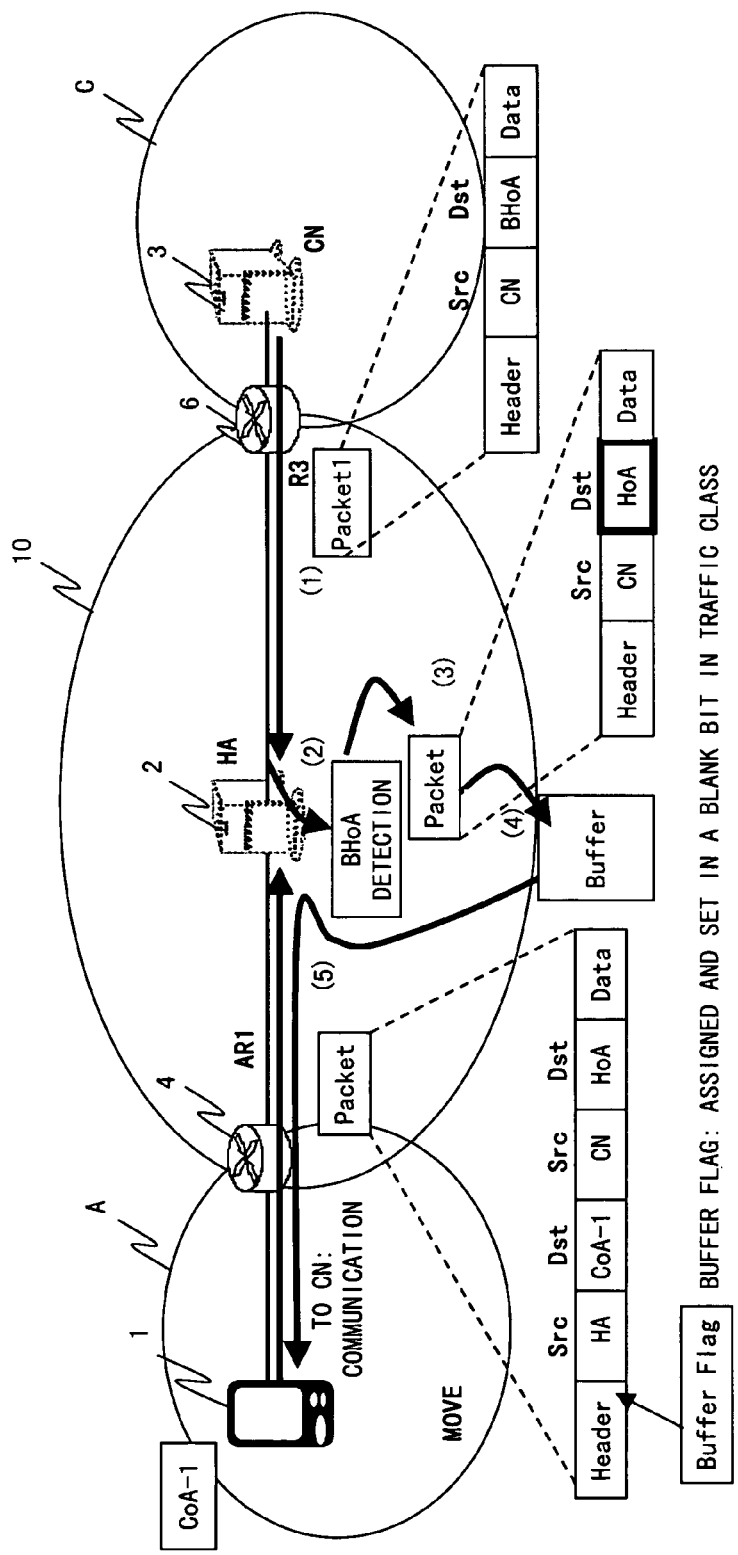
FIG. 17 is a diagram (part one) explaining a packet transfer method according to a sixth embodiment.

FIG. 17 is a diagram explaining a method in which the corresponding node transmits a packet to be buffered and the home agent gives a predetermined flag to the packet and transfers it to the mobile node. In FIG. 17, assume that the mobile node has been already notified of the manner for transferring the packet in the fifth embodiment.

The following is a method in which communication of the packet to be buffered between the corresponding node 3 and the home agent 2 is performed in this embodiment.

(1) The corresponding node 3 of a transmitting node transmits a packet of which destination is a BHoA.

(2) The home agent 2 recognizes the BHoA of the packet.

(3) The home agent 2 replaces the BHoA of the destination of the received packet with the home address HoA.

(4) The home agent 2 performs the packet buffering.

(5) The home agent 2 reads out the buffered packet to encapsulate it, and transmits it given a predetermined flag. The flag is assigned and set in a bit in a blank field such as a traffic class of the packet.

Alternatively, transferring the buffered data to the mobile node 1 may be achieved using the buffering home address BHoA or the unique code assigned by the home agent 2. FIG. 18 is a diagram explaining a method in which the home agent which has performed the buffering of the packet transmitted from the corresponding node sets a code to the destination of the packet and transmits it. Assume that the corresponding node 3 has already received the buffering request message from the mobile node 1.

In the form of FIG. 18, the following is a method in which communication of the packet to be buffered between the corresponding node 3 and the home agent 2 is performed. Since steps (1) and (2) in FIG. 18 are the same as (1) and (2) in FIG. 17 respectively, a description thereof is omitted here and only steps from (3) onward will be described.

(3) The home agent 2 replaces the destination of the received packet with a code that is an identifier to identify the mobile node 1. FIG. 18 shows an example of using the unique code as the identifier. In the case of using the buffer home address BHoA as the identifier between the home agent 2 and the mobile node 1, the BHoA is set.

(4) The home agent 2 performs the buffering.

(5) The home agent 2 reads out the buffered packet to encapsulate it, and transmits it.

As described above, according to the packet transfer method of this embodiment, regarding the packet transmitted to the buffer home address BHoA from the corresponding node, the home agent replaces it with the flag, the code or the like which is related with the BHoA and managed at the home agent. The mobile node recognizes that the packet is the buffered data from the flag, the code, or the like.

Seventh Embodiment

This embodiment differs from the sixth embodiment in that the mobile node which receives the packet does not distinguish between the packet which has been buffered and is transmitted from the home agent and the packet which is transmitted from the corresponding node and not buffered.

Figure 19:
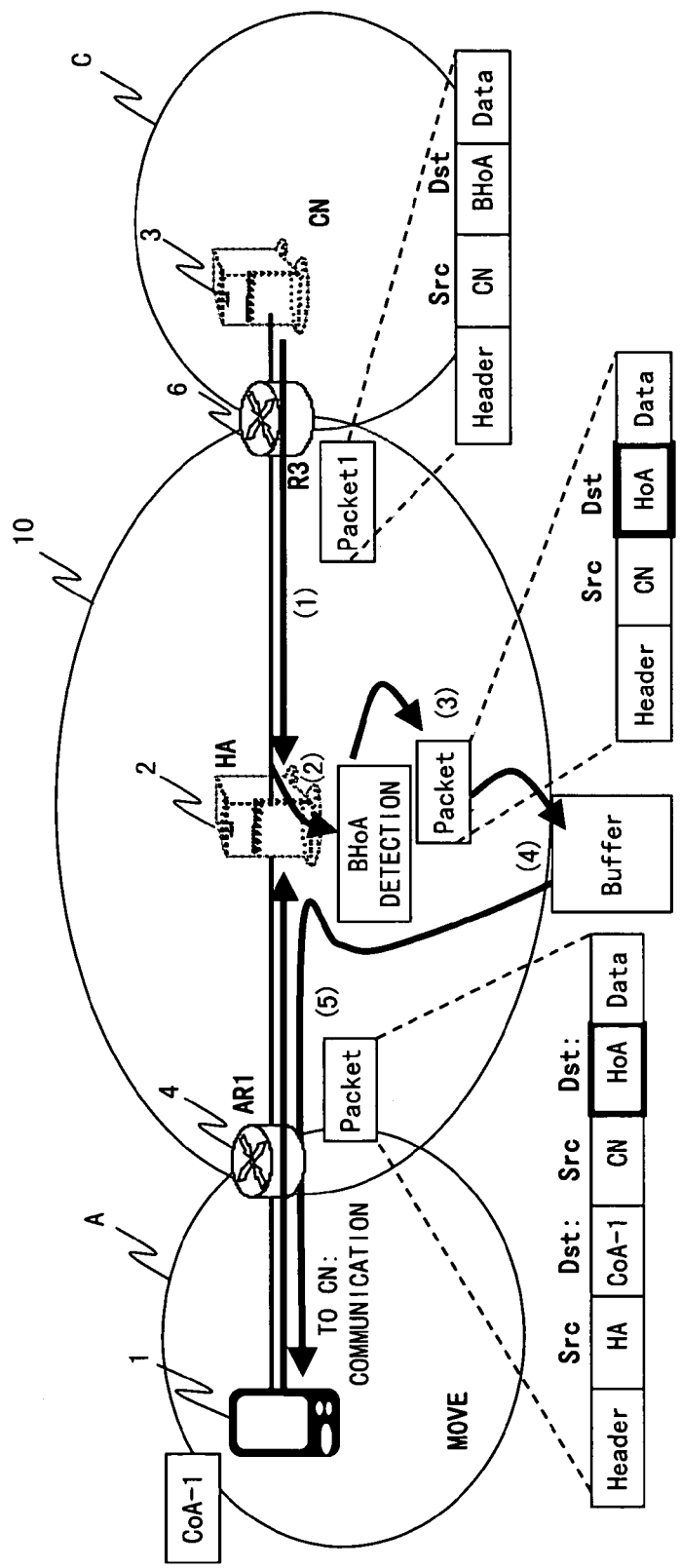
FIG. 19 is a diagram explaining a packet transfer method according to a seventh embodiment.

FIG. 19 is a diagram explaining a packet transfer method in which the mobile node 1 does not distinguish whether the packet has been buffered or not and executes a process. Since steps (1) to (4) in FIG. 19 are the same as in FIG. 17 according to the sixth embodiment, a description thereof is omitted here.

(5) The home agent 2 reads out the buffered packet to encapsulate it, and transmits it to the mobile node 1.

In the packet transfer method according to this embodiment, the mobile node 1 receives the packet that is not provided with the predetermined identifier such as the BHoA, the unique code or the flag at step (5). The mobile node 1 recognizes that the received packet is the one that has been buffered because its source is the corresponding node 3, independent of the predetermined identifier. Therefore, a load on the mobile node at the time of recognizing the packet can be reduced.

Eighth Embodiment

Figure 20:
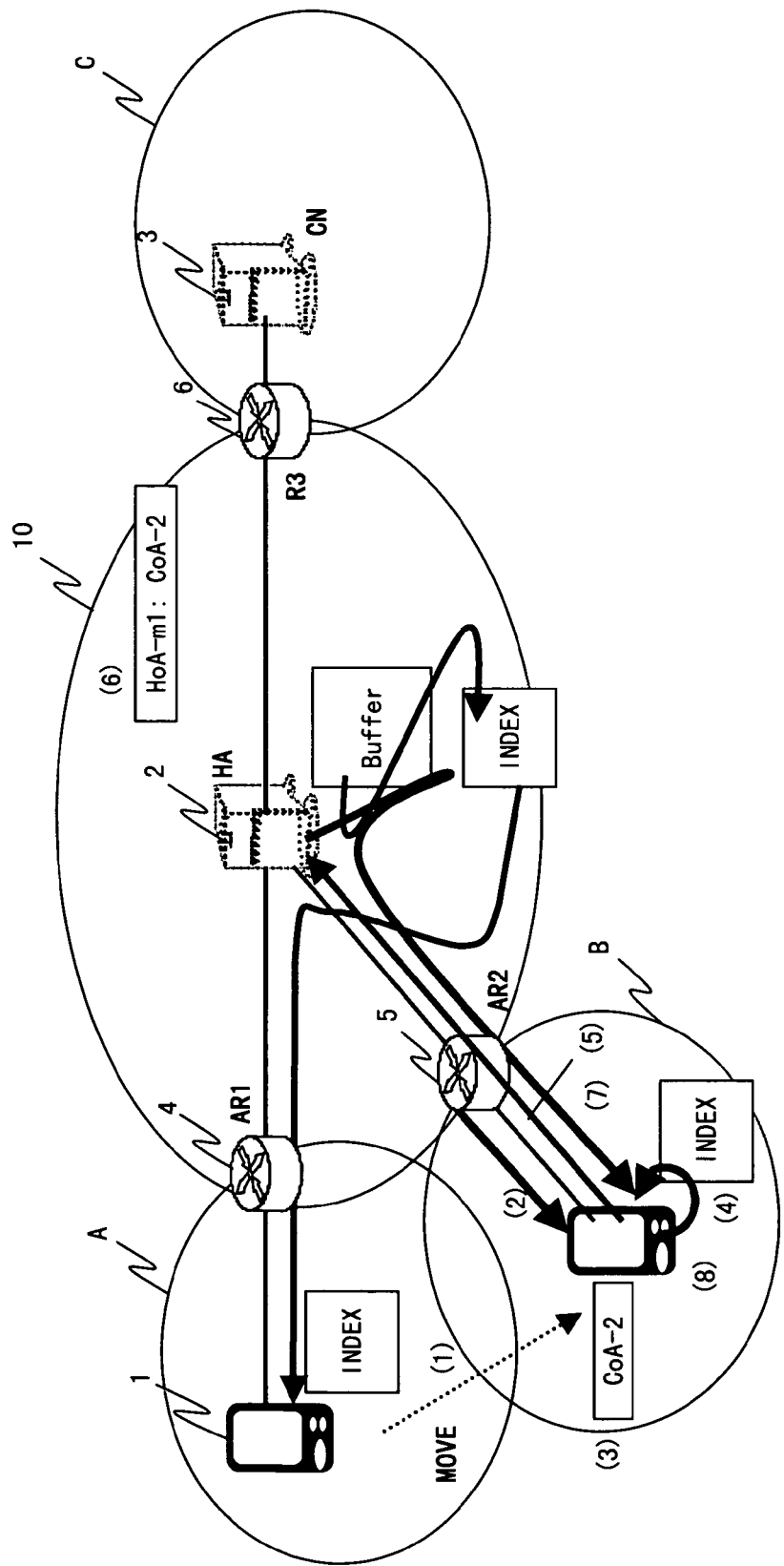
FIG. 20 is a diagram explaining a packet transfer method according to an eighth embodiment.

This embodiment is characterized in that a hand over occurrence acts as a trigger for the execution of the packet transfer method. FIG. 20 is a diagram explaining a packet transfer method according to this embodiment when the hand over occurs. A description of the process will be made below in accordance with the order of numbers in parentheses in FIG. 20. Assume that the mobile node 1 has transmitted the buffering request to the home agent 2 and the identifier such as the BHoA has been managed between the mobile node 1 and the home agent 2 by the time the process in FIG. 20 is initiated.

(1) The mobile node 1 which has been receiving the packet from the corresponding node 3 under the wireless network A moves to a place under the wireless network B.

(2) The mobile node 1 receives a router advertisement from the access router 5.

(3) The mobile node 1 creates a care of address CoA-2.

(4) The mobile node 1 refers to the index information received from the home agent.

(5) The mobile node 1 makes a location registration to the home agent 2. At this step, the mobile node 1 transmits a BU (Binding Update) message which is given the index information about an offset and the like that requires to be transferred among the buffered packets, on the basis of the index information referred to at step (4).

(6) The home agent 2 updates a Binding Cache.

(7) The home agent 2 which has received the BU message reads out the packet from the buffer, based on the index information about the offset and the like specified by the BU message, regarding the corresponding node 3 which is a receiving node to be objective, and transmits the read packet.

(8) The mobile node 1 updates the index information of the offset and the like. In the process of this update and the like, if a packet loss is found, the mobile node 1 requests the home agent 2 again to transfer the buffered packet corresponding to the missing packet. In the update and the like, there are designation of a packet to be transferred from the next time, disposal of the duplicate received packet, replacing the identifier such as the BHoA with the home address HoA, and the like, but details will be described later.

As described above, according to the packet transfer method of this embodiment, when a hand over occurs due to the mobile node moving, the mobile node requests the transfer of the buffered packet using the BU message of the location registration. By transmitting the BU message given the index information, the mobile node can make the request to the home agent appropriately regarding the packet that is required to be transferred. Further, by requesting the retransmission of the packet based on the received packet and the index information, the occurrence of the packet loss can be prevented effectively.

Ninth Embodiment

Figure 21:
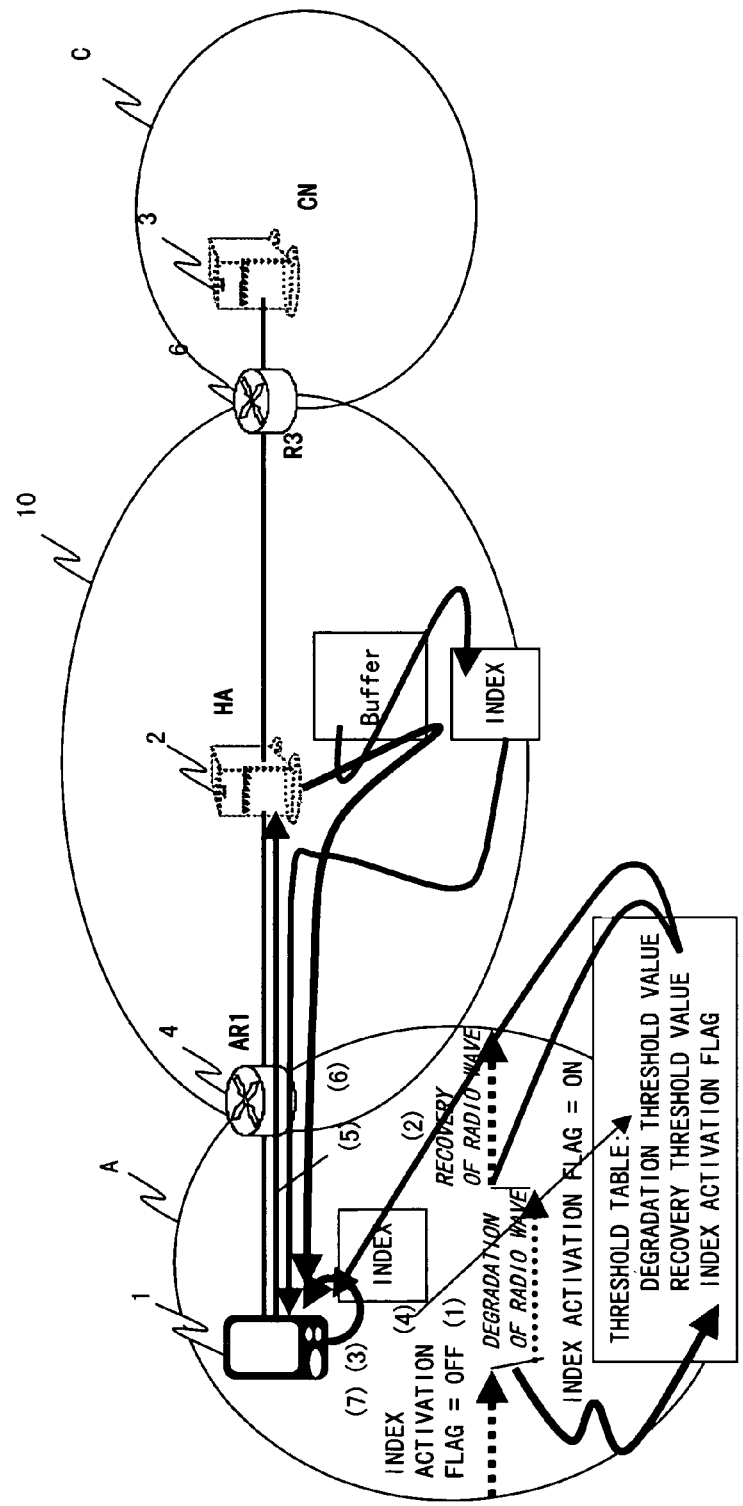
FIG. 21 is a diagram explaining a packet transfer method according to a ninth embodiment.

This embodiment is characterized in that degradation of the radio wave strength acts as a trigger for the execution of the packet transfer method according to the first to seventh embodiments. FIG. 21 is a diagram explaining a packet transfer method according to this embodiment when the radio wave strength changes. In the same way as the eighth embodiment, in this embodiment, assume that the identifier such as the BHoA has been managed between the mobile node 1 and the home agent 2 by the time the process in FIG. 21 is initiated.

(1) The mobile node 1 monitors the radio wave strength. When the mobile node 1 recognizes that the radio wave strength has fallen below a predetermined threshold value, it sets an index activation flag in a threshold value table to ON. Here, as the threshold value for setting the index activation flag to ON, a degradation threshold value in the threshold value table as shown in the lower part of FIG. 21 is employed.

(2) When the radio wave strength rises above a recovery threshold value in the threshold value table, the mobile node 1 recognizes that the radio wave strength has recovered.

(3) The mobile node 1 refers to the index information.

(4) The mobile node 1 sets the index activation flag in the threshold value table to OFF.

(5) The mobile node 1 transmits a BU (Binding Update) message which is given the index information about an offset and the like that requires to be transferred among the buffered packets, on the basis of the index information referred to at step (3).

(6) The home agent 2 which has received the BU message reads out the packet from the buffer, based on the index information about the offset and the like specified by the BU message, regarding the corresponding node 3 which is a receiving node to be objective, and transmits the read packet.

(7) The mobile node 1 updates the index information of the offset and the like. In the process of the update and the like, requesting the retransmission of the missing packet is the same as in the eighth embodiment.

As described above, according to the packet transfer method of this embodiment, when the mobile node recognizes that the radio wave strength has fallen below the predetermined threshold value, it makes the home agent initiate the packet buffering. When the radio wave strength recovers, the mobile node transmits the BU message given the index information to the home agent. The home agent which has received the BU message initiates the transfer of the buffered packet. Since the transfer of the packet is performed based on the index information, the transfer can be performed for the required packet.

Tenth Embodiment

Figure 22:
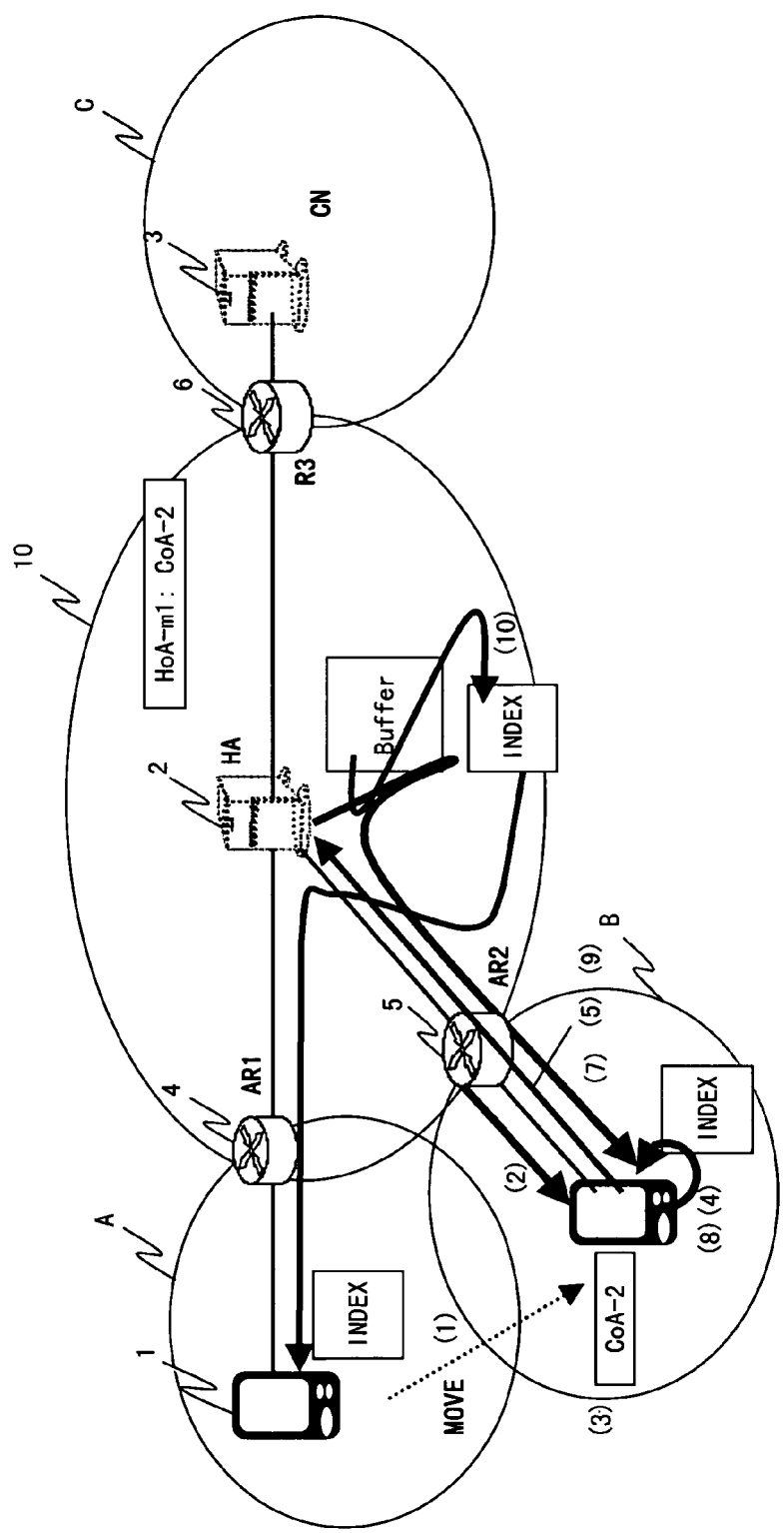
FIG. 22 is a diagram explaining a packet transfer method according to a tenth embodiment.

This embodiment is characterized in that the contents of the index information employed in the eighth embodiment and the ninth embodiment are updated and an index location which is necessary at the time of requesting the next transfer of the buffered data is specified. FIG. 22 is a diagram explaining a method for updating the index information. In the following packet transfer method with reference to FIG. 22, since steps (1) to (8) are the same as in the eighth embodiment, a description thereof is omitted here and only steps from (9) onward will be described.

(9) The mobile node 1 transmits an index location update request to the home agent 2 using the BU message.

(10) The home agent 2 performs disposal of the buffered packet, setting of the offset based on the contents of the index location update request of the received BU message.

Figure 23A:
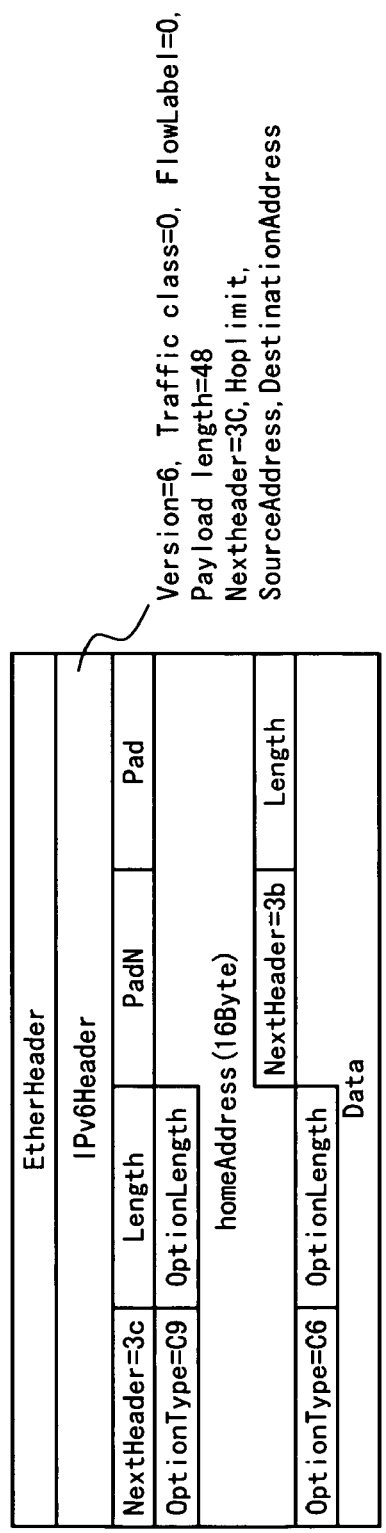
FIG. 23A is an example of a BU message.
Figure 23B:
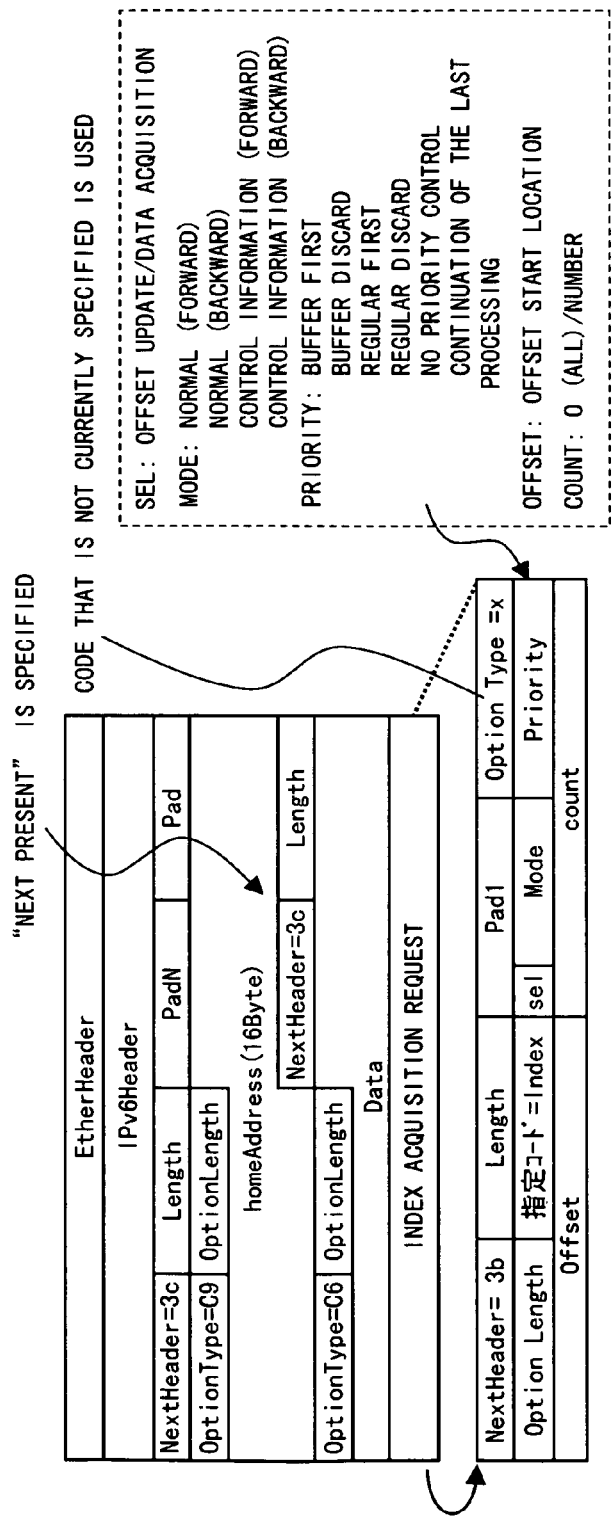
FIG. 23B is an example of a BU message structure in the case of including an index request.

The BU message transmitted by the mobile node 1 at step (9) will be described with reference to FIG. 23A and FIG. 23B. FIG. 23A is an example of a conventional BU message. FIG. 23B is an example of the BU message to which an index request is added.

Compared to FIG. 23A, in the BU message of FIG. 23B used in the eighth and the ninth embodiments, "3c (next present)" is stored in Next Header and information regarding index request processing is added. In the information regarding index request processing, either offset update for requesting the transfer of the specified buffer packet as step (8) in FIG. 22 or data acquisition for requesting the transfer of the buffer data as step (5) in FIG. 20 is specified at "sel" data. Regarding the buffered packet, it is specified at "Mode" data which direction the packet is read out, forward or backward from the offset and which unit is used for transferring the buffer data, packet or frame. The offset value for the packet of which transfer is requested by the mobile is stored at "Offset" data. The number of packets to be transferred is specified at "count" data. For example, in the case where the count value is 0, all the packets buffered at the home agent are specified. In the case where a value other than 0 is stored, packets for the number of the stored value counting from the offset are specified.

In this embodiment, the description in the case of the hand over occurrence in the eighth embodiment has been made; however, the same process is applied to the index request and the index information update in the case of the change of the radio wave strength in the ninth embodiment.

Further, as the index information, it is possible to use a sequence number of the packet as well. In the case of effectuating the packet transfer method in this embodiment using the sequence number, by transmitting the sequence number to the home agent 2 in step (9), the transfer of the buffer data from the sequence number of the packet specified by the mobile node 1 is achieved.

As described above, according to this embodiment, when the hand over occurrence or the change of the radio wave strength is detected, regarding the buffered packet, the mobile node specifies and receives the packet to be transferred using the BU message. When the packet is transferred from the home agent based on the request from the mobile node, the mobile node can update the index information in order to always receive an appropriate packet.

Eleventh Embodiment

Figure 24:
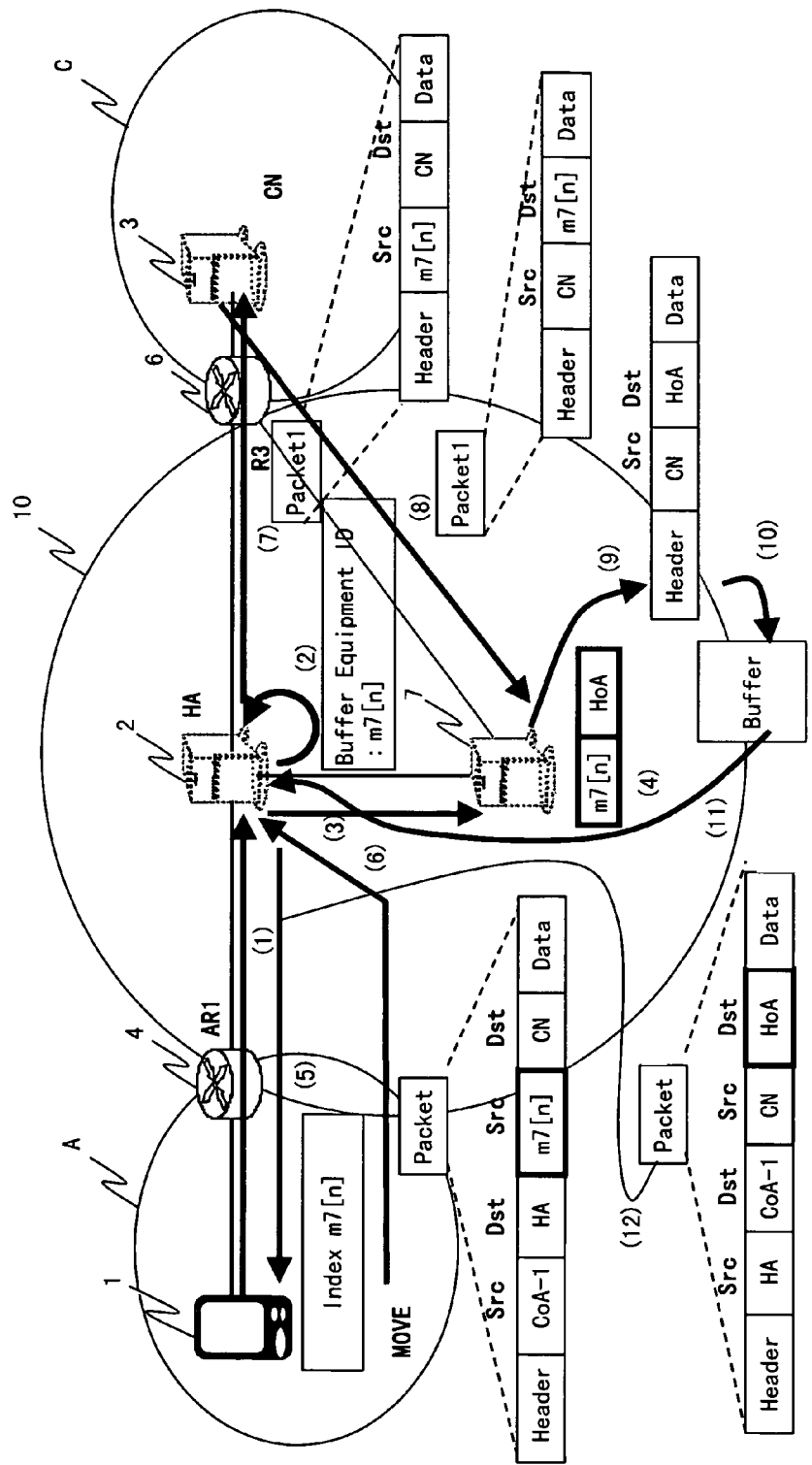
FIG. 24 is a diagram explaining a packet transfer method according to an eleventh embodiment.

This embodiment differs from the previous embodiment in that another node connected to the home agent within the network performs the buffering and transmit the packet to the mobile node. FIG. 24 is a diagram explaining a method in which the packet is buffered in another node and then transmitted to the mobile node. A different point from the previous embodiment regarding the system structure is that a node 7 connected with the home agent 2 via a communication line or the like is connected to the Internet 10. The packet transfer method according to this embodiment will be described below with reference to FIG. 24.

(1) The mobile node gives the buffering request to the BU message and transmits it to the home agent 2.

(2) The home agent 2 manages an address m7[n] of the node 7 as the address of the node to perform the buffering.

(3) The home agent 2 orders the node 7 to relate the address m7[n] of the node 7 and the home address HoA of the mobile node and manage them.

(4) The node 7 relates the HoA and the m[7]n and manages them.

(5) The home agent 2 notifies the mobile node 1 of the address m[7]n of the node 7 which performs the buffering.

(6) The mobile node 1 transmits a message of a request for performing the packet buffering to the home agent 2. The mobile node replaces data to which HoA is stored as a source with m7[n] of which the home agent has notified the mobile node at step (5).

(7) The home agent 2 decapsulates the packet received from the mobile node 1 and transmits it to the corresponding node 3.

(8) The corresponding node 3 which has received the message from the mobile node transmits the packet to the node 7.

(9) The node 7 replaces the m7[n] with the HoA as the destination of the packet received from the corresponding node 3.

(10) The node 7 performs the packet buffering in step (9).

(11) The node 7 transmits the buffered packet to the home agent 2.

(12) The home agent 2 encapsulates the received packet and transmits it to the mobile node 1.

According to this embodiment, the home agent assigns an address by which the HoA is replaced and another node other than the home agent performs the packet buffering. The node that performs the buffering replaces the address of the node with the HoA as the destination of the packet. Thus, the mobile node does not need to distinguish between the packet distributed from the corresponding node and the packet which has been buffered and is transmitted. Further, the mobile node requests the home agent to perform the buffering irrespective of which node in the network performs the buffering, and thereby the buffering and the transfer of the buffering data can be achieved.

Twelfth Embodiment

This embodiment differs from the eleventh embodiment in that regarding the buffered packet transmitted to the mobile node, without replacement by the HoA, the packet in which the address m7[n] of the node 7 is still stored is transmitted to the mobile node. FIG. 25 is a diagram explaining a method in which the home agent transfers the buffered packet to the mobile node without replacement by the HoA. The packet transfer method according to this embodiment will be described. In the steps indicated with parentheses in FIG. 25, steps (1) to (8) are the same as in the eleventh embodiment; therefore, a description thereof is omitted here, and only steps from (9) onward will be described. (9) The node 7 does not make the replacement. The packet received from the corresponding node 3 still stores the m7[n] to the destination.
(10) The node 7 performs the packet buffering in step (9).
(11) The node 7 transmits the buffered packet to the home agent 2.
(12) The home agent 2 encapsulates the received packet and transmits it to the mobile node 1.

According to the packet transfer method of this embodiment, the node 7 does not make the replacement of the destination at step (9). A load on the node 7 which performs the buffering can be reduced.

Thirteenth Embodiment

Figure 26:
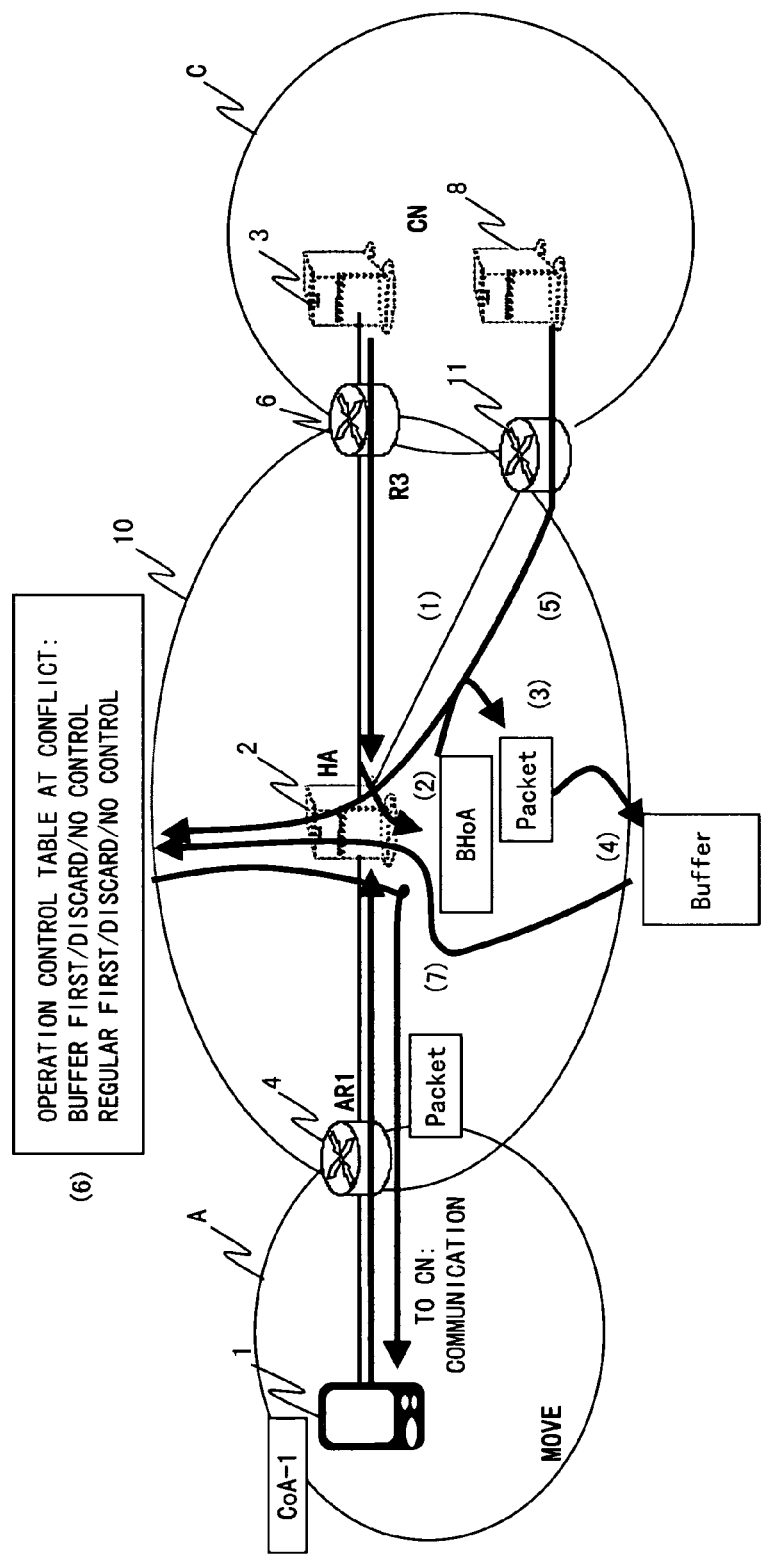
FIG. 26 is a diagram explaining a packet transfer method according to a thirteenth embodiment.
Figure 27:
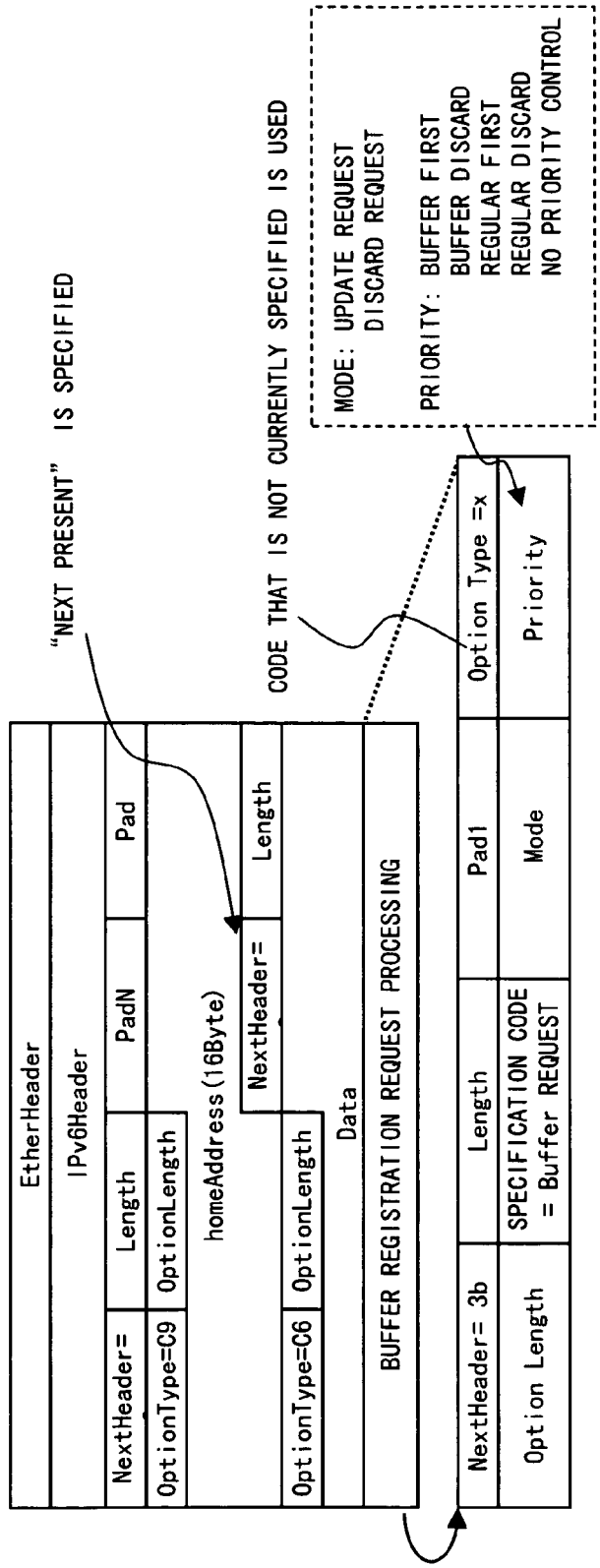
FIG. 27 is an example of a BU message structure in the case of including a buffer registration request.

In this embodiment, in the case where when the home agent performs the buffering of data transmitted from some corresponding node and is transferring the buffer data, another corresponding node is transmitting data through the same home agent at the same time, which data from each corresponding node should be given a higher priority is selected. FIG. 26 is a diagram explaining a packet transfer method of giving a higher priority to either buffer data from some corresponding node 3 or non-buffered data from another corresponding node 8 which is under communication with the mobile node 1 through a router 11. Steps (1) to (3) in FIG. 26 correspond to (1) to (3) in FIG. 17 respectively; therefore, due to the same process, a description thereof is omitted here, and steps from (4) onward will be described.
(4) Internal selection processing for judging which data is preferentially transmitted to the mobile node 1 when a process of transferring the buffer data transmitted from the corresponding node 3 to the mobile node 1 conflicts with a process of transmitting the non-buffer data from the corresponding node 8 is executed.
(5) Assume that when the corresponding node 3 transmits the buffer data at step (4), at the same time, another corresponding node 8 is transmitting the non-buffer data. The internal selection processing for judging which data is preferentially transmitted to the mobile node 1 when the process of transmitting the non-buffer data from the corresponding node 8 to the mobile node 1 conflicts with the process of transferring the buffer data transmitted from the corresponding node 3 is executed.
(6) It is selected whether processing of buffer data first/buffer data disposal/no priority control or non-buffered data (data transmitted from the corresponding node 8, in this case) first/non-buffered data disposal/no priority control, regarding each data transmitted from the corresponding node 3 and the corresponding node 8, referring to a conflict operation control table in the home agent 2, is performed. As for the conflict operation control table, the mobile node 1 transmits the conflict operation control table to the home agent 2 using the BU message including the buffer registration request in FIG. 16B or the index request in FIG. 23B, for example. FIG. 27 is an example in the case of adding the buffer registration request to the BU message. By storing a predetermined value into "Priority", the mobile node 1 can select from priority/disposal/no control, regarding the buffer data or the non-buffered data.
(7) The data is transmitted to the mobile node 1 based on the selection in step (6). For example, in the case where buffer data first priority processing is selected, the buffer data, that is, the data from the corresponding node 3 is transmitted to the mobile node 1 first and after the completion of the transmission, the data from the corresponding node 8 is transmitted to the mobile node 1. In the case where buffer data disposal processing is selected, the data from the corresponding node 3 is disposed of and only the data from the corresponding node 8 is transmitted to the mobile node 1. In the case where processing of no priority control is selected, the data is transmitted to the mobile node 1 without particular priority control.

According to the packet transfer method, using the BU message transmitted at the time of the location registration of the mobile node, when there occurs a conflict between transmission data to the mobile node, which data is processed regarding in first priority/disposal/no control can be specified beforehand.

The above is an example of the working. Furthermore, for example, since the priority can be set even if there is no data stream from a corresponding node, an advantageous effect can be obtained as well in an application that communication quality with a corresponding node is improved more than with the other one.

Fourteenth Embodiment

Figure 28:
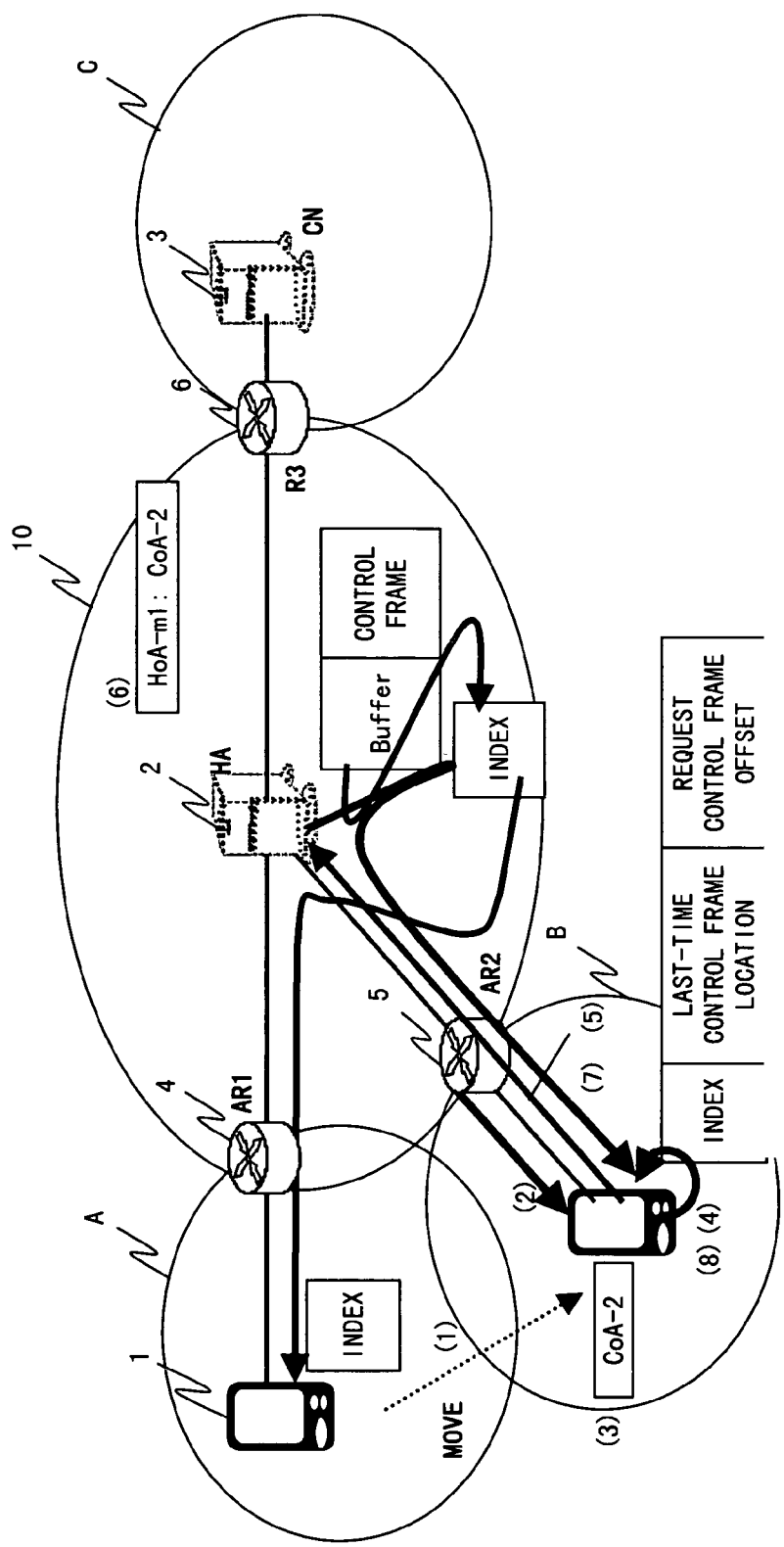
FIG. 28 is a diagram explaining a packet transfer method according to a fourteenth embodiment.

In this embodiment, concerning the packet transfer method by the index request according to the previous embodiment, more specific usage mode thereof will be described. FIG. 28 is a diagram explaining a packet transfer method according to the index request in units of frames. The steps indicated with parentheses in FIG. 28 are the same as in FIG. 20. However, this embodiment is different from the eighth embodiment of FIG. 20 in specifying the offset in units of frames or the like of data distributed from the corresponding node 3 as the index information.

At step (5) in FIG. 28, the index request given to the BU message transmitted to the home agent 2 at the time of the location registration includes last-time control frame location information and request control frame offset information. The last-time control frame location information is the information regarding a relative location of up to which frame has been received in units of frames. The request control frame offset information is the offset information of a frame required to be transmitted the next time based on the frame received at the mobile node. Based on this index request, the home agent 2 reads out the buffered data in units of frames at step (7) and transmits it to the mobile node 1.

As described above, according to the packet transfer method, the index request in units of frames or the like and control by the index request are performed. In such a case where the keyword of the control in the communication application of the mobile node 1 is the frame, by using the packet transfer method of this embodiment to transfer the packet, from the viewpoint of the communication application execution, more effective packet transfer can be achieved.

Fifteenth Embodiment

Figure 29:
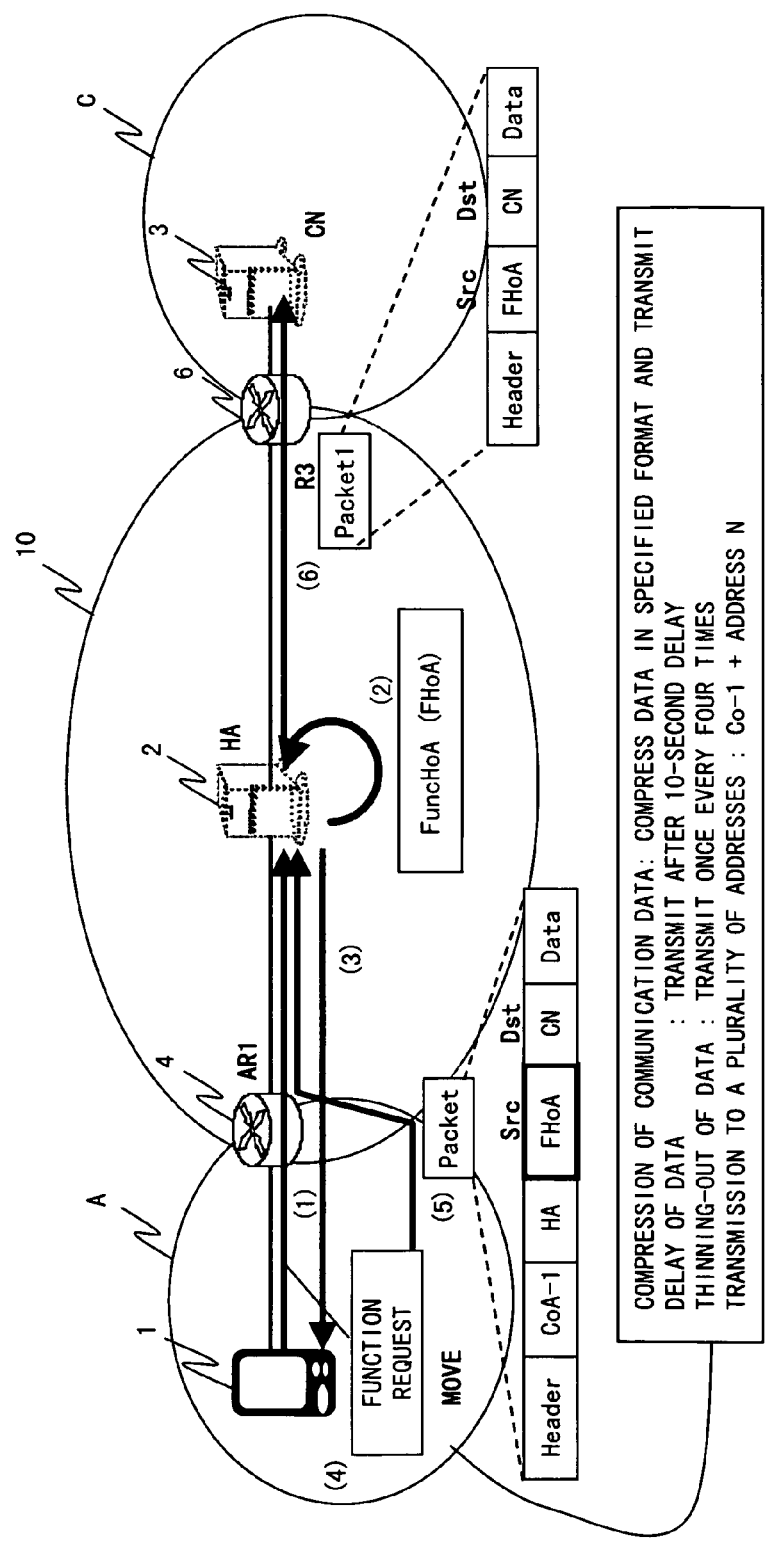
FIG. 29 is a diagram (part one) explaining a packet transfer method according to a fifteenth embodiment.

This embodiment differs from the previous embodiment in that a code created by the home agent is employed in order to specify a communication method between the mobile node and the corresponding node. FIG. 29 is a diagram explaining a packet transmission method in which a code created at the home agent is employed in order to determine a communication method. The packet transmission method according to this embodiment will be described in accordance with steps indicated with parentheses in FIG. 29.

(1) The mobile node 1 adds a communication packet function request to the BU message, and then transmits the BU message to the home agent 2.
(2) The home agent 2 creates a function home address FHoA for performing a communication function based on the communication packet function request received from the mobile node 1, and enables the communication function which the mobile node 1 specifies.
(3) The home agent 2 notifies the mobile node 1 of the FHoA when the home agent 2 transmits the BA message to the mobile node 1.
(4) The mobile node 1 relates the received FHoA with a communication application that is required for the communication function which is requested at (1) and manages it.
(5) The mobile node 1 replaces the HoA with the FHoA as shown at (5) in FIG. 29, regarding the communication with the corresponding node 3, and transmits the packet.
(6) The home agent 2 decapsulates the packet received from the mobile node 1 and transmits it to the corresponding node 3 as a request from FHoA.

In the same manner as the aforementioned embodiment, the home agent 2 creates an address other than the home address, and the mobile node 1 communicates with the corresponding node 3 using the address received from the home agent 2. As the communication function which the mobile node 1 specifies at step (1), for example, there are compression of communication data, data delay, thinning-out of data, data transmission to a plurality of addresses, communication between groups, and the like. The mobile node adds each predetermined value of these functions to the BU message at the time of the location registration and then transmits the BU message to the home agent, and the home agent assigns the FHoA and notifies the mobile node of the FHoA, so that the mobile node can manage the communication functions.

Figure 30:
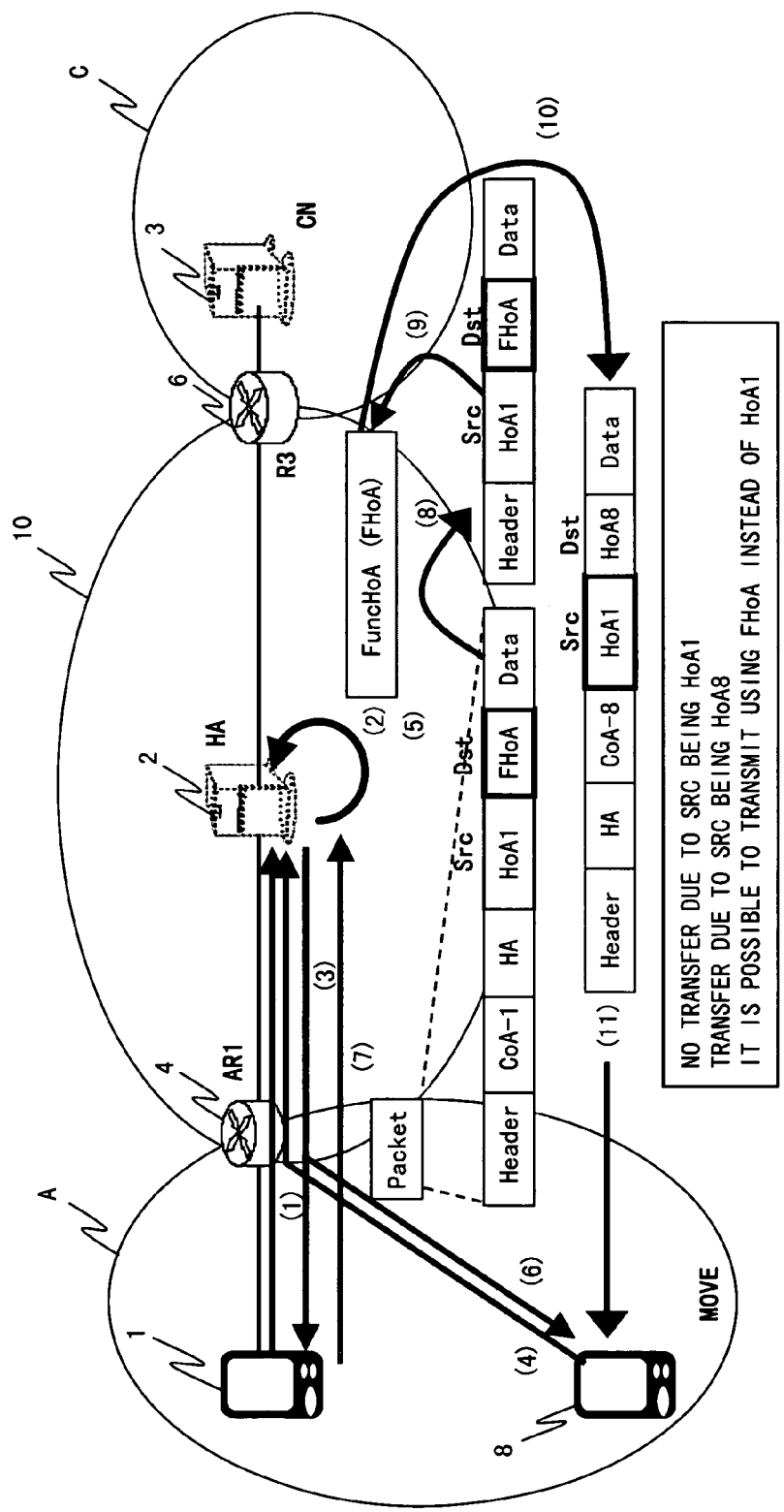
FIG. 30 is a diagram (part two) explaining a packet transfer method according to a fifteenth embodiment.

FIG. 30 is a diagram explaining a concrete example of the packet transmission method according to this embodiment. A process for setting group communication among a plurality of mobile nodes will be described with reference to FIG. 30. Another mobile node 8 is connected to the Internet 10 through the access router 4, and communicates with the corresponding node 3. Steps (1) to (3) in FIG. 30 are the same as (1) to (3) in FIG. 29 respectively. Assume that the mobile node 1 has managed the received function home address FHoA within the mobile node by the time the completion of step (3). Steps from (4) onward in FIG. 30 will be described below.

(4) Another mobile node 8 adds a request of a group communication function to the BU message, and then transmits the BU message to the home agent 2.
(5) The home agent 2 assigns the same address FHoA as the function home address assigned to the mobile node 1 and enables the group communication function of the mobile node 8.
(6) The home agent 2 notifies the mobile node 8 of the FHoA. The mobile node 8 relates the received FHoA with a communication application that is required for the group communication function and manages it.
(7) The mobile node 1 transmits data addressed to a group.
(8) The home agent 2 decapsulates the packet received from the mobile node 1 and extracts the internal information.
(9) On the basis of the information extracted at step (8), the destination of the data transmitted at step (7) is the FHoA. According to this,
(10) A packet, addressed to HoA1, of which destination is coincident with the source is deleted.
(11) Only a packet addressed to the mobile node 8, that is, HoA8 is transferred. The packet is received by the mobile node 8.

At (11) in FIG. 30, although "HoA1" is set to the source in the internal header, "FHoA" can be used for HoA1. In the case where HoA8 is set in the internal header, the mobile node 8 distinguishes a packet that is transmitted or received in group communication from a packet that is transmitted or received in non-group communication. In the case where FHoA is set as the source, the mobile node 8 receives a packet without the distinction.

As described above, according to the packet transmission method of this embodiment, using a unique address created by the home agent, a communication method can be set up and used in order to be executed.

The above is an example of the working. Furthermore, for example, when the mobile node communicates with a plurality of corresponding nodes, the setting can be performed to each corresponding node for each purpose. Therefore, forming a mirror address having an appropriate function for each corresponding node, a set of the mobile node and the corresponding node can improve communication quality.

Sixteenth Embodiment

Figure 31:
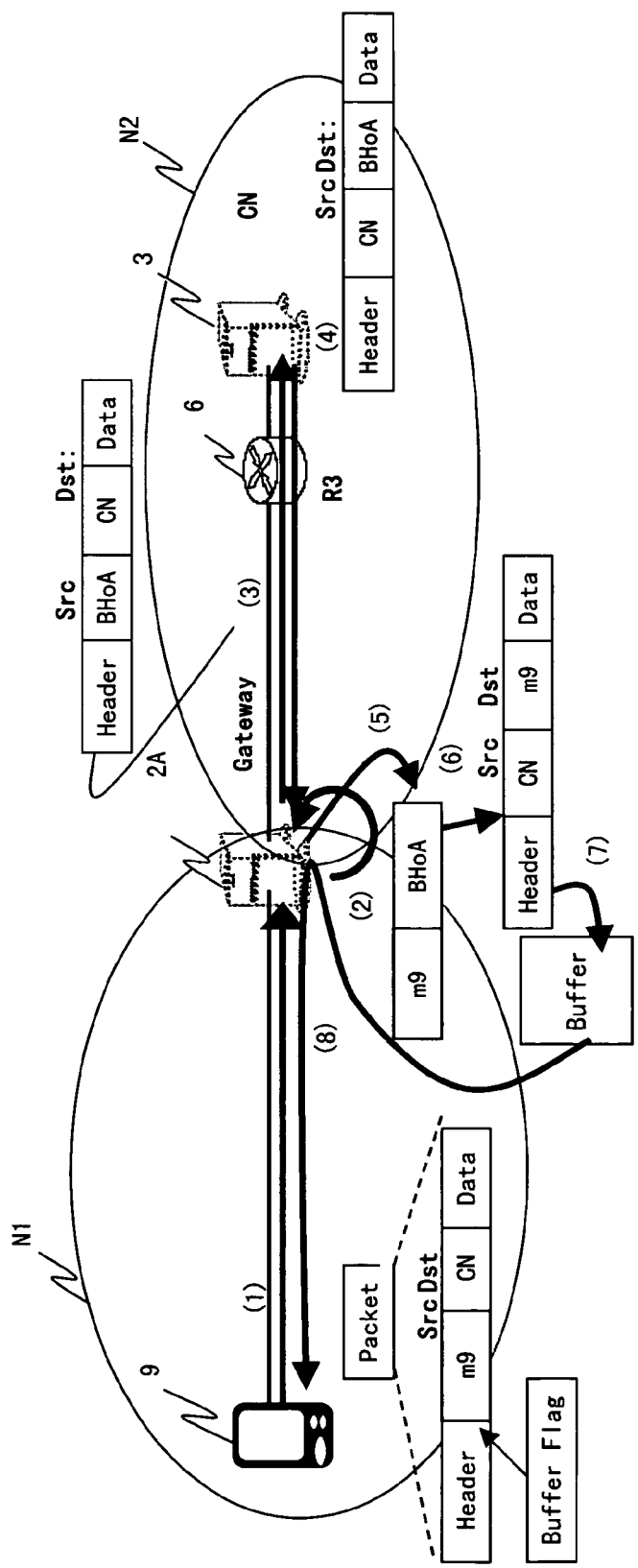
FIG. 31 is a diagram explaining a packet transfer method according to a sixteenth embodiment.

This embodiment differs from the previous embodiment in that the home agent is not a node that manages the move of the mobile node but it operates as a gateway. FIG. 31 is a diagram explaining a packet transfer method according to a gateway. In FIG. 31, the corresponding node 9 under a network N1 is communicating with the corresponding node 3 under another network N2 through a gateway 2A.

(1) The corresponding node 9 transmits data given a buffer flag to the corresponding node 3.
(2) Upon receiving the data given a buffer flag, the gateway 2A creates a buffer home address BHoA. The gateway 2A relates the created BHoA with an m9 which indicates the corresponding node 9 and manages them.
(3) Regarding the packet transmitted from the corresponding node 9, the gateway 2A replaces the m9 of the source with the BHoA, and transmits the packet to the corresponding node 3.
(4) Regarding a packet transfer from the corresponding node 3 to the corresponding node 9, the corresponding node 3 assigns the BHoA to the destination and transmits the packet.

(5) Upon receiving the packet addressed to the BHoA, the gateway 2A extracts the "m9" which is related with the BHoA to be managed.
(6) The gateway 2A replaces the BHoA of with the m9 as the destination of the packet to be transmitted to the corresponding node 9.
(7) The gateway 2A stores the packet in a buffer.
(8) The gateway transmits the data in the buffer to the corresponding node 9.

In this embodiment, for example, in a case where communication quality between the corresponding node 9 and the gateway 2A is poor, the corresponding node 9 can request the gateway 2A to transmit the data in the buffer. Regarding data that is transmitted from the corresponding node 9 without the buffer flag assigned, the gateway 2 does not make the replacement of the source address at step (3), and transmits the data to the corresponding node 3, just as it is.

As described above, according to the packet transfer method of this embodiment, the buffered data can be transmitted in the same manner to the gateway.

Figure 32:
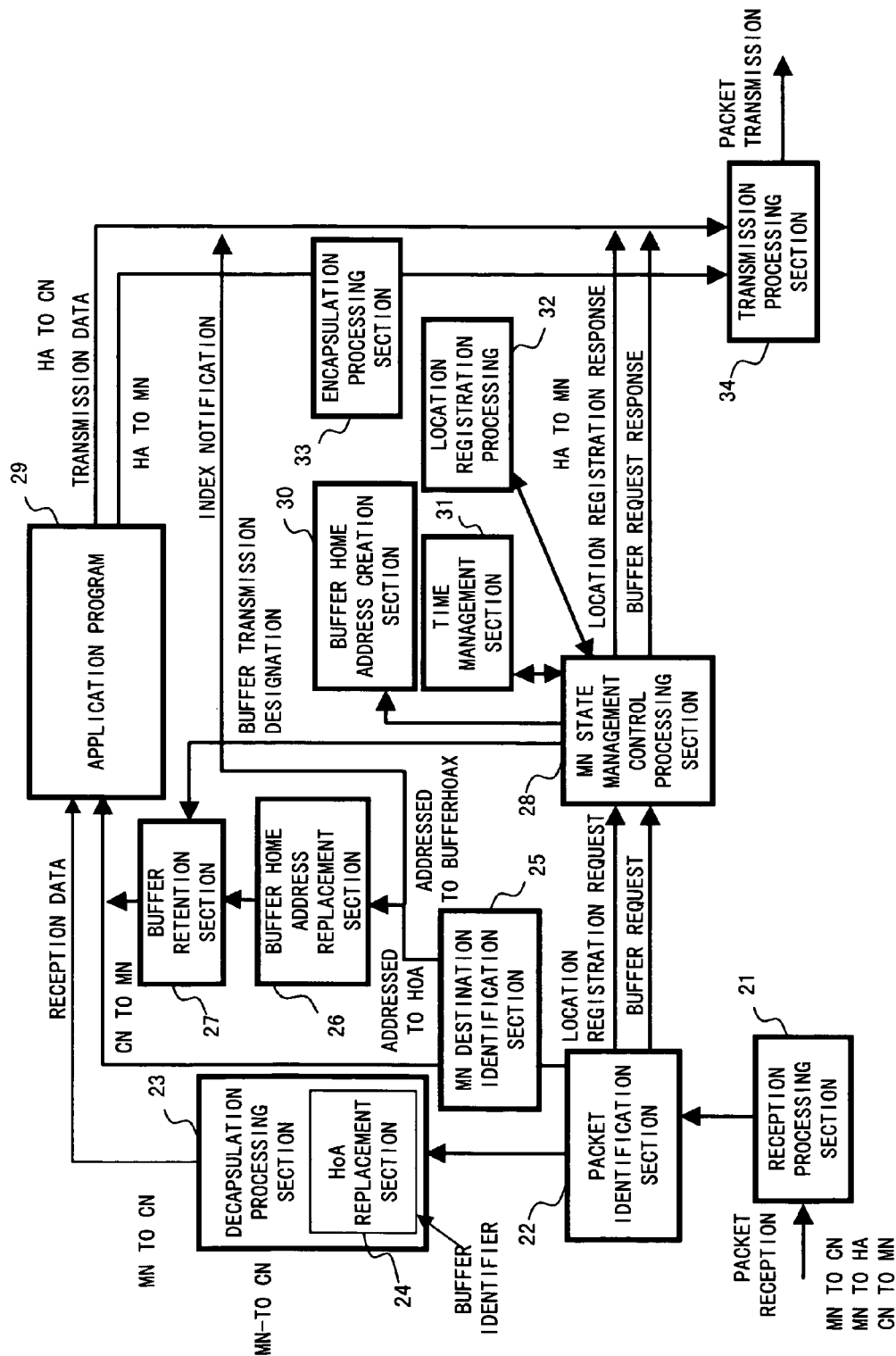
FIG. 32 is a block diagram of a relay node.
Figure 33:
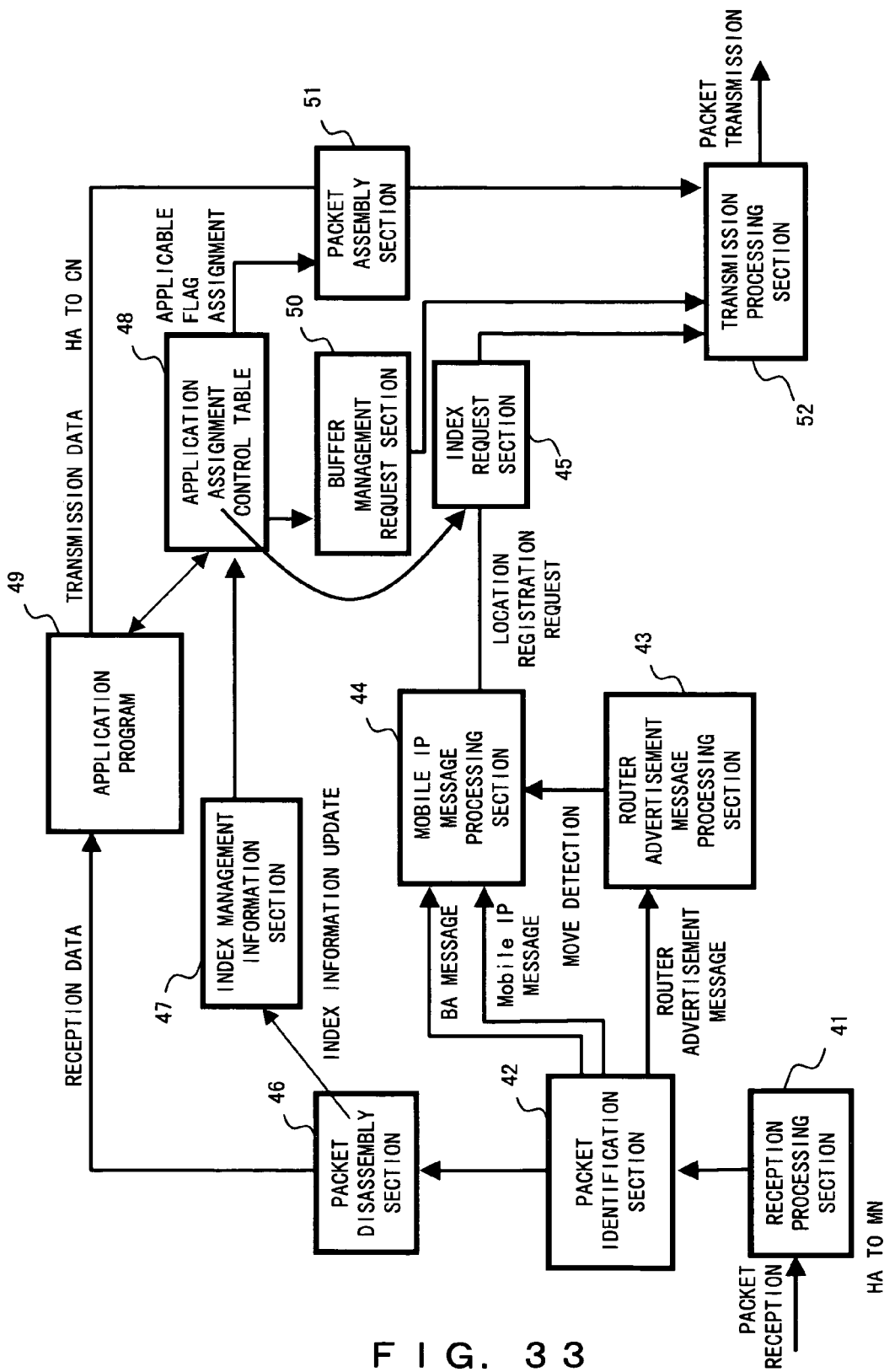
FIG. 33 is a block diagram of a mobile node.

As explained above, the description has been made of the methods of creating the address, the flag, or the like in order to transfer the buffer packet from the home agent and transferring the packet, in order to prevent the packet loss due to the hand over and a change of the radio wave strength. In the packet transfer methods according to the above-mentioned embodiments, it is determined and executed, at the relay node such as the home agent transferring the packet or the mobile node receiving the packet, which method is used to transfer the buffered packet. FIG. 32 and FIG. 33 are block diagrams of the relay node and the mobile node, respectively. A process of determining an optimum packet transfer method and executing it will be described.

First, the relay node will be described. FIG. 32 is a block diagram of the relay node. The relay node which has received the packet at a reception processing unit 21 delivers the received packet to a packet identification unit 22. The packet identification unit 22 identifies a type of the packet, and, in accordance with the result, transfers the packet to a decapsulation processing unit 23, MN (Mobile Node) destination identification unit 25, or MN state management control processing unit 28.

The packet that is transmitted from the mobile node 1 to the corresponding node 3 is transferred to the decapsulation processing unit 23. The decapsulation processing unit 23 decapsulates the packet and, if necessary, also performs a process at an HoA replacement unit 24 which replaces the home address HoA with the buffer identifier such as the buffer home address BHoA, the unique code, or the flag.

The packet that is distributed from the corresponding node 3 to the mobile node 1 is transferred to the MN destination identification unit 25. The MN destination identification unit 25 transfers the packet to either an application program 29 or a buffer home address replacement unit 26, according to the destination which is either the home address HoA or the buffer home address BHoA, respectively. The buffer home address replacement unit 26 replaces the BHoA with the HoA. The packet of which destination is replaced with the HoA is buffered at a buffer retention unit 27 and then is delivered to the application program 29. The application program 29 executes the communication application in accordance with the data.

The BU message which is the location registration request to the home agent 2 and the buffer request included in the BU message is transferred to the MN state management control processing unit 28. The MN state management control processing unit 28, in response to the request content from the mobile node 1, provides necessary instructions to the buffer retention unit 27, a buffer home address BHoA creation unit 30, a time management unit 31, a location registration processing unit 32, etc.

The buffer home address BHoA creation unit 30 creates a mirror address of the home address HoA. The time management unit 31 performs timer management for the BHoA creation unit 30. The location registration processing unit 32 processes the location registration of the mobile node 1.

After a specified communication application is executed at the application program 29, the packet addressed to the mobile node is encapsulated at an encapsulation processing unit 33 and then delivered to the transmission processing unit 34 to be transmitted to another node, or the packet addressed to the corresponding node 3 is directly delivered to the transmission processing unit 34 to be transmitted to another node.

Next, the mobile node will be described. FIG. 33 is a block diagram of the mobile node. The mobile node which has received the packet at a reception processing unit 41 delivers the received packet to a packet identification unit 42. The packet identification unit 42 identifies a type of the packet, and, in accordance with the result, transfers the packet to a router advertisement message processing unit 43, a packet disassembly unit 46, or a mobile IP message processing unit 44.

When the received packet is the BA message from the home agent that the location registration has been completed or the received packet is a mobile IP message, the packet is processed at the mobile IP message processing unit 44.

Upon detecting that the mobile node 1 has moved to a communication area of another access router by a router advertisement received from the home agent, the router advertisement message processing unit 43 notifies the mobile IP message processing unit 44 of it. The mobile IP message processing unit 44 notifies an index request unit 45 of the occurrence of the hand over, and instructs it to transmit the index information of the packet.

When the packet is data distributed from the corresponding node 3, the packet is disassembled at the packet disassembly unit 46. Among the disassembled data, the index information is read out by an index management information unit 47, and regarding the received data, a specified application is executed at an application program 49. The index management information unit 47 reads out necessary information from an application assignment control table 48, and the read information is provided to the application program 49, a buffer management request unit 50, or the index request unit 45. After the program is executed at the application program 49, the packet to be transmitted to the corresponding node 3 is delivered to a packet assembly unit 51.

The buffer management request unit 50 creates a packet that requests the home agent 2 to initiate a packet buffering, and the index request unit 45 creates a packet that requests the home agent 2 to transmit a packet that is specified by the mobile node 1, namely, based on the index. The packet that is created or assembled at the buffer management request unit 50, the index request unit 45, or the packet assembly unit 51 is transmitted to a network from a transmission processing unit 52.

When the packet of the BU message is transmitted to the home agent 2 after the buffer management request unit 50 and the index request unit 45 in FIG. 33 add the buffer registration request and the index request respectively to the BU message of the location registration, a series of operations shown in FIGS. 34 to 37 are performed in the communication system of the embodiments. The operation of the whole system in the case where the buffer registration request and the index request are transmitted from the mobile node will be described below with reference to the drawings.

Figure 34:
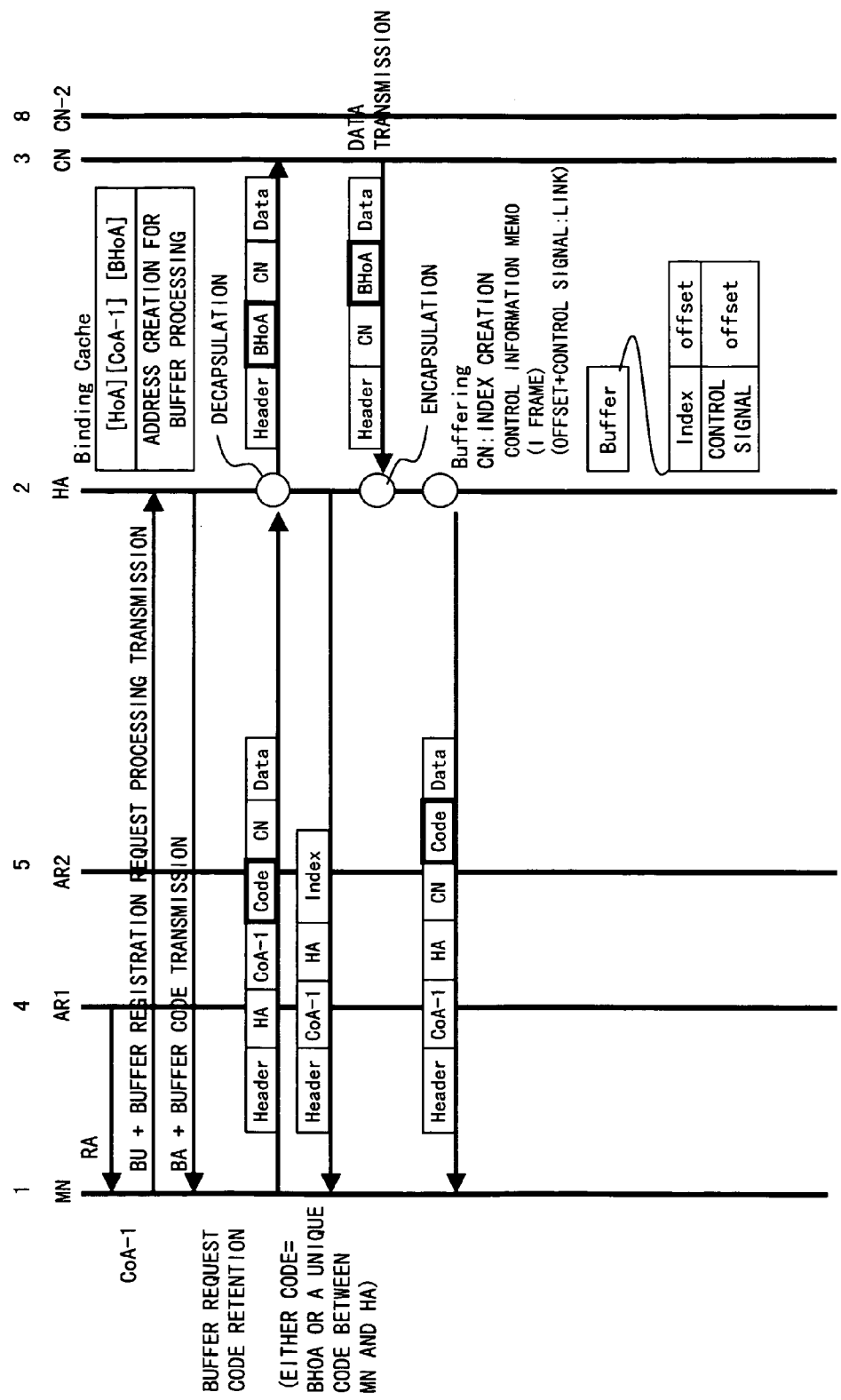
FIG. 34 is a sequence (part one) according to a message transmission of a buffer registration request.

FIG. 34 is a sequence according to a message transmission of the buffer registration request in the case of assigning the code to the field in the packet. The mobile node 1 within the communication area of the access router 4 is communicating with the corresponding node 3 through the home agent 2.

First, the mobile node 1 which has received the router advertisement (RA) from the access router 4 transmits the BU message of the location registration to the home agent 2. At this time, the buffer registration request is included in the BU message to be transmitted. The home agent 2 which has received the buffer registration request creates the buffer home address which is the mirror of the home address and manages the BHoA along with the HoA and the care of address CoA-1. The home agent 2 adds the created BHoA or the unique code created other than the BHoA between the mobile node 1 and the home agent 2 to the BA message which notifies the mobile node that the location registration has been completed and transmits the BA message.

In the case where the packet is distributed from the corresponding node 3, the mobile node 1 assigns the code received from the home agent 2 as the source in the internal header of the packet transmitted to the corresponding node 3 and transmits the packet. In FIG. 34, the BHoA or the unique code is stored to "Code". When the home agent decapsulates the packet, the code is replaced with the BHoA and transmitted to the corresponding node 3. In response to the packet that is transmitted from the mobile node 1 and includes the code, the home agent 2 transmits the index information to the mobile node 1.

The packet transmitted from the corresponding node 3 is assigned the BHoA as the destination. The home agent 2 encapsulates the packet and buffers it. The packet in the buffer is read out based on the index and its offset, or a control signal and its offset when it is transferred to the mobile node 1. When the buffered packet is transmitted to the mobile node 1, the BHoA of the destination is replaced with the code that is notified to the mobile node 1 by the BA message.

Figure 35:
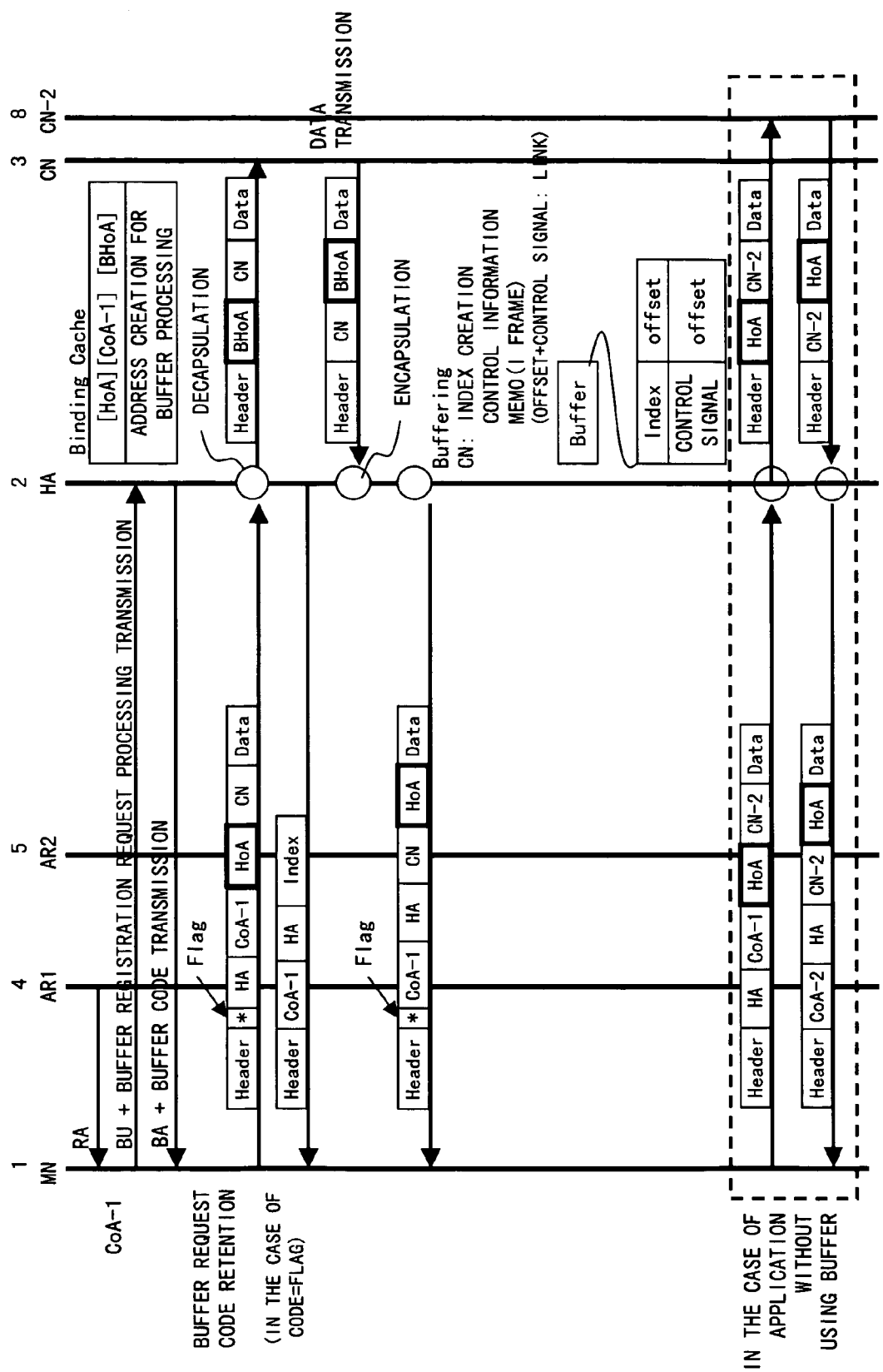
FIG. 35 is a sequence (part two) according to a message transmission of a buffer registration request.

FIG. 35 is a sequence according to a message transmission of the buffer registration request in the case of giving the flag to the packet. The system structure is the same as in the case of FIG. 34. Different points from the sequence in FIG. 34 will be mainly described below.

When the home agent 2 which has received the BU message including the buffer registration request transmits the BA message to the mobile node 1 after the creation of the BHoA, the home agent 2 notifies the mobile node to recognize the buffer data with the flag. The mobile node 1 gives the flag indicated with * in FIG. 35 to the packet transmitted to the corresponding node 3 and transmits the packet. After the packet given the flag is transmitted to the corresponding node, the home agent 2 transmits the index information to the mobile node 1.

The packet that is transmitted from the corresponding node 3, buffered at the home agent 2, and transferred to the mobile node 1 is given the flag *. Through the use of it, the mobile node 1 recognizes that the received packet is the buffer data.

Figure 36:
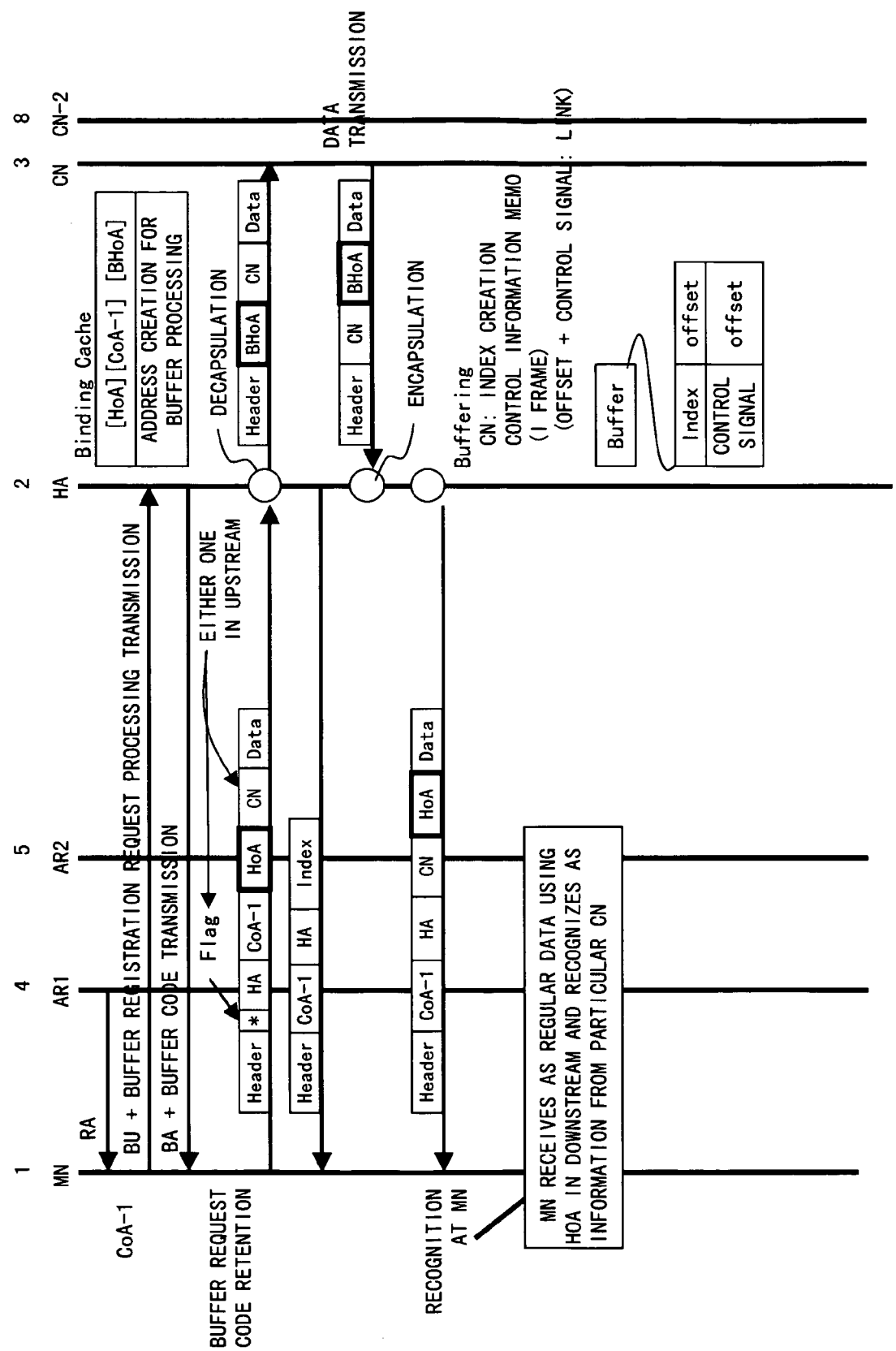
FIG. 36 is a sequence (part three) according to a message transmission of a buffer registration request.

FIG. 36 is a sequence according to a message transmission of the buffer registration request in the case where the buffer packet is not given the identifier such as the code, the flag, etc. and transmitted. Different points from FIG. 34 and FIG. 35 will be mainly described.

The home agent 2 which has received the buffer registration request transmits the code or the flag with the BA message to the mobile node 1 after the creation of the BHoA. The mobile node 1 transmits the packet to the corresponding node 3 using either the code or the flag which the home agent has notified the mobile node of.

When the packet that is transmitted from the corresponding node 3 and buffered is transferred to the mobile node 1, the packet is not given the identifier such as the code or the flag. Therefore, the mobile node 1 receives the packet similar to what is transmitted without buffering.

Figure 37:
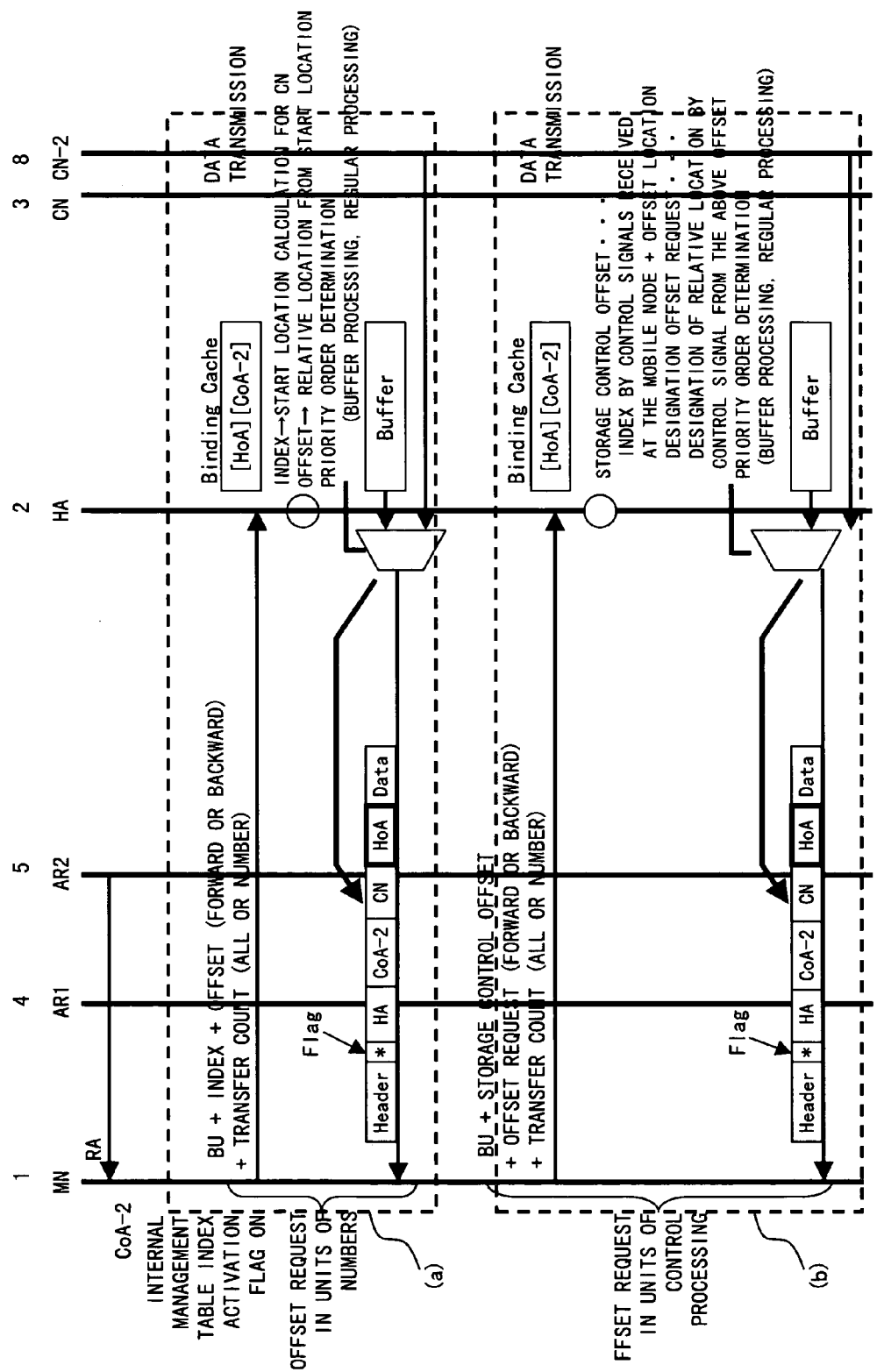
FIG. 37 is a sequence according to a message transmission of an index request.

FIG. 37 is a sequence according to a message transmission of the index request. FIG. 37 shows a sequence after the mobile node 1 under the access router 4 moves to the communication area of the access router 5 and a hand over occurs. Assume that the mobile node 1 has made the buffer registration request to the home agent 2 and the home agent 2 has buffered the packet from the corresponding node 3 prior to the operation in FIG. 37. Another corresponding node 8 is transmitting data to the mobile node 1.

The mobile node 1 receives the router advertisement from the access router 5 of which communication area the mobile node has moved to and transmits the BU message of the location registration, including the index request. The home agent 2 which has received the BU message updates the Binding Cache.

The operation in the case where the offset is specified in accordance with the number of packets is shown at (a) in FIG. 37. The operation in the case where the offset is specified in accordance with a control processing unit is shown at (b) in FIG. 37.

In the case where the offset is specified in accordance with the number of packets at (a), the index request included in the BU message comprises the index, the offset, a packet transfer count, and the like. The information is used when the packet to be transferred is extracted from the buffer. The index specifies a buffering start location of the packet transmitted from the corresponding node 3, and the offset specifies the relative location from the index. According to the offset, packets for the transfer count are extracted.

The home agent 2 determines whether the home agent preferentially transmits to the mobile node 1 a packet that is transmitted from the corresponding node 3, buffered, and transferred from the home agent 2 or a packet that is transmitted from another corresponding node 8, not buffered, and transferred. FIG. 37 shows the packet in the buffer in the case of giving the flag as the identifier, but the code may be used as well.

In the case where the offset is specified in accordance with the control processing unit at (b), the index request included in the BU message comprises a storage control offset, an offset request, a transfer count, and the like. The storage control offset comprises location information in units of control signals regarding the packets that the mobile node 1 has been received up to this time, and relative location information in units of control signals. The offset request represents the packet requiring the transfer as the relative location in units of control signals. Since a process in the case of a conflict between a packet transmitted from another corresponding node 8 and a transfer packet is the same as in (a), a description thereof is omitted.

Next, a packet transfer method according the embodiments will be described with reference to the flowcharts in FIGS. 38 to 48. FIGS. 38 to 42 shows the processing operation of mobile node, and FIGS. 44 to 48 shows the processing operation of the home agent of the relay node.

Figure 38:
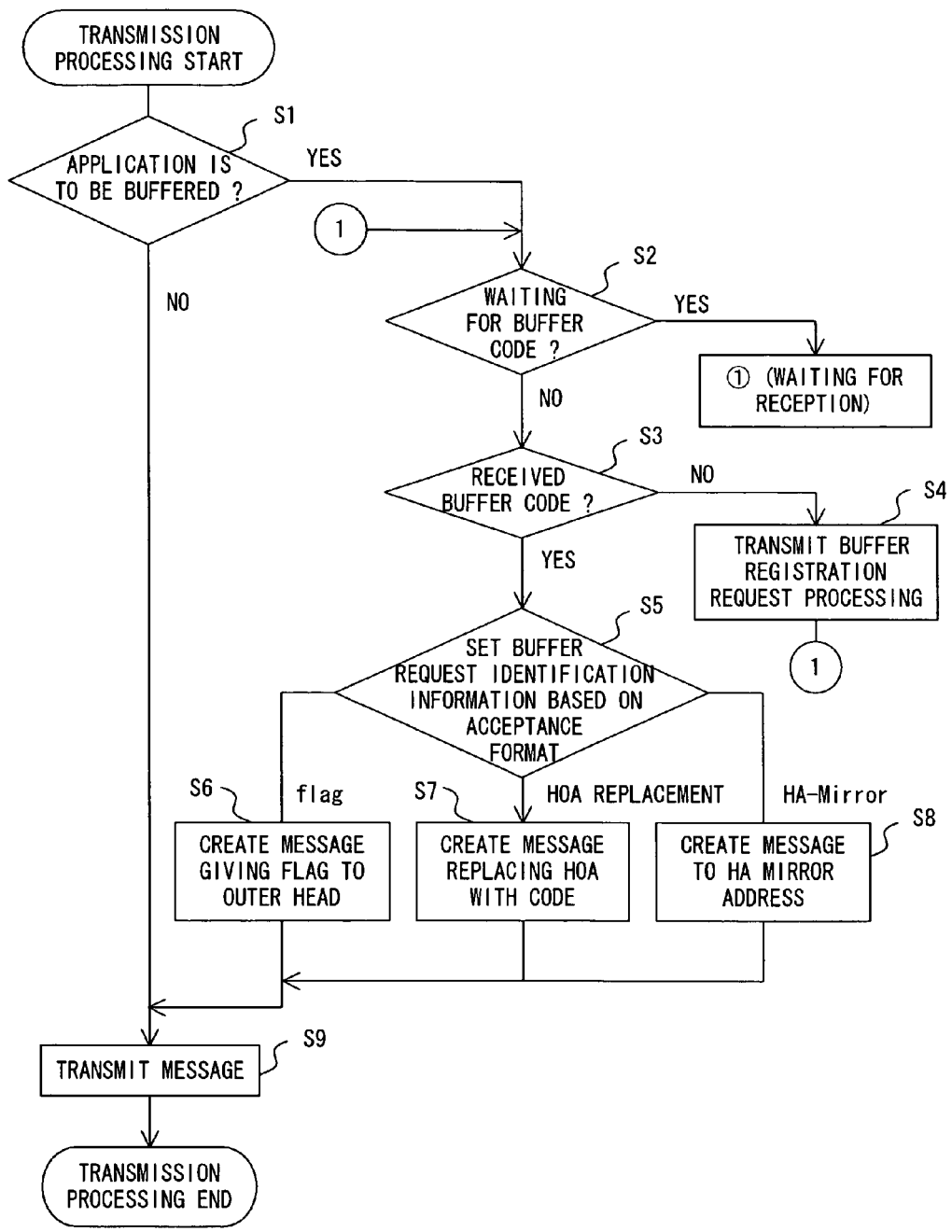
FIG. 38 is a flowchart of a basic operation of transmission at a mobile node.

FIG. 38 is a flowchart of a basic operation of transmitting a message from the mobile node.

First, at step S1, the mobile node determines whether the communication application which the mobile node 1 currently uses is to be buffered or not, and if YES, at step S2, the node determines if it is waiting for a message created by adding to the BA message the code, the flag, etc. (hereafter called buffer code) used for the buffering. On receiving the BA message including the buffer code, the process moves to step S3 where it is determined whether reception of the buffer code which is the identifier of the BA message is completed, and if the reception is completed, the process moves to step S5. If the reception has not been completed, the BU message including the buffer registration request is transmitted at step S4.

At steps S5 to S8, the identification information which is stored in a message transmitted from the mobile node 1 to the corresponding node 3 is set up on the basis of the buffer code stored in an acceptance format of the received BA message as shown FIG. 16B. At step S6, the flag is given to the outer header. At step S7, the home address HoA of the outer header is replaced with the code managed between the mobile node 1 and the home agent 2. Step S8, the mirror address of the HoA is set to the source of the outer header. At step S9, the message is transmitted to the corresponding node 3 and the process terminates.

Figure 39:
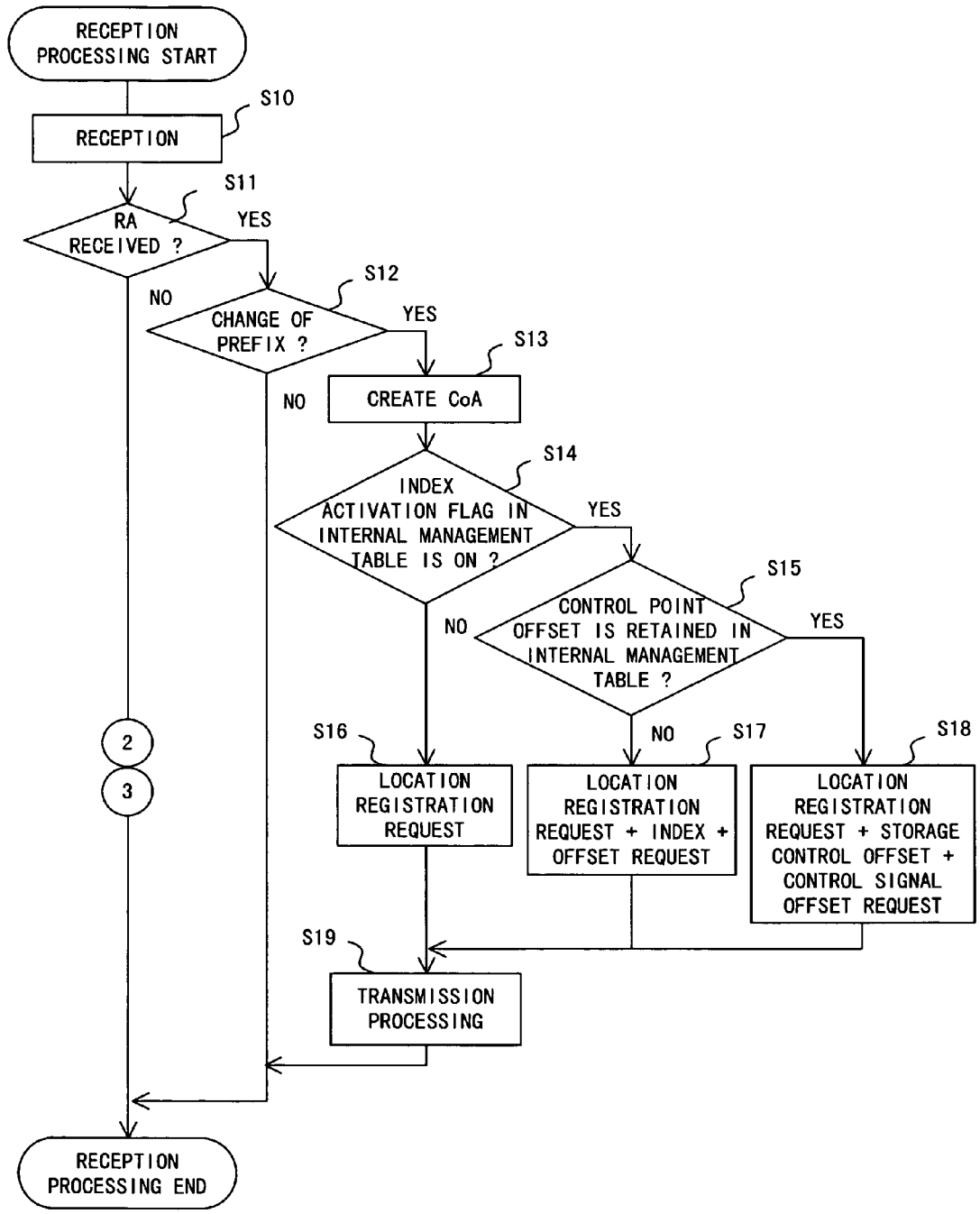
FIG. 39 is a flowchart of a basic operation of reception at a mobile node.

FIG. 39 is a flowchart of a basic operation of reception at the mobile node.

First, it is determined whether what is received at step S10 is the router advertisement or not (step 11). If it is not the router advertisement, the process moves to the reception processing of the data that the home agent 2 or the corresponding node 3 has transmitted, but a description thereof will be made later. If the router advertisement is received, it is determined whether or not there is a change of a prefix of the router at step S12. If there is no change, no processing is performed, and if there is a change, a care of address CoA is created at step S13. After the creation of the CoA, the process moves to step S14 where the state of the index activation flag in an internal management table is determined. In accordance with the index activation flag, it is determined whether the packet transfer method according to the above embodiments is executed. If the flag is ON, it is further determined whether or not information regarding a control point offset location is retained in the internal management table (step S15). If YES at step S15, in order to request the packet transfer in units of frames, the node creates a BU message including the offset request in units of control signals (step S18). If NO at step S15, in order to request the packet transfer in units of packets, the node creates a BU message including the offset request in units of packets (step S17). At step S14, if the index activation flag in the internal management table is OFF, the node does not request the packet transfer and creates a BU message only for the location registration request at step S16. The BU message which is created at step S16, S17, or S18 is transmitted (step S19), and the process terminates.

Figure 40:
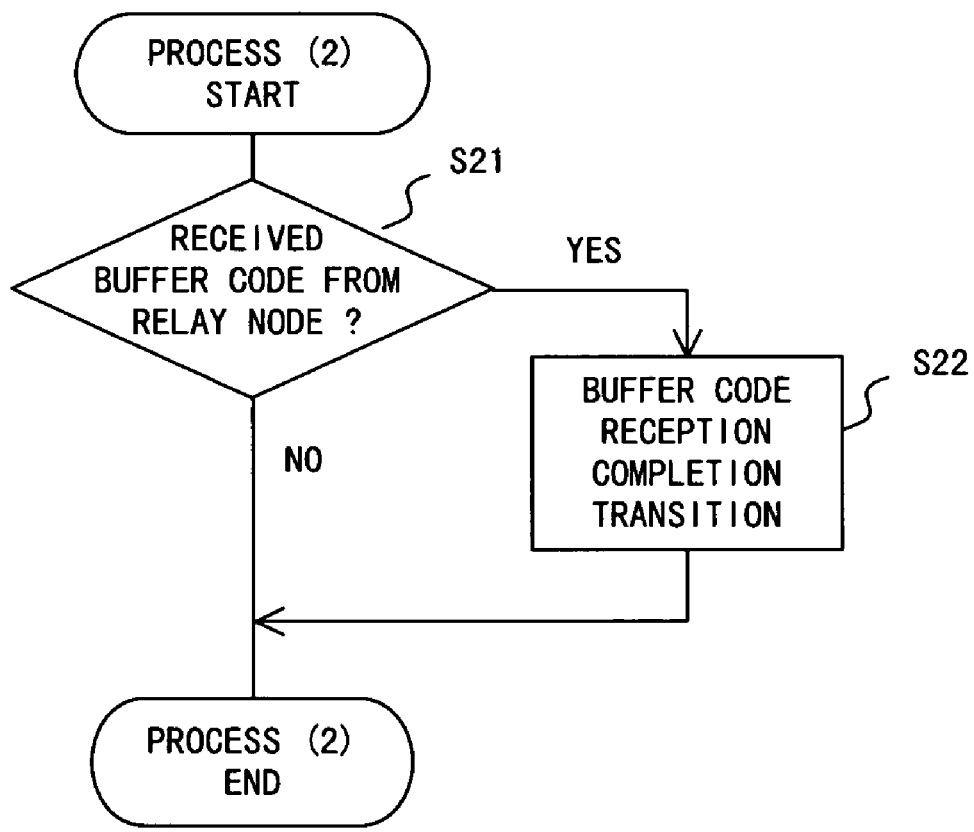
FIG. 40 is a flowchart at the time of receiving a buffer code at a mobile node.
Figure 41:
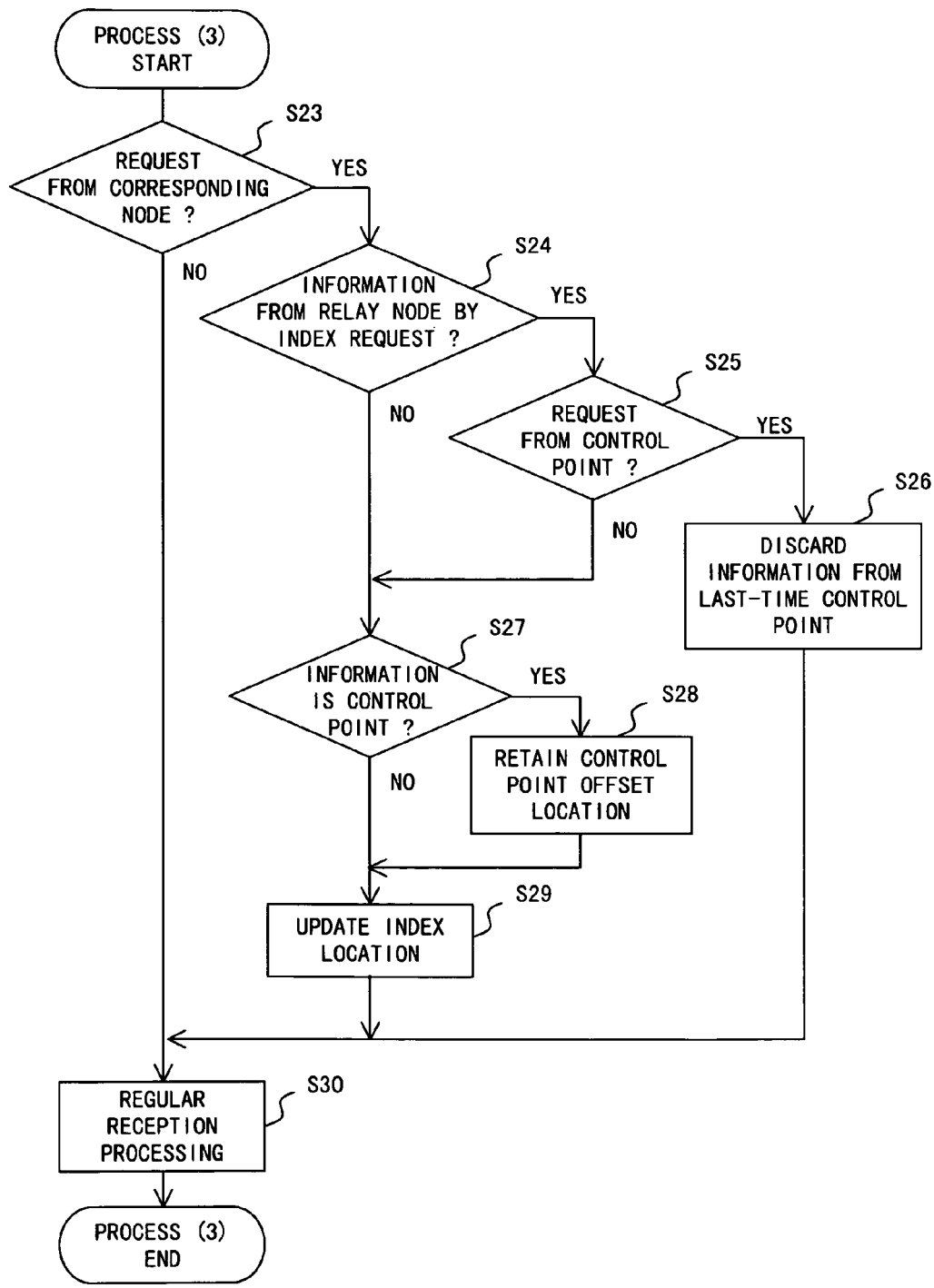
FIG. 41 is a flowchart at the time of receiving data at a mobile node.

Processes (2) and (3) in FIG. 39 are shown in FIG. 40 and FIG. 41 respectively. FIG. 40 shows a flowchart at time of receiving data from the home agent 2. First, it is determined whether the buffer code used for the buffering, such as the code, the flag, etc. is received from the home agent 2 of the relay node (step S21). If it is not received (NO at step S21), process (2) terminates. If it is received (YES at step S21), state transition processing at the time of completion of receiving the code used for the buffering is performed, and process (2) terminates. After process (2) terminates, subsequently process (3) in FIG. 41 initiates.

FIG. 41 shows a flowchart at the time of receiving data from the corresponding node 3. First, at step S23, it is determined whether the received data is the message from the corresponding node 3 transmitting a buffer packet. If NO at step S23, the packet is received without processing at step S29, and process (3) terminates.

If YES at step S23, it is further determined whether or not the received data is the one obtained from the home agent 2 according to the index request, that is, the buffer data that the mobile node 1 specifies with the index information is received (step S24). If YES at step S24, the process moves to step S25 where it is determined whether the index request is based on the control point, namely, the control signal. If the index request is not based on the control signal but is the one in units of packets, no processing is performed. If the index request is based on the control signal, the information from the last-time control point is discarded at step S26.

At step S27, it is determined whether the information contained in the received data is about the control point. If YES at step S27, the offset information of the received control point is retained (step S28). At step S29, the index location is updated. At step 30, the reception processing of the data is performed, and process (3) terminates.

Figure 42:
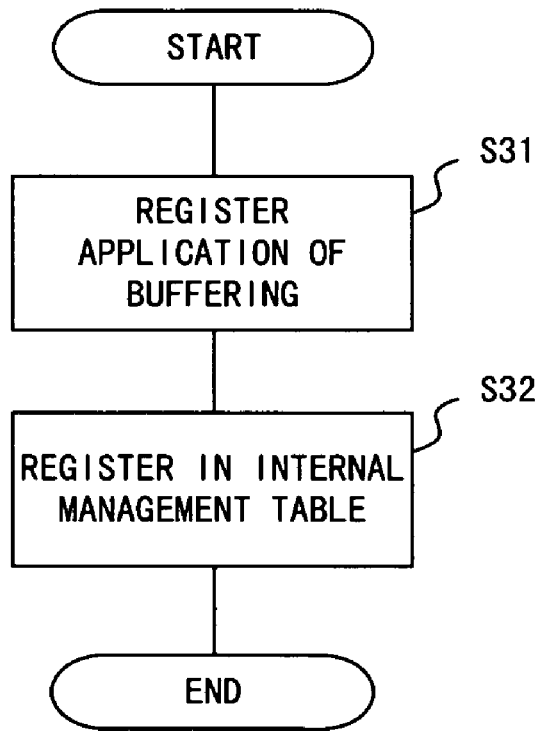
FIG. 42 is a flowchart showing a trigger for setting an index activation flag to ON or OFF.

At the mobile node 1, the index activation flag in the internal management table acts as a trigger for transferring the index request to the home agent 2 at the time of the location registration request. FIG. 42 is a flowchart showing a trigger for setting the index activation flag to ON or OFF.

At step S31, the communication application which uses the packet to be buffered is registered as application information in the internal management table. At step S32, the corresponding node 3 is registered as CN information in the internal management table. The index activation flag is set to ON or OFF according to the registered communication application, the registered corresponding node, or a combination of the communication application and the corresponding node.

Figure 43:
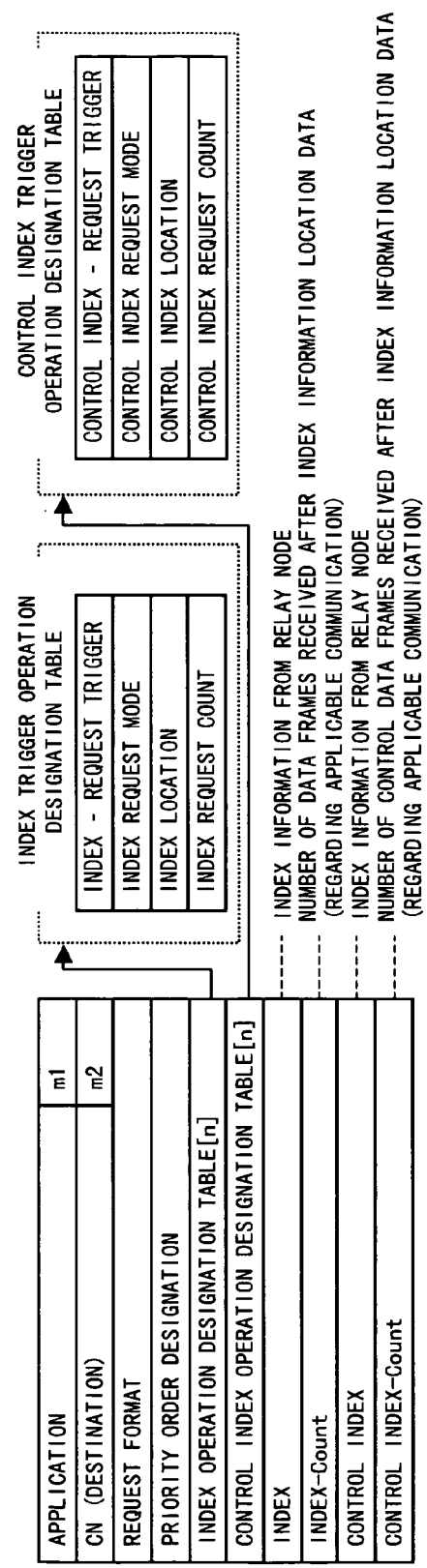
FIG. 43 is a structure example of an internal management table.

FIG. 43 is a structure example of the internal management table in the mobile node. The internal management table comprises the application information and the CN (destination) information as triggers for setting the index activation flag to ON or OFF; a request format for showing a manner for transmitting and receiving the buffer data between the relay node and the mobile node; priority order designation information for specifying whether the buffer packet is transferred with the packet index or the control signal index; an index operation designation table for specifying the packet transfer method in units of packets (index); a control index operation designation table for specifying the packet transfer method in units of frames (control index); and the index, the index count, the control index, and the control index count which are set based on the data received from the relay node.

The index operation designation table comprises an index request trigger; an index request mode; an index location; and an index request count. In the index request trigger, the information regarding the trigger which is a hand over, a change of the radio wave strength, etc. and the mobile node requests the transfer of the buffer data with is stored. In the index request mode, the information regarding whether the buffer data is read out forward or backward when the home agent 2 reads out the data in the buffer and transfers it to the mobile node 1 is stored. In the index location, the relative location information of the packet that the mobile node 1 requests the home agent to transfer is stored. In the index request count, the information regarding the number of packets the mobile node requests is stored. In the case where 0 is stored in the index request count, the transfer of all the buffer data, in the direction the index request mode specifies, from the index is specified. Since the control index operation designation table is the same as the index operation designation table except that the control signal is used as the unit in the control index operation designation table, a description thereof is omitted.

Among information to be stored on the basis of data received from the home agent 2 of the relay node, the index of the packet received from the home agent 2 is stored in the index of the internal management table, and the number of frames the mobile node 1 has received after the index of the packet received from the home agent 2 is stored in the index count. Since the control index and the control index count is the same as the index and the index count respectively except that the control signal is used as the unit in the control index and the control index count, a description thereof is omitted.

In the application information and the CN (destination) information, respective conditions of AND, OR, NOT OR, or NOT AND are stored. The index activation flag is set to ON in the case where the conditions are satisfied. In the case of the conditions are not satisfied, if the information is not stored in the table, the index activation flag is set to OFF. For example, when the application information m1=AND, and the CN information m2=AND, if the communication application is used, and if the mobile node is receiving the packet from the registered corresponding node, then the method of buffering the packet of the above embodiments and transferring the packet is executed.

Figure 44:
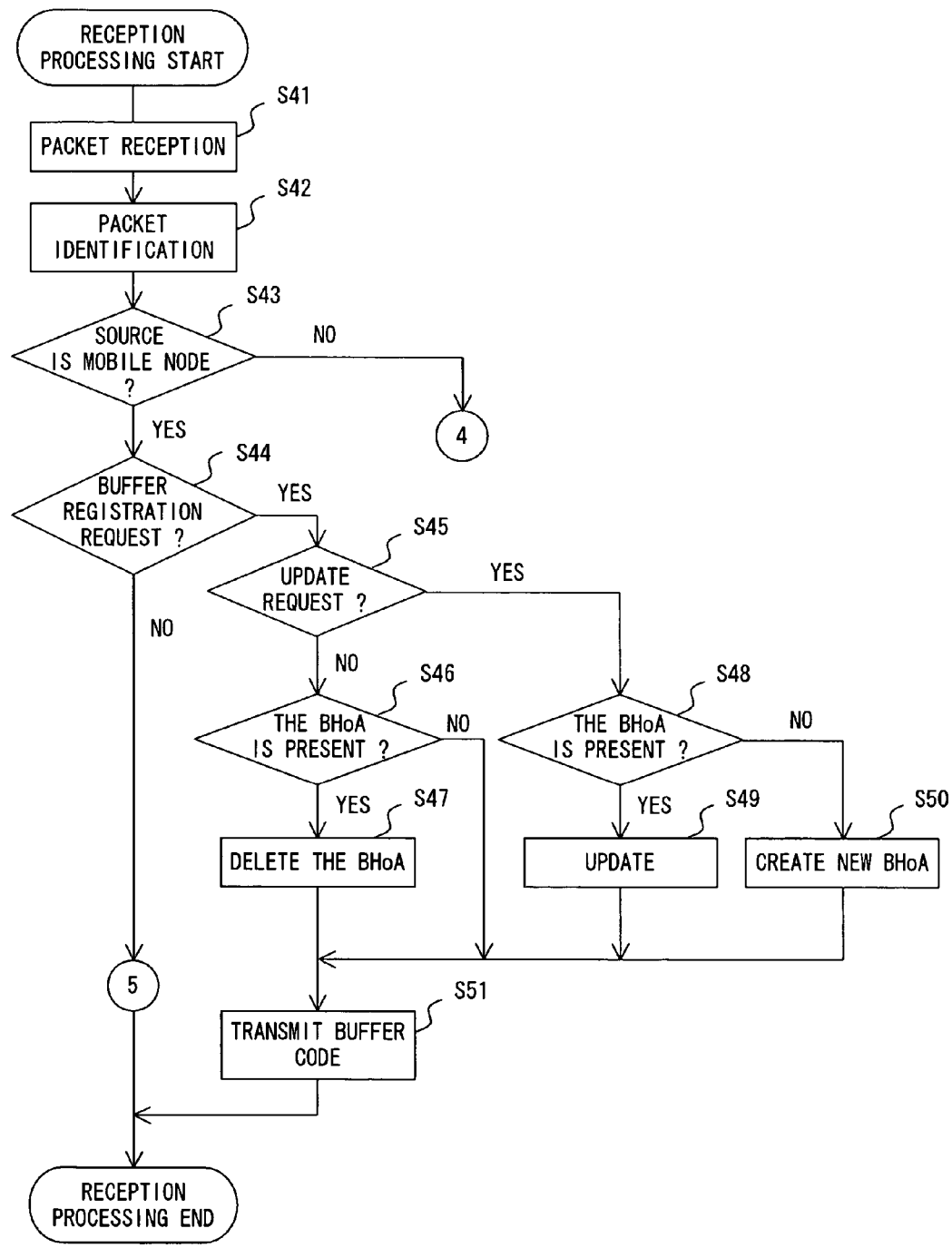
FIG. 44 is a flowchart of a basic operation of packet reception at a relay node.

FIG. 44 is a flowchart of a basic operation when the relay node (home agent) receives the packet.

First, upon receiving the packet at step S41, the relay node determines the source of the packet (step S42). If the source is not the mobile node 1, the process in FIG. 45 which is the receiving operation of data from the corresponding node 3 is performed, but the process in FIG. 45 will be described later. If the source is the mobile node 1, the process moves to step S44.

Figure 46:
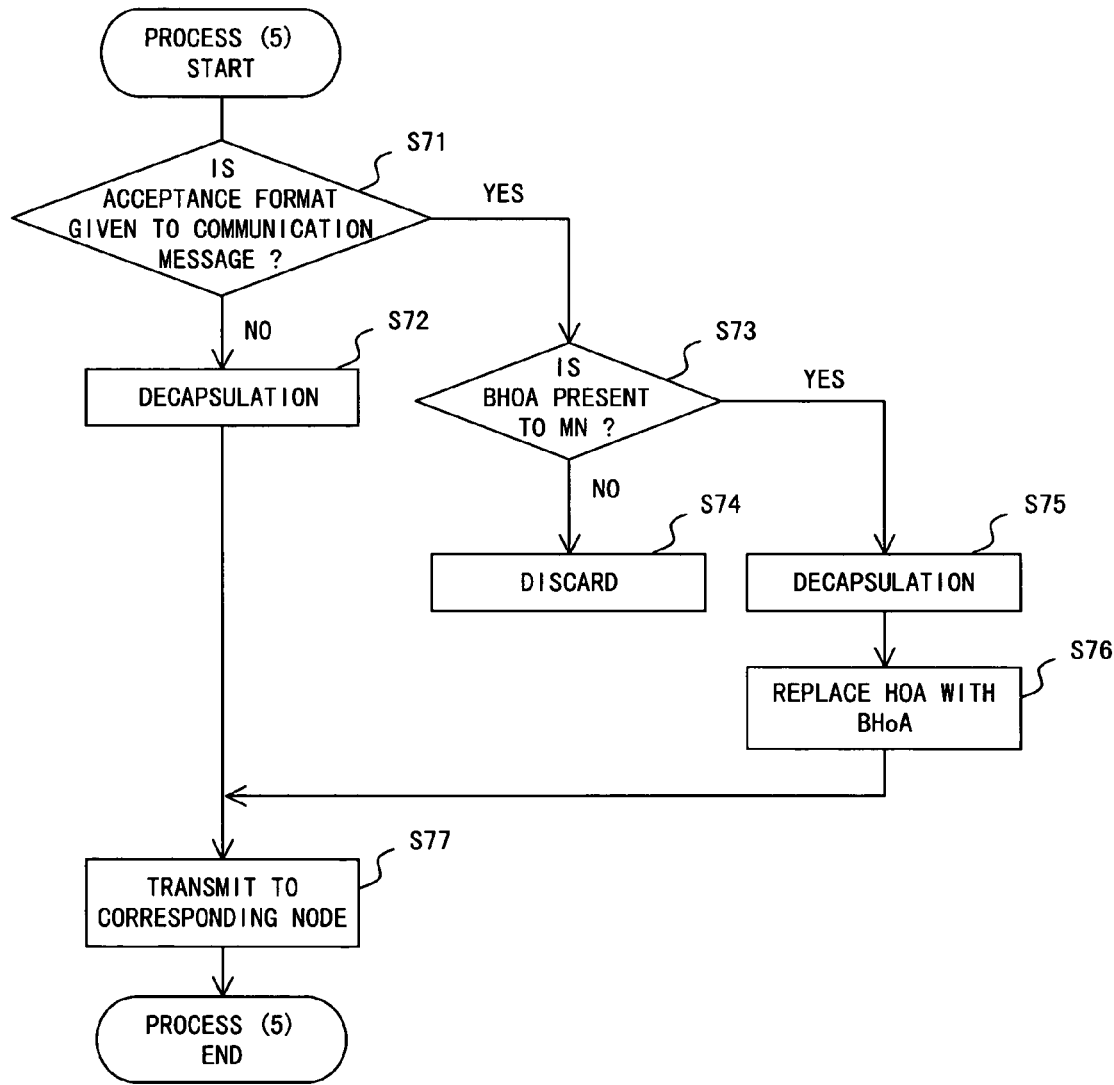
FIG. 46 is a flowchart at the time of transmitting a packet to a corresponding node at a relay node.

At step S44, it is determined whether the received packet is the BU message including the buffer registration request as shown in FIG. 27. If it is not the buffer registration request, the process in FIG. 46 is performed, and the process ends. The process in FIG. 46 will be described later. If it is the buffer registration request, it is determined whether it is an update request or a discard request at step 45. In the case of the update request, the buffer home address BHoA, the buffer code, etc. are updated at the relay node. In the case of the discard request, the BHoA, the buffer code, etc. that are managed at the relay node, are discarded. If it is not the update request, the presence or absence of the buffer home address BHoA is determined at step S46. If the BHoA is present, the BHoA is deleted (step S47), and if the BHoA is absent, no processing is performed. If it is the update request at step S45, in the same way, the presence or absence of the buffer home address BHoA is determined at step S48. If the BHoA is present, the BHoA is updated based on the received packet (step S49), and if the BHoA is absent, a new BHoA is created (step S50). At step S51, the buffer code used as the identifier of the corresponding node between the mobile node and the relay node is transmitted, and the process terminates.

Figure 45:
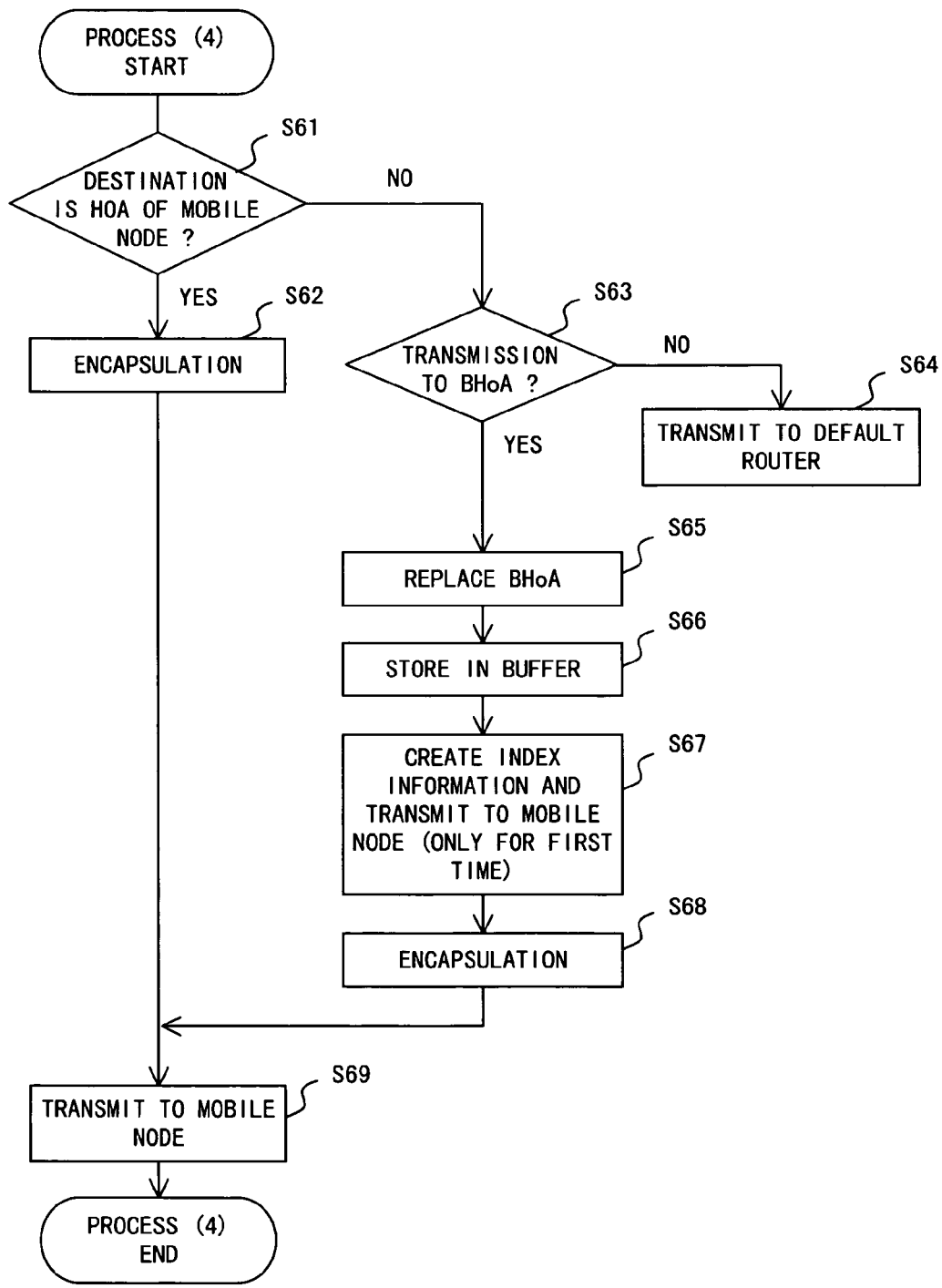
FIG. 45 is a flowchart at the time of receiving a packet from a corresponding node at a relay node.

Processes (4) and (5) in FIG. 44 are shown in FIG. 45 and FIG. 46 respectively. Process (4) in FIG. 45 is performed in the case where the relay node receives the packet transmitted from the corresponding node.

First, it is determined whether the destination is the home address HoA of the mobile node or the corresponding node (step S61). If the destination is the HoA, the packet is encapsulated at step S62 and transmitted to the mobile node (step S69), and process terminates. If the destination is not the HoA, it is determined whether the packet is addressed to the buffer home address BHoA at step S63. If NO at step S63, the packet is transmitted to a default router (step S64), and process terminates. If YES at step S63, the BHoA is replaced with the HoA, the buffer code (Code) or the like (step S65), and the packet is stored in the buffer (step S66), and only for the first time, an index information is created and transmitted to the mobile node (step S67). The packet is encapsulated (step S68) and transmitted to the mobile node (step S69), and process terminates.

FIG. 46 is a flowchart of the processing of data transmitted from the mobile node 1 to the corresponding node 3 at the relay node. First, at step S71, it is determined whether the buffer code corresponding to the acceptance format fmt in FIG. 23B is given to the message. The step moves to step S72 if it is given, or step S73 if it is not given. At step S72, the packet is decapsulated and transmitted to the corresponding node (step S77), and process terminates.

At step S73, it is determined whether the mobile node is notified of the BHoA. If it is not notified, the packet is discarded at step S74. If it is notified, the packet is decapsulated at step S75, and the HoA is replaced with the BHoA (step S76). The packet is transmitted to the corresponding node (step S77) and process terminates.

Figure 47:
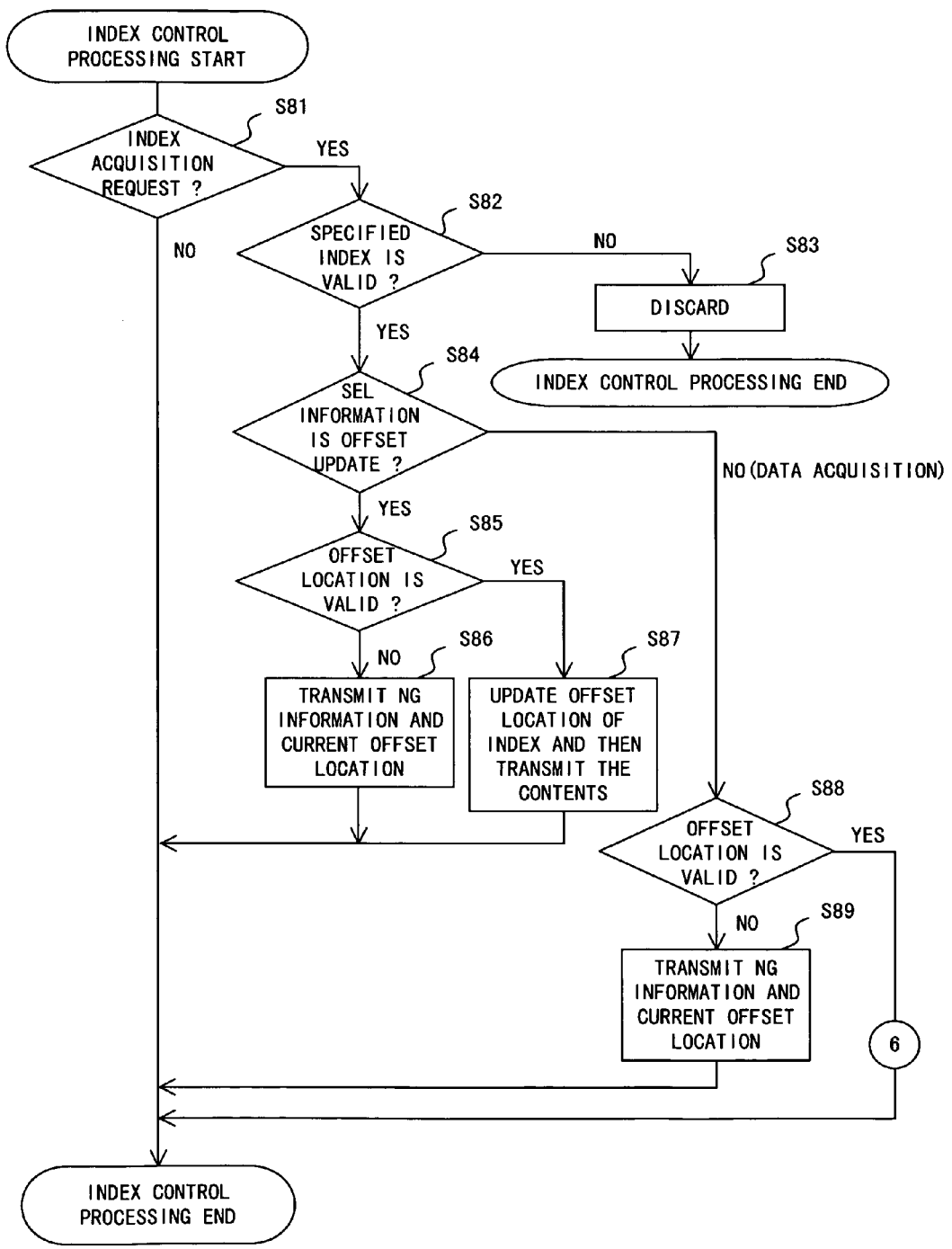
FIG. 47 is a flowchart (part one) of index control processing.
Figure 48:
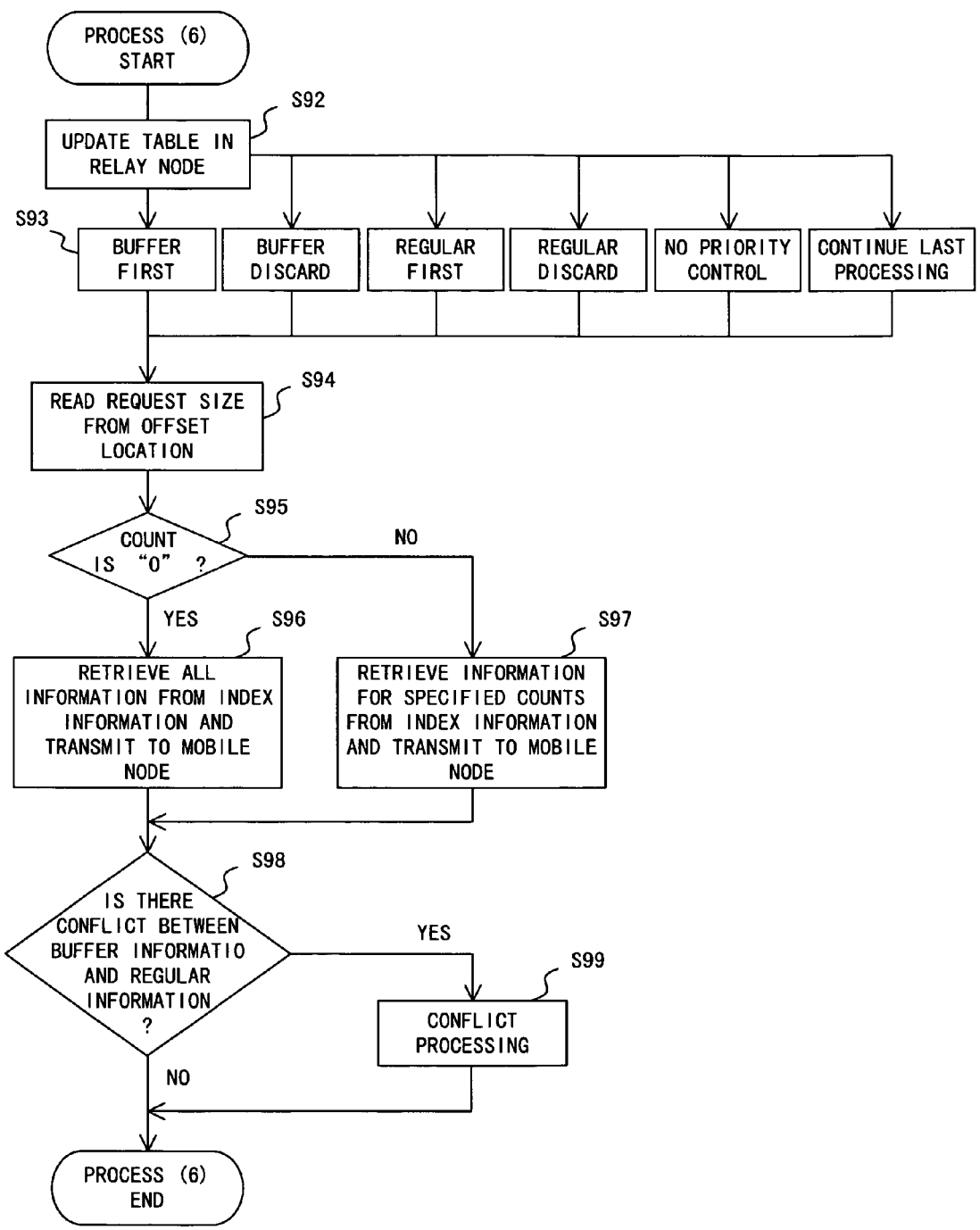
FIG. 48 is a flowchart (part two) of index control processing.

FIG. 47 and FIG. 48 are flowcharts of index control processing at the relay node. According to the index control processing, the relay node transmits the packet based on the index information received from the mobile node.

First, at step S81, it is determined whether the received BU message is the message including the index acquisition request shown in FIG. 23B. If the index acquisition request is not included, the process terminates. If the index acquisition request is included, it is determined at step S82 whether the specified index value is valid. If it is not valid, the packet is discarded of (step S83), and the process terminates.

If the index value is valid, the process moves to step S84, and it is determined whether a value which indicates the offset update is stored to the "sel" information of the index information in FIG. 23B. As this "sel" information has been already described referring to FIG. 23B, a description thereof is omitted here. If it is the offset update, it is further determined at step S85 whether a valid location is specified as the offset location. If valid, the offset location is updated as the transmitted packet specifies and the contents of the update are transmitted to the mobile node (step S87), and the process terminates. If the offset location is invalid, the current offset location is transmitted to the mobile node (step S86), and the process terminates.

At step S84, if "sel" information is not the offset update, the process moves to step S88 where it is further determined whether a valid value is specified as the offset location. If the offset is invalid, the current offset location is transmitted to the mobile node (step S89), and the process terminates. If a valid value is specified, the process moves to process (6) in FIG. 48.

In the flowchart in FIG. 48, a process selected by the "priority" information in the index acquisition request is performed. First, at step S92, data in the table the relay node has is updated based on the received index information. The table the relay node has comprises the buffer home address; the buffer code; and information regarding the data that has been already transmitted and has not been transmitted yet to the mobile node among the buffer data. At step S93, buffer data priority, buffer data discard, regular transmission data priority, no priory control, or continuation of the last processing is performed base on the "priority" information. Here, the regular transmission data refers to the data transmitted to the mobile node from the corresponding node without buffering.

Next, at step S94, the index of the size requested by the mobile node (data size in units of indexes or control indexes) is acquired. At step S95, it is determined whether the "count" value in the index information is 0 or not. If it is 0, all the buffer data is read out and transmitted to the mobile node (step S96). If a value other than 0 is stored in the count, the packets for just the specified value of the count are read out from the buffer and transmitted to the mobile node (step S97).

After the packet is transmitted to the mobile node, it is determined at step S98 whether there is a conflict between the buffer packet and the packet transmitted without buffering. If there is a conflict, the specified conflict processing is performed and process terminates.

As described above, according to the packet transfer method of the present invention, in the case where the packet loss may occur due to the handover, the degradation of the radio wave strength or the like, the specified packet is buffered and transferred to the mobile node according to the request of the mobile node, and thus the packet loss can be avoided. Furthermore, since the relay node, the gateway, or the like can be set up as a node that performs the buffering, an environment according to the network configuration or the like can be established.

What is claimed is:

1. A data transfer method using a communications network that comprises, at least, a mobile node, a corresponding node that distributes data to the mobile node, and a relay node that relays data transfer between the mobile node and the corresponding node, the data transfer method comprising:
    a requesting step of requesting, by the mobile node, the relay node to initiate buffering data that is transmitted from the corresponding node;
    a buffering step of buffering, at the relay node, data that is transmitted from the corresponding node and addressed to the mobile node using an address for buffering that is generated by the relay node based on a home address of the mobile node, said address for buffering being generated by the relay node separately from an address used for data transmission;
    a buffer data request step of requesting, by the mobile node, the relay node to transmit the buffered data to the mobile node; and
    a buffer data transmission step of transmitting, by the relay node, the buffered data to the mobile node.

2. The data transfer method according to claim 1, further comprises:
    an index information transmission step of transmitting, by the relay node, index information which is required when the relay node transmits the buffered data from the relay node to the mobile node; and
    an index information management step of receiving and managing, at the mobile node, the index information; and wherein
    the buffer data request step is performed by the mobile node using the index information, and the buffer data transmission step is performed by the relay node referring to the index information.

3. The data transfer method according to claim 2 wherein the index information comprises a mirror address of a home address of the mobile node.

4. The data transfer method according to claim 3 wherein the index information further comprises relative location information regarding an offset of the data transmitted to the mobile node, and the buffer data request step is performed when a hand over occurs.

5. The data transfer method according to claim 4 further comprising:
    a step of updating, by the mobile node, the relative location information using the buffered data transmitted from the relay node.

6. The data transfer method according to claim 5 wherein the relative location information includes location information regarding a data control frame.

7. The data transfer method according to claim 3 wherein the index information further comprises relative location information regarding an offset of the data transmitted to the mobile node, and the buffer data request step is performed when it is detected that radio wave strength has fallen below a predetermined threshold value.

8. The data transfer method according to claim 2 wherein the index information comprises a unique code which the mobile node is assigned by the relay node.

9. The data transfer method according to claim 2 wherein the index information comprises a flag.

10. The data transfer method according to claim 1 wherein the relay node is a home agent of a mobile IP.

11. The data transfer method according to claim 10 further comprising:
    a step of, when there is a conflict between the data that is buffered and transmitted from the corresponding node to the mobile node and data that is transmitted from another corresponding node to the mobile node, performing selective processing for the conflict.

12. A data transfer method using a communications network that comprises, at least, a mobile node, a corresponding node that distributes data to the mobile node, a relay node that relays data transfer between the mobile node and the corresponding node, and a terminal node that is connected to the relay node, the data transfer method comprising:
    a step of requesting, by the mobile node, the relay node to initiate buffering data that is transmitted from the corresponding node;
    a buffering step of buffering, at the terminal node, data that is transmitted from the corresponding node and addressed to the mobile node using an address for buffering that is generated by the relay node based on a home address of the mobile node, said address for buffering being generated by the relay node separately from an address used for data transmission;
    a buffer data request step of requesting, by the mobile node, the relay node to transmit the buffered data to the mobile node; and
    a buffer data transmission step of transmitting, by the terminal node, the buffered data to the mobile node through the relay node.

13. The data transfer method according to claim 12 wherein
    after the buffering step, the data transfer method further comprises:
    an index information transmission step of transmitting, by the relay node, index information which is required when the relay node transmits the buffered data to the mobile node; and
    an index information management step of receiving and managing, at the mobile node, the index information; and wherein
    the buffer data request step is performed by the mobile node using the index information, and the buffer data transmission step is performed by the terminal node referring to the index information.

14. A data transfer method using a communications network that comprises, at least, a mobile node, a corresponding node that distributes data to the mobile node, and a relay node that relays data transfer between the mobile node and the corresponding node, the data transfer method comprising:
- a step of requesting, by the mobile node, the relay node to perform data communication according to a data transmission mode in which data is transmitted from the corresponding node;
- a step of making setting, at the relay node, to transmit data that is transmitted from the corresponding node and addressed to the mobile node according to the data transmission mode using an address for buffering that is generated by the relay node based on a home address of the mobile node, said address for buffering being generated by the relay node separately from an address used for data transmission;
- a step of requesting, by the mobile node, the relay node to transmit data to the mobile node according to the mode; and
- a step of transmitting, by the relay node, the data to the mobile node.

15. The data transfer method according to claim 14 wherein
the mode is related to compression of communication data.

16. The data transfer method according to claim 14 wherein
the mode is related to delay of data transmission.

17. The data transfer method according to claim 14 wherein
the mode is related to thinning-out of data.

18. The data transfer method according to claim 14 wherein
the mode is related to transmission of data addressed to a plurality of destination addresses.

19. A data transfer method using a communications network that comprises, at least, a first corresponding node, a second corresponding node that distributes data to the first corresponding node, a gateway that connects a network of the first corresponding node to a network of the second corresponding node, the data transfer method comprising:
- a step of requesting, by the first corresponding node, the gateway to initiate buffering data that is transmitted from the second corresponding node;
- a buffering step of buffering, at the gateway, data that is transmitted from the second corresponding node and addressed to the first corresponding node using an address for buffering that is generated by the gateway based on a home address of the first corresponding node, said address for buffering being generated by the gateway separately from an address used for data transmission;
- a buffer data request step of requesting, by the first corresponding node, the gateway to transmit the buffered data to the first corresponding node; and
- a buffer data transmission step of transmitting, by the gateway, the buffered data to the first corresponding node.

20. A relay node that relays data transfer between a mobile node and a corresponding node that distributes data to the mobile node, the relay node comprising:
- buffering unit for buffering data that is transmitted from the corresponding node and addressed to the mobile node using an address for buffering that is generated by the relay node based on a home address of the mobile node, said address for buffering being generated by the relay node separately from an address used for data transmission;
- index information transmission unit for transmitting index information which is required when the buffered data is transmitted to the mobile node; and
- data transmission unit for transmitting the data buffered by the buffering unit to the mobile node referring to the index information.

21. A mobile node that a corresponding node distributes data to and receives data through a relay node that relays data transfer between the mobile node and the corresponding node, the mobile node comprising:
- buffering initiation request unit for requesting the relay node to initiate buffering data that is transmitted from the corresponding node using an address for buffering that is generated by the relay node based on a home address of the mobile node, said address for buffering being generated by the relay node separately from an address used for data transmission;
- index information management unit for receiving and managing index information which is required when the buffered data is transmitted from the relay node; and
- buffer data transmission request unit for requesting the relay node to transmit the buffered data using the index information.

22. A gateway that connects a network of a first corresponding node to a network of a second corresponding node that distributes data to the first corresponding node, the gateway comprising:
- buffering unit for buffering data that is transmitted from the second corresponding node and addressed to the first corresponding node using an address for buffering that is generated by the gateway based on a home address of the first corresponding node, said address for buffering being generated by the gateway separately from an address used for data transmission;
- index information transmission unit for transmitting index information which is required when the buffered data is transmitted to the first corresponding node; and
- data transmission unit for transmitting the data buffered by the buffering unit to the first corresponding node referring to the index information.

23. A data transfer system that comprises, at least, a mobile node, a corresponding node that distributes data to the mobile node, and a relay node that relays data transfer between the mobile node and the corresponding node, the data transfer system comprising:
- buffering initiation request unit for requesting, by the mobile node, the relay node to initiate buffering data that is transmitted from the corresponding node;
- buffering unit for buffering, at the relay node, the data that is transmitted from the corresponding node and addressed to the mobile node using an address for buffering that is generated by the relay node based on a home address of the mobile node, said address for buffering being generated by the relay node separately from an address used for data transmission;
- buffer data request unit for requesting, by the mobile node, the relay node to transmit the buffered data to the mobile node; and
- buffer data transmission unit for transmitting, by the relay node, the buffered data to the mobile node.

24. The data transfer system according to claim 23 wherein
data distribution processing of the corresponding node that distributes data to the mobile node is intermittent data that streams during session establishment state.

25. A relay node that relays data transfer between a mobile node and a corresponding node that distributes data to the mobile node, the relay node comprising:

buffering means for buffering data that is transmitted from the corresponding node and addressed to the mobile node using an address for buffering that is generated by the relay node based on a home address of the mobile node, said address for buffering being generated by the relay node separately from an address used for data transmission;

index information transmission means for transmitting index information which is required when the buffered data is transmitted to the mobile node; and data transmission means for transmitting the data buffered by the buffering means to the mobile node referring to the index information.

\* \* \* \* \*